United States Patent [19]
Ohshita et al.

[11] Patent Number: 5,666,213
[45] Date of Patent: *Sep. 9, 1997

[54] IMAGE DATA PROCESSING SYSTEM AND METHOD REALIZING FINE IMAGE WITH SIMPLE CONSTRUCTION/PROCEDURE

[75] Inventors: Masakazu Ohshita, Kawasaki; Mutsuo Shimomae, Yokosuka, both of Japan

[73] Assignee: Ricoh Company, Ltd., Tokyo, Japan

[*] Notice: The term of this patent shall not extend beyond the expiration date of Pat. No. 5,327,260.

[21] Appl. No.: 265,143

[22] Filed: Jun. 24, 1994

Related U.S. Application Data

[63] Continuation of Ser. No. 980,964, Nov. 24, 1992, Pat. No. 5,327,260.

[30] Foreign Application Priority Data

Jun. 30, 1993 [JP] Japan .................... 5-187058

[51] Int. Cl.$^6$ ............................... H04N 1/40
[52] U.S. Cl. .................. 358/448; 358/456; 358/462; 382/199
[58] Field of Search ....................... 358/447, 448, 358/456, 462, 463, 464, 443, 445; 382/199, 205, 266, 268; H04N 1/40

[56] References Cited

U.S. PATENT DOCUMENTS

| | | | |
|---|---|---|---|
| 4,544,922 | 10/1985 | Watanabe et al. | 340/728 |
| 5,005,139 | 4/1991 | Tung | 364/519 |
| 5,140,444 | 8/1992 | Klein et al. | 358/463 |
| 5,289,570 | 2/1994 | Suzuki | 358/450 |
| 5,327,260 | 7/1994 | Shimomae et al. | 358/448 |
| 5,467,422 | 11/1995 | Itihara et al. | 358/456 |

FOREIGN PATENT DOCUMENTS

| | | | |
|---|---|---|---|
| 32 40 233A1 | 5/1983 | Germany | G09F 9/30 |
| 42 39 966A1 | 6/1993 | Germany | G06F 15/68 |
| 2-112966 | 4/1990 | Japan . | |
| 5-207282 | 8/1993 | Japan . | |

*Primary Examiner*—Kim Vu
*Attorney, Agent, or Firm*—Lowe, Price, LeBlanc & Becker

[57] ABSTRACT

A bit-map unit forms a bit map using given image data. A boundary recognizing unit recognizes characteristics of a boundary present between first type of pixels and second type of pixels constituting the bit map. A determining unit determines for each pixel whether correction is necessary so as to make the image produced from the given image data significantly finer, the determination using at least part of the boundary characteristics. A correction unit performs a correction on the image data for the pixel, the correction of which pixel has been determined to be necessary, the correction being performed in a manner determined depending on the relevant boundary characteristics. A data replicating unit replicates the given image data to be used in the correction to be performed by the correction unit. A timing producing unit produces timing in which the data replicating unit performs the replicating operation. A times-setting unit sets the number of times by which the data replicating unit performs the replicating operation. A numbering unit numbers the image data set created by the replication for each replication operation so as to identify the number of each image data set created by the replication.

22 Claims, 36 Drawing Sheets

FIG. 14

| EMBODIMENT | TABLE MEMORY CAPACITY(A) | PATTERN MEMORY CAPACITY(B) | TOTAL CAPACITY(A+B) |
|---|---|---|---|
| FIG.10 | 0 bit | 40960 bit | 40960 bit |
| FIG.11 | 0 bit | 6553360 bit | 655360 bit |
| FIG.12 | 458752 bit | 1280 bit | 460032 bit |
| FIG.13 | 28672 bit | 20480 bit | 49152 bit |

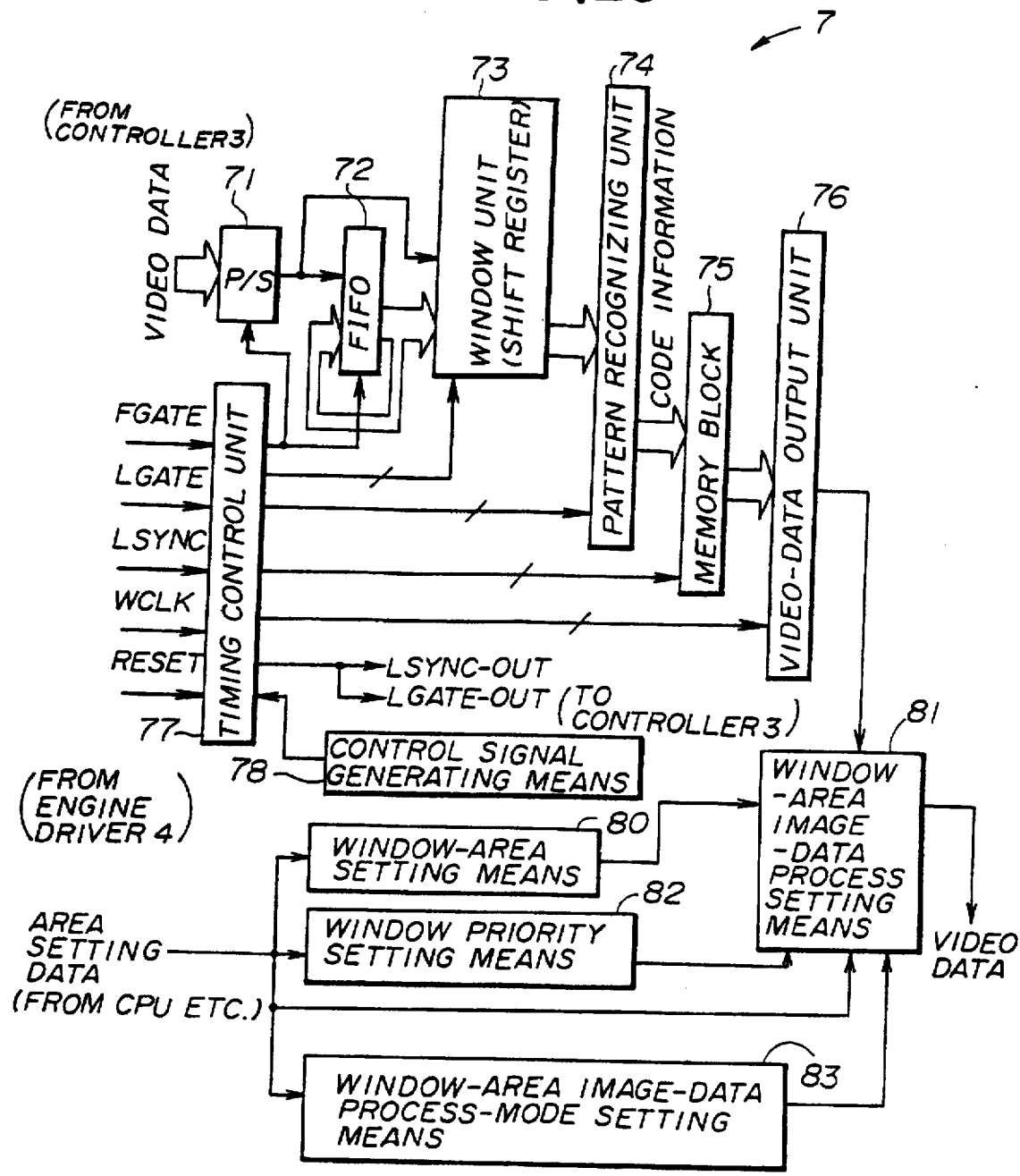

FIG.26B
FIG.26C
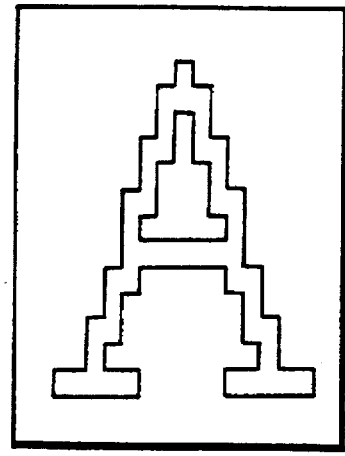
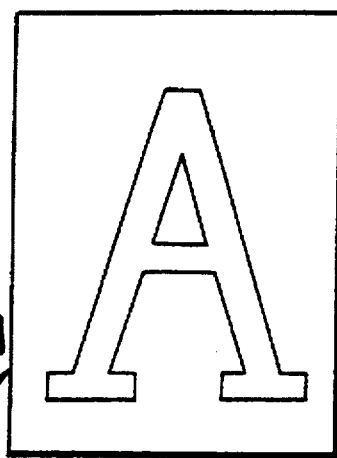
FIG.26A
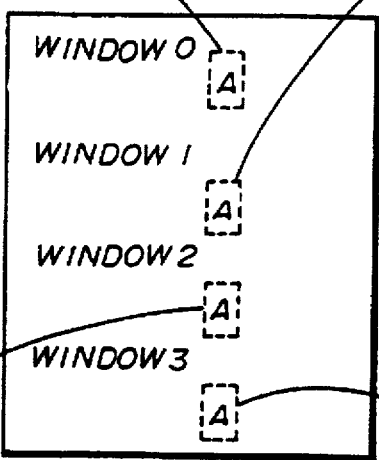
FIG.26D
FIG.26E
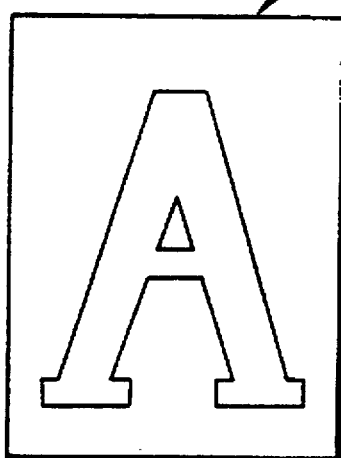
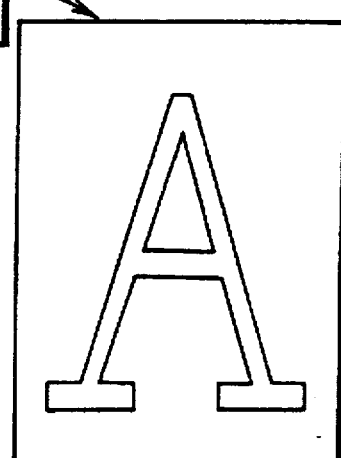

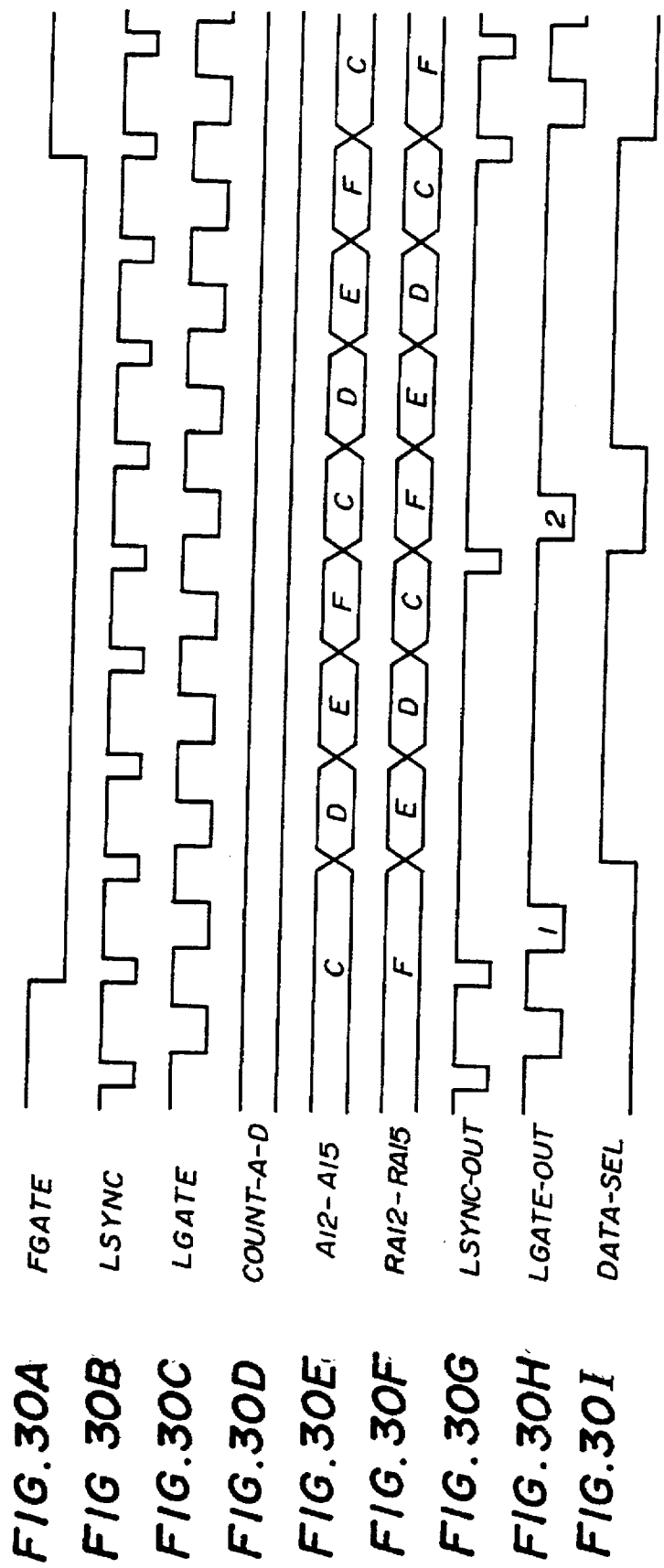

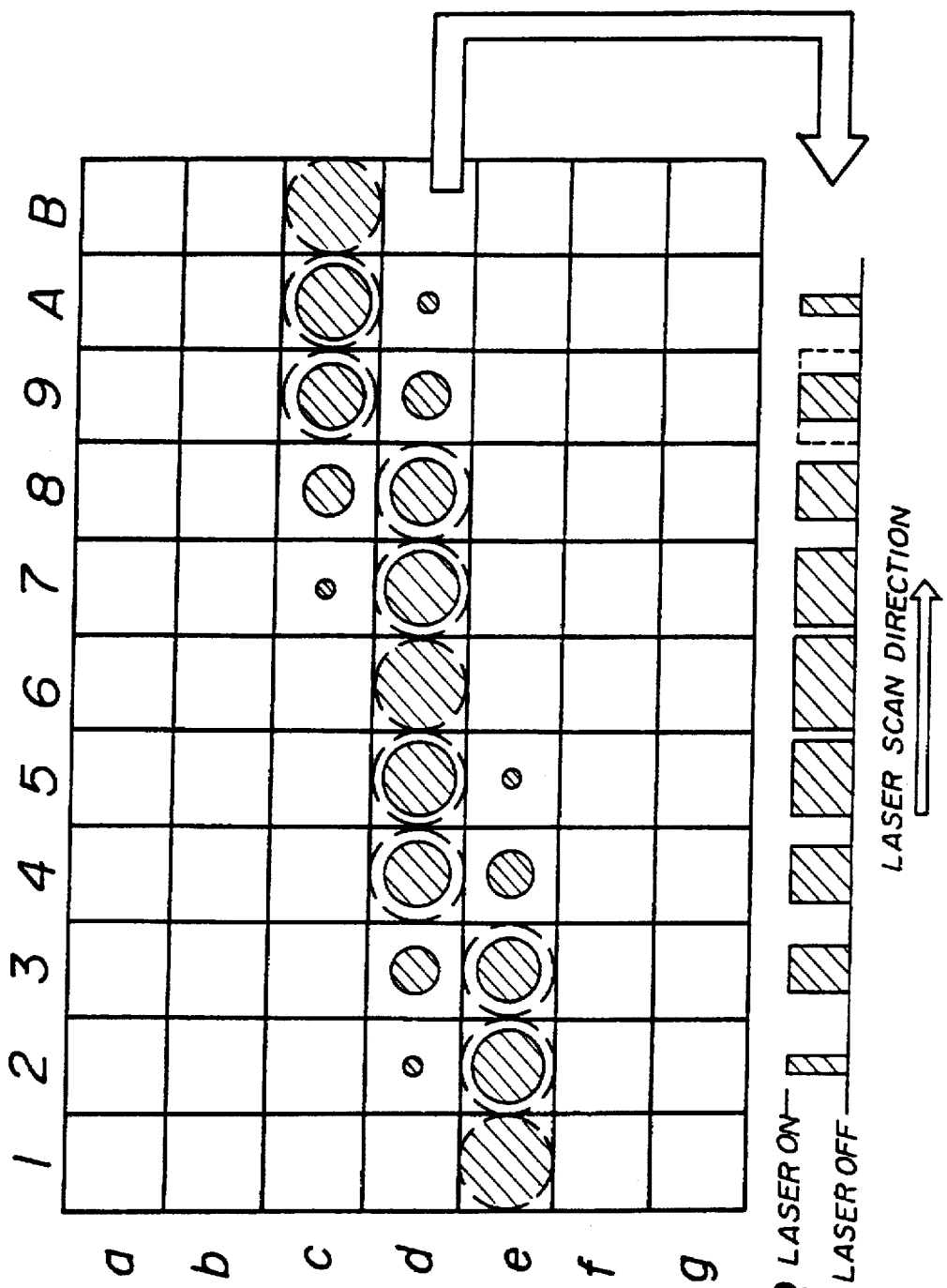

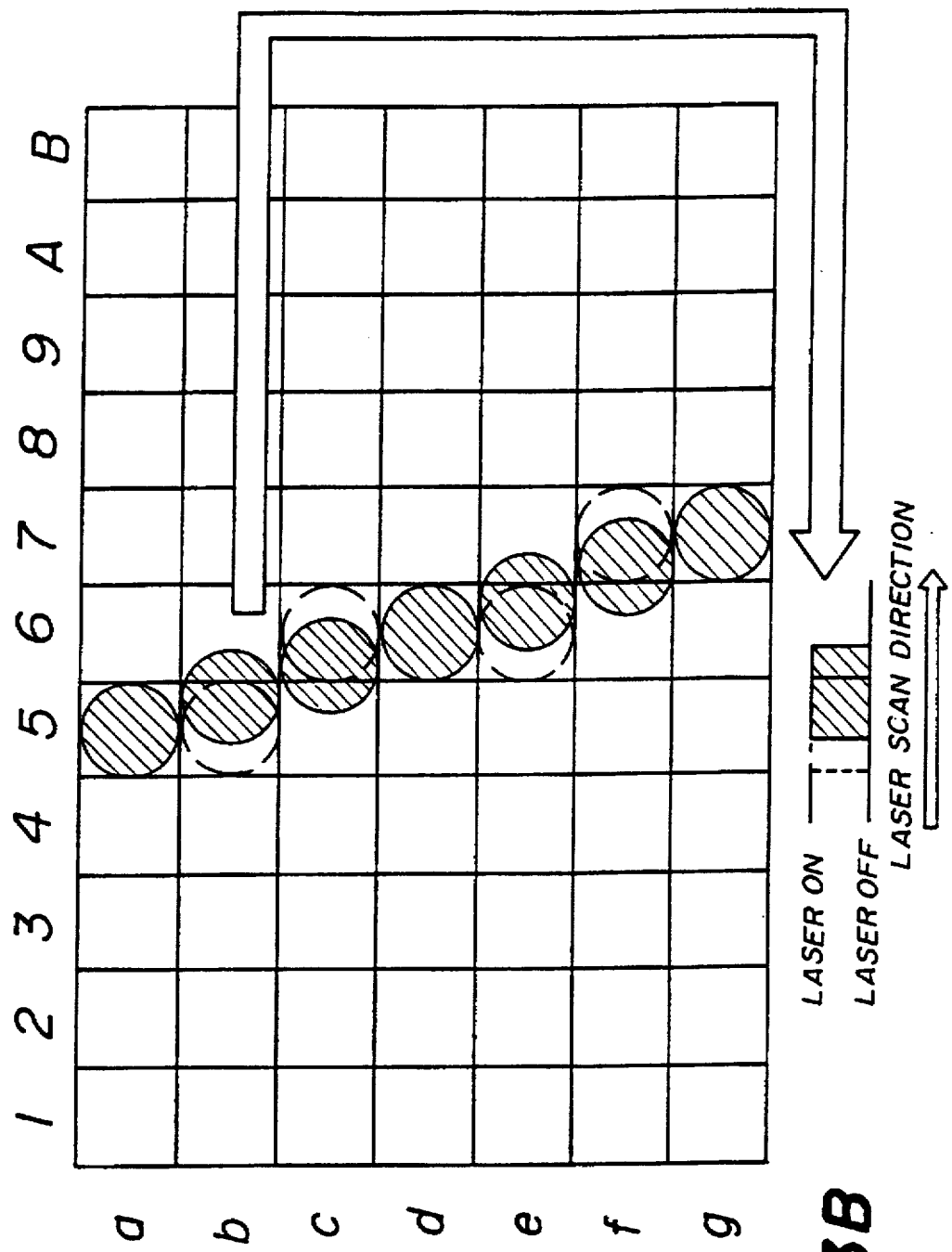

FIG.44A

| SIGNAL | FIG.37 | FIG.38 |
|---|---|---|
| H/V | 1 | 0 |
| DIR1<br>DIR0 | 0<br>1 | 1<br>0 |
| B/W | 0 | 1 |
| U/L | 0 | — |
| GST | 1 | 1 |
| RUC | 1 | 1 |
| LLC | 0 | 0 |
| CC1<br>CC0 | 1<br>0 (2) | 1<br>0 (2) |
| RUAS1<br>RUAS0 | 0<br>0 | 1<br>0 |
| LLAS1<br>LLAS0 | —<br>— | —<br>— |

FIG.44B

| SIGNAL | FIG.37 | FIG.38 |
|---|---|---|
| RUCN2<br>RUCN1<br>RUCN0 | 0<br>1 (3)<br>1 | 0<br>0 (1)<br>1 |
| RUDIR1<br>RUDIR0 | 0<br>1 | 1<br>0 |
| LLCN2<br>LLCN1<br>LLCN0 | —<br>—<br>— | —<br>—<br>— |
| LLDIR1<br>LLDIR0 | —<br>— | —<br>— |

FIG.44C

| SIGNAL | FIG.37 | FIG.38 |
|---|---|---|
| G3<br>G3<br>G1<br>G0 | 0<br>1 (5)<br>0<br>1 | 0<br>0 (3)<br>1<br>1 |
| NO_MATCH | 0 | 0 |

FIG.44D

| SIGNAL | FIG.37 | FIG.38 |
|---|---|---|
| P3<br>P2<br>P1<br>P0 | 0<br>0 (1)<br>0<br>1 | 0<br>0 (1)<br>0<br>1 |

IMAGE DATA PROCESSING SYSTEM AND METHOD REALIZING FINE IMAGE WITH SIMPLE CONSTRUCTION/PROCEDURE

This application is a continuation-in-part of U.S. patent application Ser. No. 07/980,964 filed on Nov. 24, 1992 (now U.S. Pat. No. 5,327,260).

BACKGROUND OF THE INVENTION

1. Field of the Invention

The present invention relates to an image data processing system and method which may be used in an image forming apparatus, using an electrophotographic system processing digital image data, such as an optical printer such as a laser printer, a digital duplicator, a page-printing facsimile device, or an image display device. The present invention in particular relates to image fineness improvement in such apparatus/systems.

2. Related Art

Such image forming device and image display device quantize text image data or picture image data so that the relevant data is expanded into the dot-matrix bit-map format using two-tone data. The text image data is obtained by converting the text code data using font data and the picture image data is obtained by reading in using an image scanner or the like. The bit-map format of the relevant data is formed stored in video memory area in a RAM (random access memory) and is then read out sequentially to be supplied as video data to an image forming unit (engine) or to an image display unit. The image forming unit forms the corresponding image on a recording medium such as a sheet of paper or the like and the image display unit displays the corresponding image on a screen.

An ideal image is an analog image an outline of which may extend in any arbitrary direction continuously. However, such a bit-map image obtained as a result of quantization is a digital image an outline of which may extend in the predetermined two perpendicular dimensions of the dot matrix. If an outline of the digital image extending obliquely or curvedly should be expressed, it is necessary for the outline to extend stepwise along the dot-matrix ruled lines (such phenomenon may be referred to as 'jag') generally obliquely or curvedly. This inevitable property of the digital image may degrade the fineness of the final image, that is, may disable precise representation of an original image or may disable precise representation a desired outline.

Reduction in dot (pixel) size of the dot matrix, that is, increasing the number of dots present in a unit area (increasing the dot-matrix resolution) may reduce such image degradation. However, such resolution increasing raises the cost by a great amount. In one example, obtaining of 600×600 dpi two-dimension bit-map as a result of doubling the resolution of the 300×300 one requires 4 times increase in the memory capacity and 4 times the processing speed increase of the data processing capability.

Other measures for reducing image degradation include interpolation technology which produces a line connecting between adjacent angular edges present on a stepwise outline so as to form a slope therebetween. Another aspect of the interpolation technology smooths brightness between adjacent outline dots so as to make the edge unclear. However, such measures are effective to smooth jags on an outline but may degrade contrasts and/or resolution since fine shapes are made unclear.

In order to solve such a problem, technology has been developed as disclosed in the U.S. Pat. No. 4,544,922. In this technology, a dot having a size smaller than the ordinary size is added or a partial area having the above smaller dot side is removed from an appropriate part of a dot pattern represented by a bit map so as to correct the relevant part. A pattern recognition technology and/or template comparison technology are used to detect a part to be corrected in the dot pattern. The above disclosed technology performs the pattern recognition process or the template comparison process on all the positions of a bit-map image and performs dot correction such as described above appropriately. As a result, although it is possible to improve image quality (image fineness) by smoothing a line shape without degrading contrasts, the relevant processing system is extremely costly and requires very long time.

In order to solve the problem, Japanese Laid-Open Patent Application No. 2-112966 has proposed a method. In this method, a relevant bit-map image is compared with a previously stored predetermined template for each small fragment of the images. Then, if matching in characteristics is detected between the bit-map image and a template for an image fragment, the fragment of the bit-map image is corrected by correction dots. Thus, the image quality in printed images is improved.

In order to realize the above method, a template matching process described below is performed for example. The data of the bit map is converted into the serial data so as to be input to a FIFO (first in first out) buffer, and a subset of the bit-map image of N×M bits is formed. A sample window is used to observe or extract there through data from the subset of bit-map images, which window has a predetermined shape, has a predetermined number of bits and has a central bit corresponding to that of the subset image. Then, the thus observed/extracted data is used to detect matching with templates having various characteristics patterns which patterns are ones of images to be corrected.

If any template matches the observed/extracted data, a certain correction subcell (correction dot) is used to replace the central bit in the relevant subset image. The correction subcell corresponds to the relevant template. If no template matches the observed/extracted data, the relevant central bit is left unchanged.

Such template matching processes are performed by sequentially shifting the subset image to be processed so that all the area of the relevant bit-map image is processed. The processes are performed so that each bit of the bit-map image is assigned to the above central bit sequentially. Thus, in comparison with the above technology disclosed in the United States Patent, a fine final image may be obtained by improving the image quality even with a relatively small memory capacity and with a relatively inferior data processing capability.

However, even in the above method, a great number of templates in the above sample-window formation are necessary corresponding to all the characteristic patterns of images. Matching patterns included in a relevant given bit-map image should be corrected. If such templates should be provided corresponding to all arbitrary shapes of images, the number of templates should be a considerable one. Producing the number of templates requires a considerable manpower and thus requires considerable cost. Further, a considerable capacity of memory is required to store the number of templates. Further, the above described template matching processes require a considerable time.

In order to solve the problems, a person among the inventors of the present invention, together with other persons, has disclosed picture data processing method and its device in Japanese Laid Open Patent No. 5-207282.

The above method can correct jags such as described above so as to improve a resulting image quality using input image data in a bit-map formation. The method can reduce data which should be previously stored in a memory, which data will be used to perform an appropriate correction process on the bit-map image. The method carries out the determination of dots in the input image data to be corrected and the determination of the corresponding correction manners to be applied to the correction-required dots. The method carries out the above determination by means of simple logical operations with an extremely short time period using a microprocessor.

This method will now be briefly described. The method recognizes the characteristics of the line shape of the boundary between a black-dot region and a white-dot region in the bit map of an input image data. As a result, the characteristics are then converted into a multi-bit code for each dot of the input image data. Then, at least a part of the code is used to determine whether or not the relevant dot is one to be corrected. Then, if the dot is determined to be corrected, it is corrected in accordance with manners determined depending on the relevant code. The above determination uses a pattern memory having addresses corresponding to the codes, wherein the appropriate manners to be used for the correction may be determined according to the addresses.

Each of the above code includes a code indicating the slope direction of the line at the position of the relevant dot, a code indicating a manner of the sloping, and a code indicating a position of the relevant dot. The above position is one, the origin of which is the initial dot in the series of dots straightly arranged vertically or horizontally and including the relevant dot.

In the above method, it is not necessary to provide and store as templates all characteristic patterns, corresponding to ones to be corrected. The method can carry out the determination of dots to be corrected and the determination of the manners of correction for the correction-required dots simply and within a short time period using the codes which can be produced easily, described above.

Further, dot data of dots present in an area, the center of which is the relevant dot, is extracted through an appropriate window. The area is separated into a core area located at the center and a plurality of peripheral areas located peripheral of the core area. The above code is produced based on recognition information obtained as a result of recognizing the line shape as mentioned above. The recognition information to be used to produce the code is the combination of core-area recognition information and peripheral-area recognition information. The core-area recognition information is obtained using the core area of the image data and the peripheral-area recognition information is obtained using at least one peripheral area of the image data. At least one peripheral area is determined using the core area of the image data. Thus, it is possible to reduce the amount of information to be used in the production of the above codes so that the code production can be carried out efficiently.

SUMMARY OF THE INVENTION

An object of the present invention is to provide an image data processing system and method which are obtained by improving the above described system and method. The above improvement includes improvement in the resolution of resulting images, that is, improvement in the quality of resulting images. The above improvement also includes further reduction of the amount of data which should be previously stored in a memory, which data will be used for the above image quality improvement. The above improvement also includes enablement of use of the relevant system in various ways. The above improvement also includes improvement in efficiency of image-data manipulation.

In order to achieve the above object of the present invention, the image data processing system and method replicates the image data. That is, in the signal of the image data, the same waveforms are repeated. Thus, the bit map made from the image data becomes that having the double dimension for example. The double dimension of the bit map is obtained by doubling each line thereof so that each bit is doubled in the direction perpendicular to the lines. Each pair of the same bits is used to correct the jags and the doubling of the bits effects the doubling of the resulting image resolution and improvement of the resulting image quality.

Further, timing signal generating means is provided within the system. Thus, the timing control of the above data replication operation is carried out With synchronization of the timing given by the timing signal generating means. Further, the number N of times by which the image data is replicated may be set. Thus, the image data resolution can be multiplied by N. Thus, the image quality of the resulting image can be improved by performing the jag-correction operation using the N-times resolution image data.

Further, the image data newly created by the replication operation may be numbered using suitable codes. Thus, it is possible to properly identify the newly created image data.

Further, the correction-manner instruction information (or the correction data to be used to replace the input original data) required to perform the jag correction is reduced in amount without degrading the significant jag correction function so as to reduce the memory capacity required to store the information.

Further, a table memory and a pattern memory are used as the above memory to store the correction-manner instruction information. Thus, it is possible to replace the above correction-manner instruction information with another one so that various correction patterns may be obtained.

Further, the image data which has undergo the jag correction operation is directly used as data controlling the laser-diode light emission power. Thus, the image-data processing speed may be improved.

Further, appropriate software for a CPU or the like is used to manipulate (magnification or size reduction) a final image and the manipulation operation uses any image data of that resulting from the different (black and white) dot boundary-line shape recognition, that obtained from the table memory, and that obtained from the pat tern memory.

It is also possible to perform the jag correction operation on the image data obtained as a result of performing the desired image manipulation. It is also possible to perform both the jag correction and the image manipulation epoerations in parallel.

The image data processing system may be used in two manners in which either the clock signal, synchronized with the system clock, generated within the system or that supplied outside the system may be used.

Further, by determining a plurality of windows to define the corresponding respective areas in the bit map, it is possible to perform various types of jag-correction operations on areas arbitrarily. Thus, it is possible to control the final image freely and various manners of image modification can be performed on the image data so as to realize the desired final image.

By determining a window priority for the thus determined plurality of windows, it is possible to determine two windows such that the corresponding areas overlap with one another.

Further, it is possible to set various modes of image manipulating process in addition to and to be carried out together with such jag correction process and it is possible to determine for each window whether or not such modes of processing will be carried out or which mode of image manipulating process is to be carried out.

Thus, the image data processing system and method according to the present invention performs jag correction removing jags from resulting images. Thus, the image quality in the resulting images may be improved. Further, the system and method require a small amount of data which should be previously stored in a memory, which data is necessary in the above jag-correction operation. Further, the system and method require a short time period for the jag-correction operation. Further, it is also possible to improve image-data resolution, to use the system in various manners, and to further perform various types of image manipulation processes in addition to the jag-correction process.

Other objects and further feature of the present invention will become more apparent from the following detailed description when read in conjunction with the accompanying drawings.

BRIEF DESCRIPTION OF THE DRAWINGS

FIG. 14 shows comparatively memory capacities required for the respective memory blocks shown in FIGS. 10, 11, 12 and 13;

FIG. 25 Shows a block diagram of an embodiment construction in which a window-area image-data processing-mode setting means is further provided in the dot correction unit 7 shown in FIG. 23;

FIGS. 26A, 26B, 26C, 26D and 26E illustrate an operation in the construction shown in FIG. 25;

FIGS. 30A, 30B, 30C, 30D, 30E, 30F, 30G, 30H and 30I illustrates an operation in the timing-signal generating means shown in FIG. 29;

FIGS. 33A, 33B, 33C, 33D, 33E, 33F and 33G illustrate various types of line recognition patterns for recognizing a vertical line or approximately vertical oblique line in the above core area;

FIGS. 42A an 42B illustrate a correction example which the dot correction unit shown in FIG. 4 performs the dot correction for an approximately horizontal line and the corresponding laser pulse-width chart;

FIGS. 43A an 43B illustrate a correction example which the above dot correction unit 7 performs the dot correction for an approximately vertical line and the corresponding laser pulse-phase chart; and FIGS. 44A, 44B, 44C and 44D show data obtained as a result of recognizing patterns of relevant dots (the central dots in the core areas 73C) for the FIGS. 37 and 38 cases by means of a pattern recognizing unit 74 shown in FIG. 4.

DESCRIPTION OF THE PREFERRED EMBODIMENTS

Figure 1:
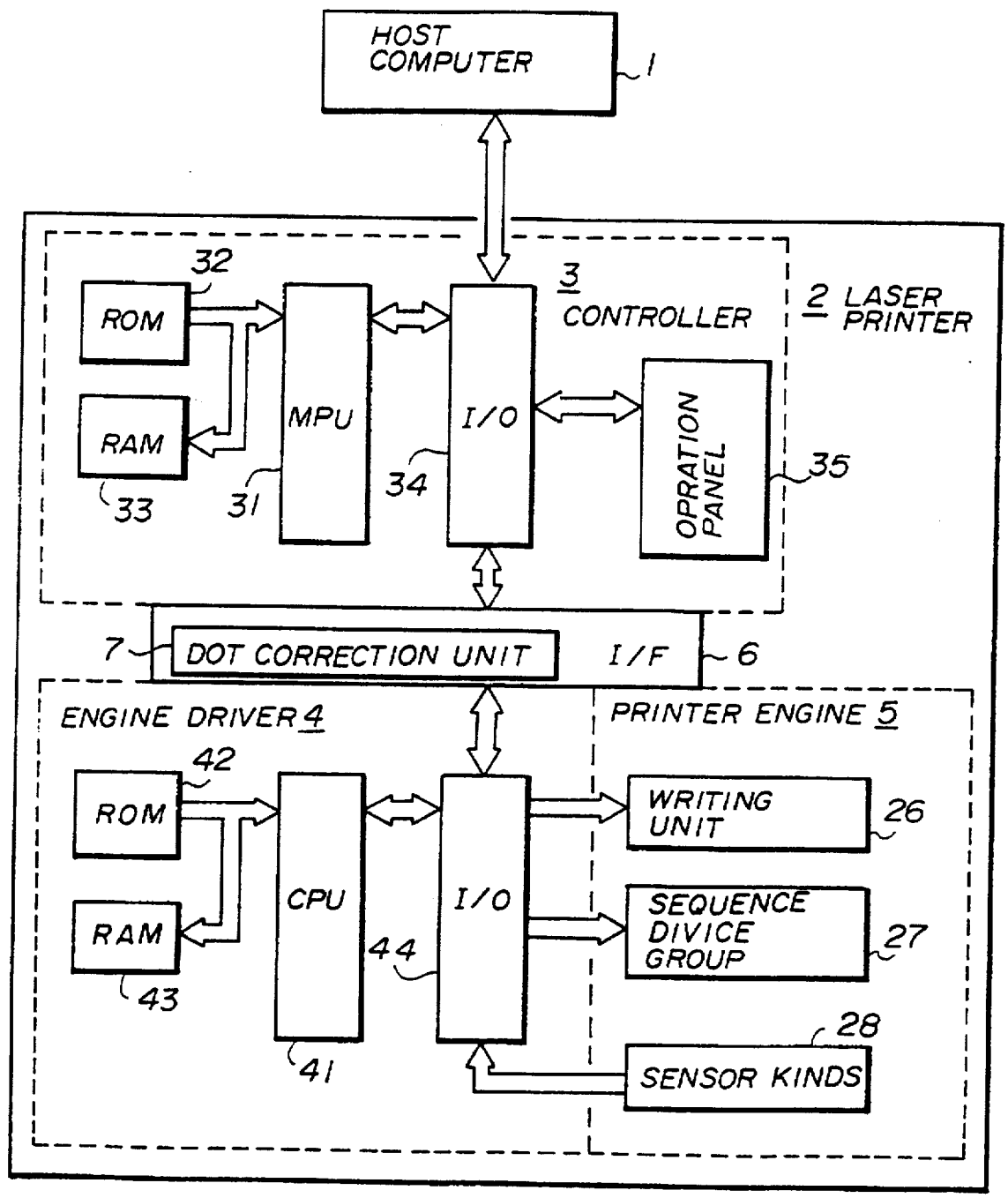
FIG. 1 shows an outline block diagram of a control system in a laser printer in an embodiment of the present invention together with a host computer.

A laser printer in an embodiment of an image data processing system and method according to the present invention will now be described with reference to FIG. 1.

The laser printer 2 includes a controller 3, an engine driver 4, a printer engine 5 and an internal interface 6.

The laser printer 2 receives printing data from a host computer 1 and the controller 3 converts the printing data into bit-map data for each page. The controller 3 then converts the bit-map data into video data, being dot information, which drives a laser The controller 3 sends the video data to the engine driver 4 via the internal interface 6 so that the printer engine 5 is driven by the engine driver 4. Thus, the printer engine 5 forms the relevant visible image on a sheet.

A dot correction unit 7 is provided in the internal interface 6 and the unit 7 uses the image data processing system and method according to the present invention. The unit 7 performs a dot, correction of which will be described, in the above video data supplied by the controller 3. Thus, the image quality is improved in the printed visible image.

The controller 3 includes a main microcomputer (which will be referred to as MPU hereinafter) 31 and a ROM 32 which previously stores therein programs used by the MPU 31, constant data, text-font data and so forth. The controller 3 further includes a RAM 33 for storing temporary data, dot-pattern data and so forth therein, an I/O 34 for controlling data input/output and an operation panel 35 which is connected to the MPU 31 via the I/O 34. The above components are connected with one another by means of data buses, address buses, control buses and so forth.

The host computer (machine) 1 and the internal interface 6 including the dot correction unit 7 are connected to the MPU 31 via the I/O 34.

The engine driver 4 includes a sub-microcomputer (which will be referred to as CPU hereinafter) 41 and a ROM 42 which previously stores therein programs used by the MPU 41, constant data and so forth. The engine driver 4 further includes a RAM 43 for storing temporary data therein and an I/O 44 for controlling data input/output. The above components are connected with one another by means of data buses, address buses, control buses and so forth.

The I/O 44 connected to the internal interface 6 inputs the video data from the controller 3 and also inputs the states of various kinds of switches provided on the operation panel 35. The I/O 44 outputs an image clock signal (WCLK) and status signals such as a paper-ending signal to the controller 3.

Further, the I/O 44 is also connected to a writing unit 2, a sequence device group 27 and various kinds of sensors 28 including a synchronous sensor which will be described. These components are included in the printer engine 5.

The controller 3 receives commands such as printing instructions and the printing data such as text data, graphical-image data and so forth from the host computer 1. The controller 3 edits the thus received printing data and the controller 3 obtains the corresponding dot patterns if the printing data includes the text data. Such dot-patterns may be obtained as the text fonts stored in the ROM 32 and will be used to print out the corresponding texts. The controller 3 forms the corresponding bit-map data consisting of texts and graphical images (two of which will be simply referred to as images hereinafter). The controller 3 then stores the bit-map data into a video-RAM area in the RAM 33, in a bit-map format for each page.

The controller 3 receives a ready signal and image clock signal WCLK supplied by the engine driver 4. Thus, the controller 3 outputs the bit-map data (dot pattern data) stored in the above video-RAM area in the RAM 33 as mentioned above. The thus output data acts as the video data and is supplied to the engine driver 4 via the internal interface 6 in synchronization with the clocks of the image clock signal WCLK. The video data is data which will undergo a dot correction operation, which will be described, by means of the dot correction unit 7 in the internal interface 6.

The operation panel 35 has various switches and indicators which are not shown in the figure. An operator uses such switches for specifying various instructions and data to the laser printer 2. The operation panel 35 thus transfers the thus obtained information to the engine driver 4 and displays various states in the printer 2 through the indicators.

The engine driver 4 uses the video data supplied by the controller 3 via the interface 6. Thus, the engine driver 4 controls the writing unit 26, the sequence device group 27 and so forth. The sequence device group 27 includes an electrifying charger and a developing unit. The engine driver 4 inputs thereto the video data via the internal interface 6 and outputs the video data to the writing unit 26. The engine driver 4 further inputs thereto signals, indicating states of various parts in the engine, from the various kinds of sensors 28. The engine driver 4 suitably processes the thus input signals. The engine driver 4 outputs, the status signals such as an error state signal such as a paper ending state signal and other information necessary to be supplied, to the controller 3 via the interface 6.

Figure 2:
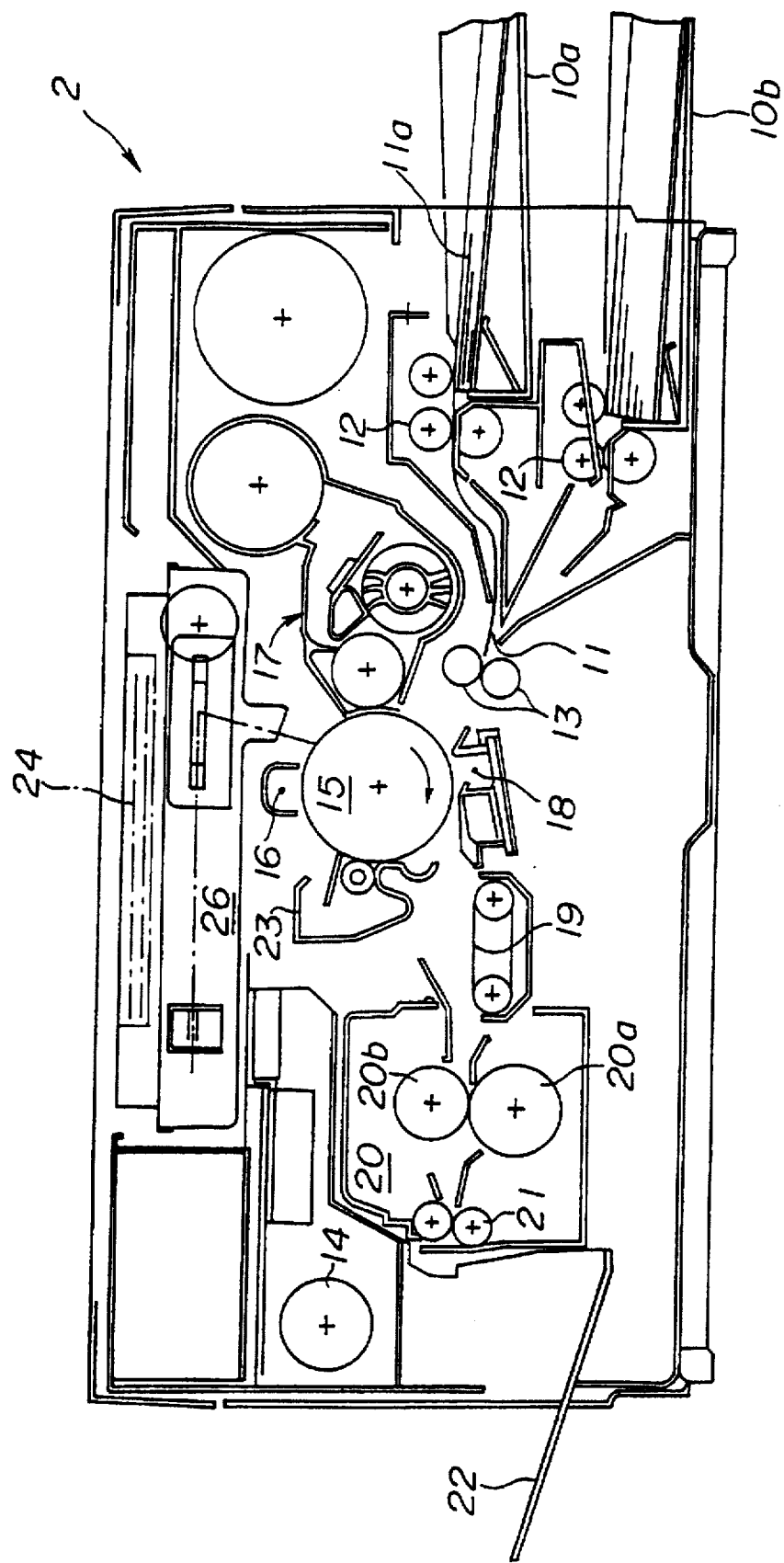
FIG. 2 shows an outline elevational sectional view of a mechanical outline construction of the above laser printer.

With reference to FIG. 2, a mechanical construction of the printer engine 5 in the laser printer 2 will now be described.

The laser printer 2 supplies sheets of paper 11 from either top or bottom paper-supply cassettes 10a or 10b. A sheet 11 is assumed to be supplied the sheet stack 11a of the top paper-supply cassette 10a for example via a paper-supply roller 12. The sheet 11 is carried to the image transfer position on a photosensitive-matter drum 15 as a result of the movement timing of the sheet 11 being controlled by a registration roller pair 13.

The main motor 14 rotates the photosensitive-matter drum 15 in a direction indicated by an arrow in the figure. The surface of the drum 15 is electrified by means of the electrifying charger 16 and then an electrostatic latent image is formed on the surface of the drum 15 as a result of a spotlight being appropriately scanned on the surface of the drum 15. The above spotlight is supplied by the writing unit 26 and is PW-modulated.

The electrostatic latent image formed on the surface of the drum 15 is converted into the visible image as a result of toner being adhered on the surface appropriately. The thus formed visible toner image is transferred onto the above sheet 11 by the effect of a transfer charger 18. Then, the sheet 11, on which the toner image has been transferred, is removed from the drum 15 and conveyed to a fixing unit 20 by means of a carrying belt 19. Then, a pressing roller 20a in the unit 20 presses the sheet 11 onto a fixing roller 20b in the unit 20. Then, the pressure and the temperature of the fixing roller 20b effect fixing the toner image present on the sheet 11 onto the sheet 11.

The sheet 11 is then ejected from the unit 20 and then conveyed, by means of a ejecting roller 21, to an ejecting tray 22 provided at a side of the printer 2.

The toner left unused on the surface of the drum 15 is removed by a cleaning unit 23 and then collected.

The laser printer 2 has a plurality of printed circuit boards 24 at the top part in the printer 2 as shown in FIG. 2. The printed circuit boards 24 embody the above-described controller 3, engine driver 4 and internal interface 6.

Figure 3:
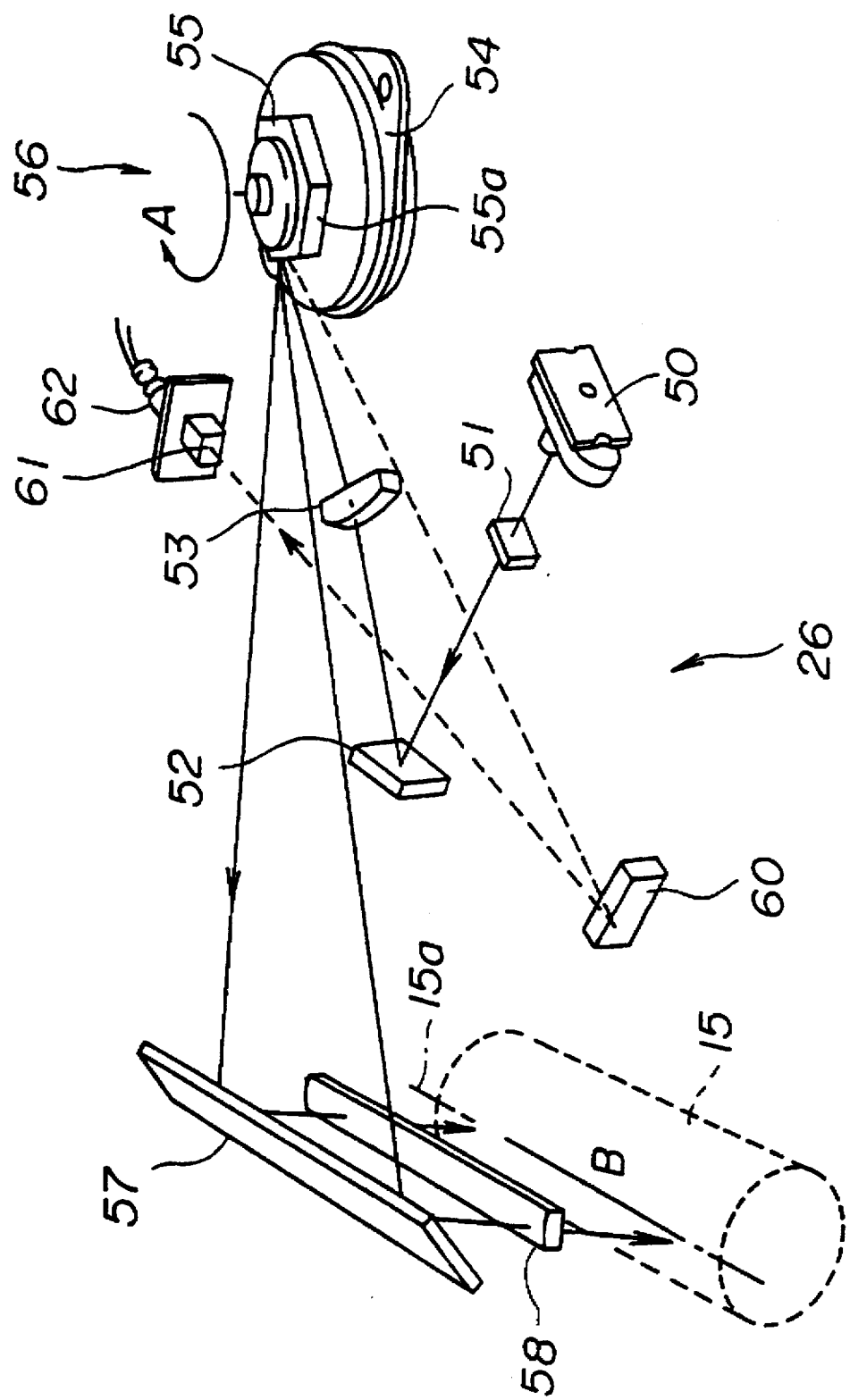
FIG. 3 shows a perspective view of an embodiment of essential components of an optical system of a writing unit 26 in the construction shown in FIG. 2.

With reference to FIG. 3, an embodiment of the writing unit 26 will now be described.

The unit 26 includes a laser diode unit (which will be referred to as a LD unit) 50, a first cylinder lens 51, a first mirror 52, an image formation lens 53, a rotational polarizer 56 including a disc-shaped motor 54 and a polygon mirror 55 rotated by the motor 54 in an A direction indicated in the figure, a second mirror 57, a second cylinder lens 58, a third mirror 60, a light-converging lens 61 of a cylinder lens and a synchronous sensor 62 of a photosensitive element. The above LD unit 50 has a laser diode (which will be abbreviated as the LD) and a collimator lens integrated inside the unit 50. The collimator lens changes a divergent beam emitted by the LD into a parallel beam.

The first cylinder lens 51 changes the form, in the sub-scan direction on the surface of the drum 15, of the parallel beam supplied by the LD unit 50. The image-forming lens 53 changes a parallel beam reflected by the first mirror 52 into a convergence beam and then the beam emitted by the image-forming lens 53 is incident on one of mirror surfaces 55a of the polygon mirror 55.

Each the mirror surfaces 55a of the polygon mirror 55 has a curved shape so that the polygon mirror 55 is an R polygon mirror. Thus, it is possible to eliminate a fΘ lens which would conventionally have been disposed between the polygon mirror 55 and the second mirror 57. The rotational polarizer 56 is one of a post object type in which a light beam is incident on a polarizer after being converted into a converging beam.

The second mirror 57 reflects the beam which has been reflected and polarized by the rotational polarizer 56. The thus reflected beam is a scan beam and is incident on the photosensitive-matter drum 15 via the second cylinder lens 58. The scan beam thus converges to form a sharp spot on the surface of the drum 15 on a main scan line 15a.

The third mirror 60 is disposed at a position outside the zone on the drum 15, within which zone the light beam scans, which beam has been reflected by the rotation polarizer 56. The third mirror 60 reflects incident light to the synchronous sensor 62. The beam reflected by the third mirror 60 is then converged by the convergence lens 61 so that the resulting beam is received by the synchronous sensor 62. The sensor 62, including a photosensitive element such as a photo-diode, receives the above beam and converts it into a synchronous signal to be used to fix the scan starting position.

Figure 4:
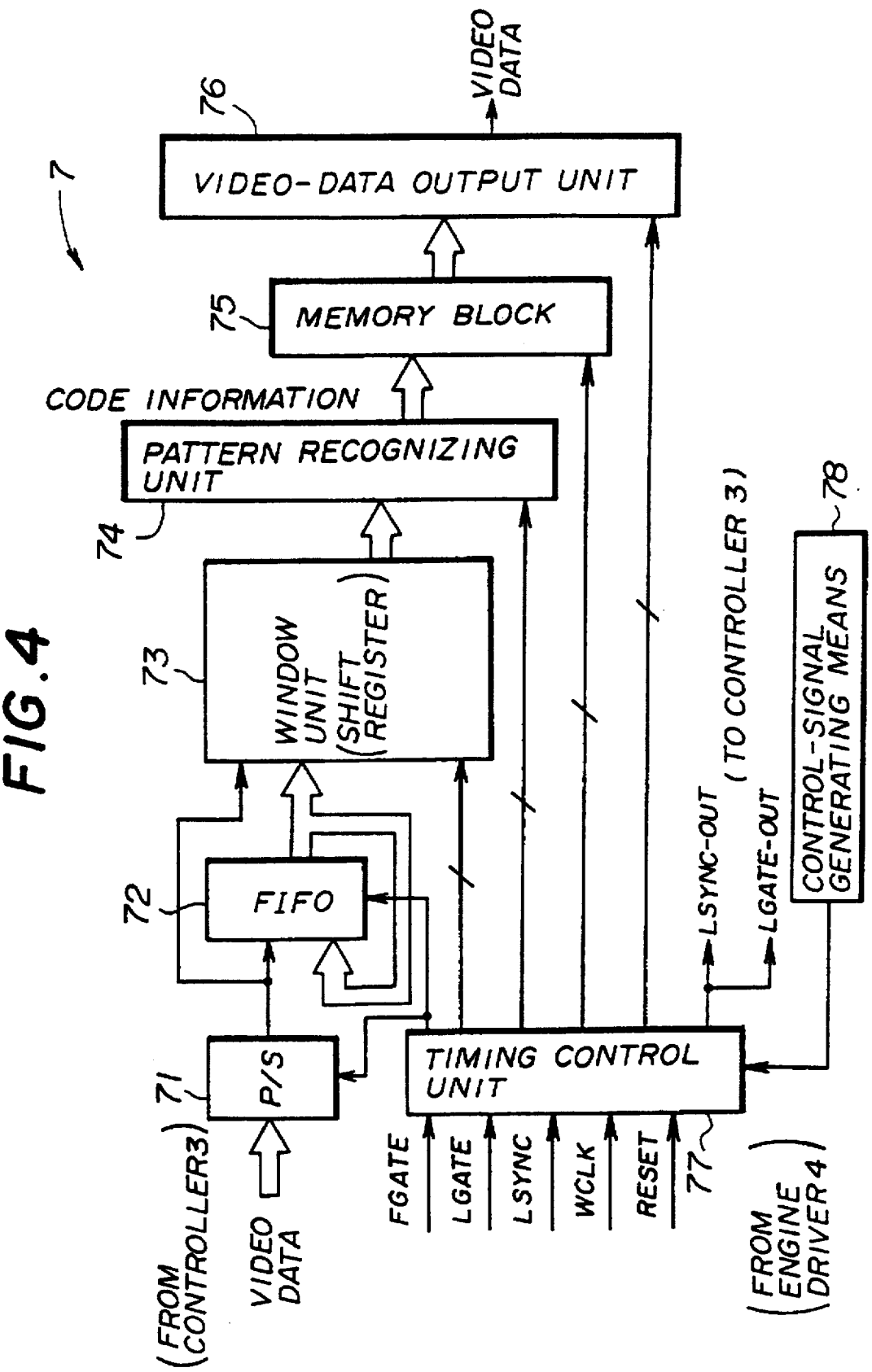
FIG. 4 shows a block diagram of an embodiment of a dot correction unit in the construction shown in FIG. 1.
Figure 5:
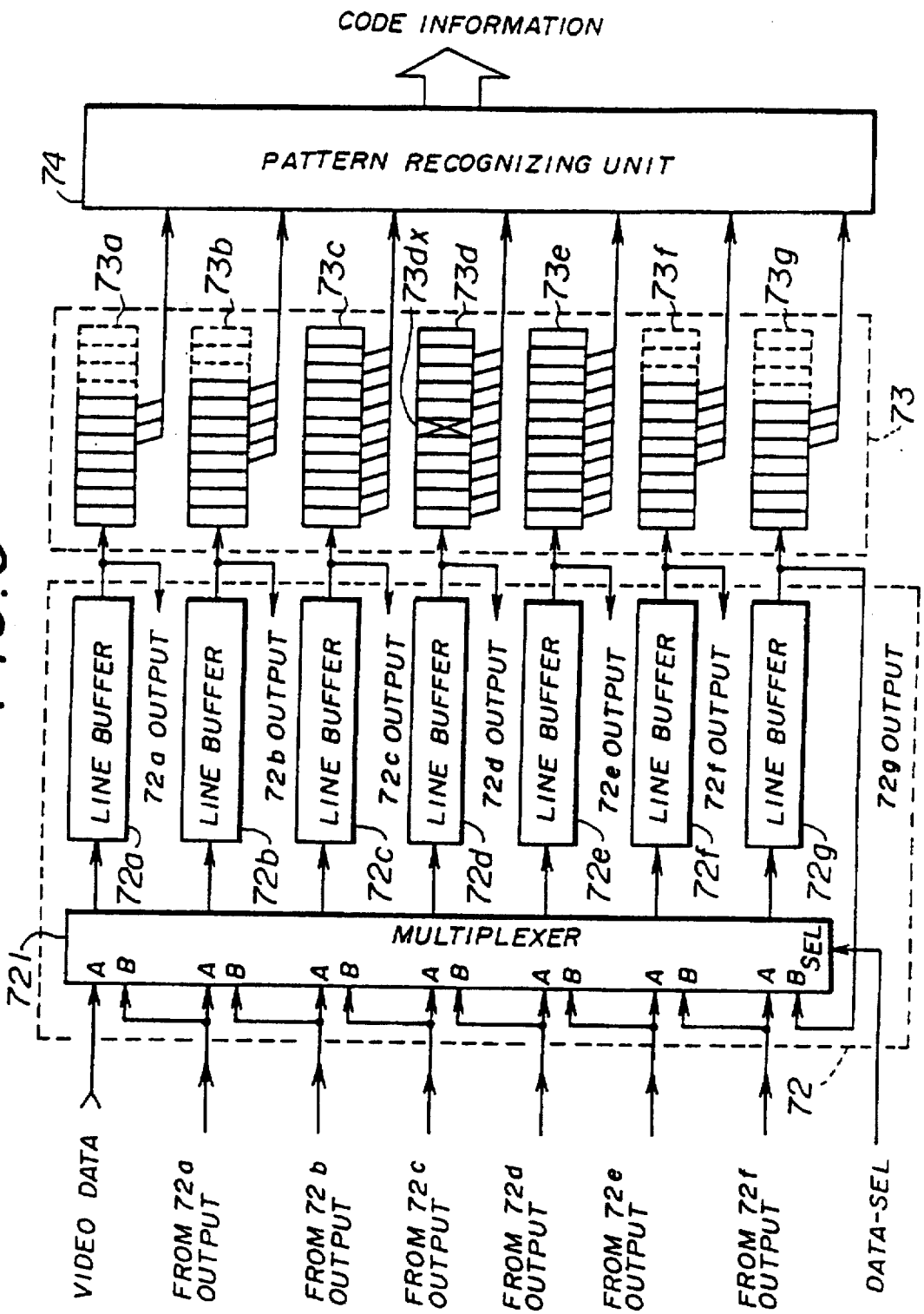
FIG. 5 shows a block diagram of an embodiment of a FIFO memory 72 and a window unit 73 in the construction shown in FIG. 4.

With reference to FIGS. 4 and 5, the above dot correction unit 7 will now be described.

The dot correction unit 7 includes a parallel/serial converter (which will be referred to as P/S converter hereinafter) 71, a FIFO memory 72, a window unit 73, a pattern recognizing unit 74, a memory block 75, a video data outputting unit 76 and a timing control unit 77 which controls the above components so that the components operate in synchronization with one another.

The P/S converter 71 is provided for converting the video data supplied by the controller 3 shown in FIG. 1 into the one-bit serial data if the video data is originally 8-bit parallel data. The thus converted 1-bit serial data is then supplied to the FIFO memory 72. Thus, the P/S converter 71 is not a component which is essential in the dot correction operation. The P/S converter 71 is not necessary if the video data supplied by the controller 3 is serial data.

The FIFO memory 72 includes line buffers 72a through 72g connected to one another in serial via a multiplexer 721 which the FIFO memory 72 also includes, as shown in FIG. 5. The line buffers 72a through 72g stores therein the video data of an amount of a plurality of lines (7 lines in this embodiment) in an image, which video data has been supplied by the controller 3.

If a timing control unit 77, which will be described, supplies the value "0" as a data-sel signal, the multiplexer 721 selects A-input data shown in FIG. 5. That is, the multiplexer inputs the video data supplied by the controller 3 via the P/S converter 71, the 72a-output data, 72b-output data, 72c-output data, 72d-output data, 72e-output data and 72f-output. Then, the multiplexer 721 outputs the thus input data to the respective line buffers 72a through 72g. If the timing control unit 77 supplies the value "1" as the data-sel signal, the multiplexer selects B-input data. That is, the multiplexer inputs the 72a-output data, 72b-output data, 72c-output data, 72d-output data, 72e-output data, 72f-output and 72g-output data. Then, the multiplexer 721 outputs the thus input data to the respective line buffers 72a through 72g.

Figure 6:
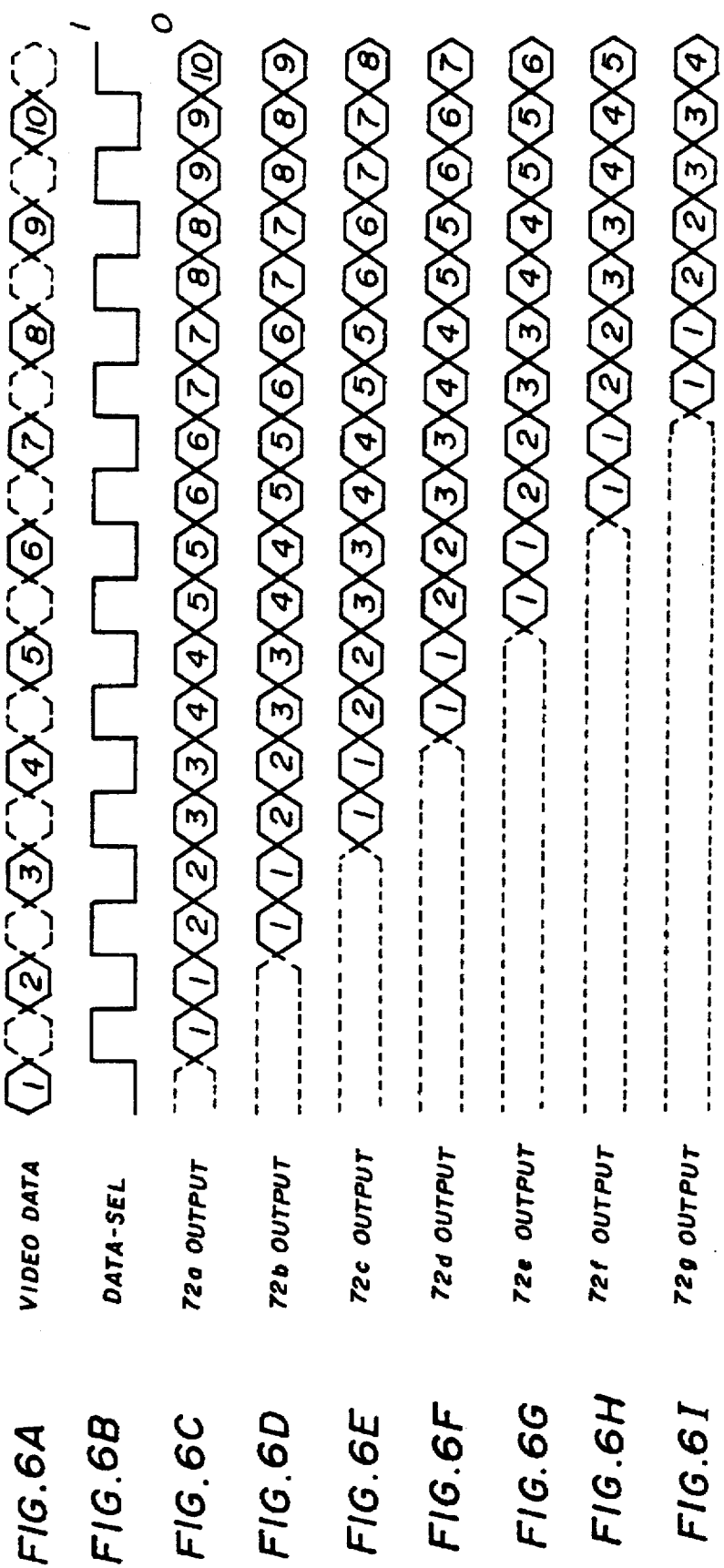
FIGS. 6A, 6B, 6C, 6D, 6E, 6F, 6G, 6H and 6I show timing charts illustrating an example of operations in the FIFO memory 72 shown in FIG. 5.
Figure 7:
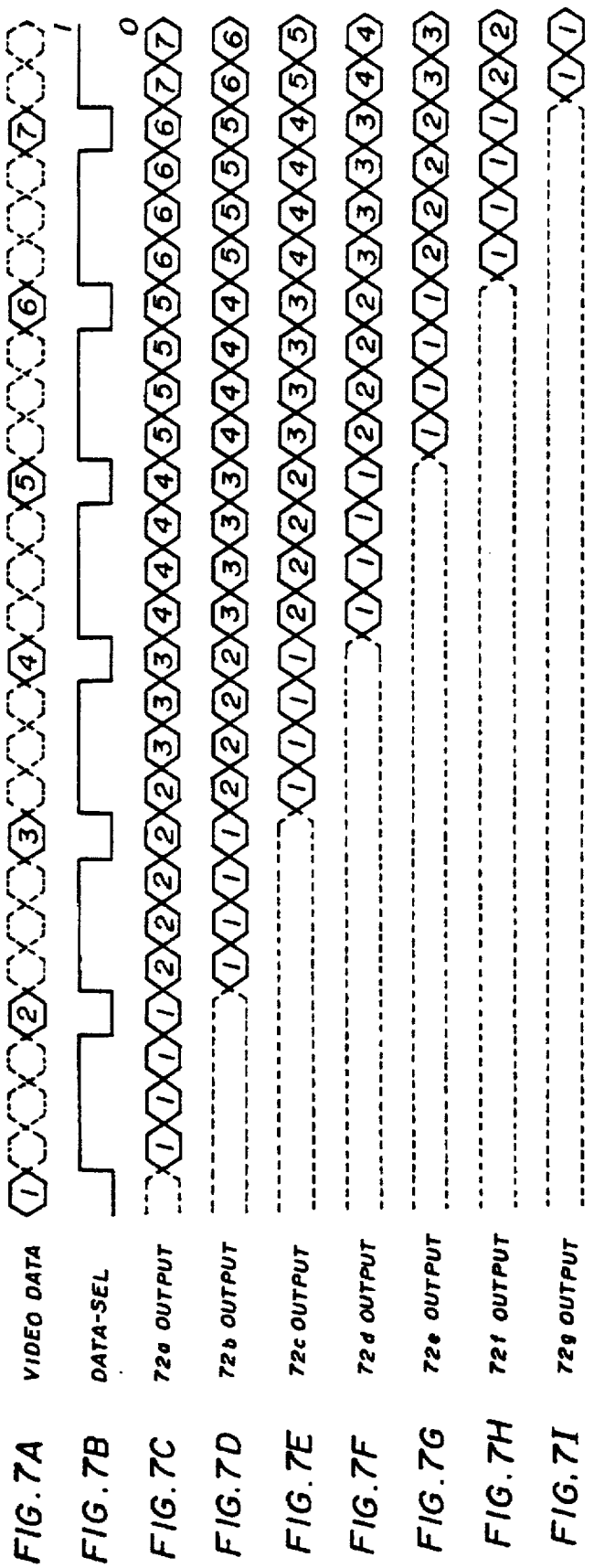
FIGS. 7A, 7B, 7C, 7D, 7E, 7F, 7G, 7H and 7I show timing charts illustrating another example of operations in the FIFO memory 72 shown in FIG. 5.

Thus, the line buffers 72a through 72g of the FIFO memory 72 supply data shown in FIGS. 6C through 6I and 7C through 7I in response to the video data as shown in FIGS. 6A and 7A being supplied, according to the data-sel signals shown in FIGS. 6B and 7B.

Thus, each of the line buffers 72a through 72g writes thereto the bit of the data supplied thereto and reads therefrom the bit of the data which has been stored therein, according to the FIFO manner, the one-bit writing operation and the one-bit reading operation being carried out simultaneously. Thus, the FIFO memory 72 acts as image data generating means.

Figure 8:
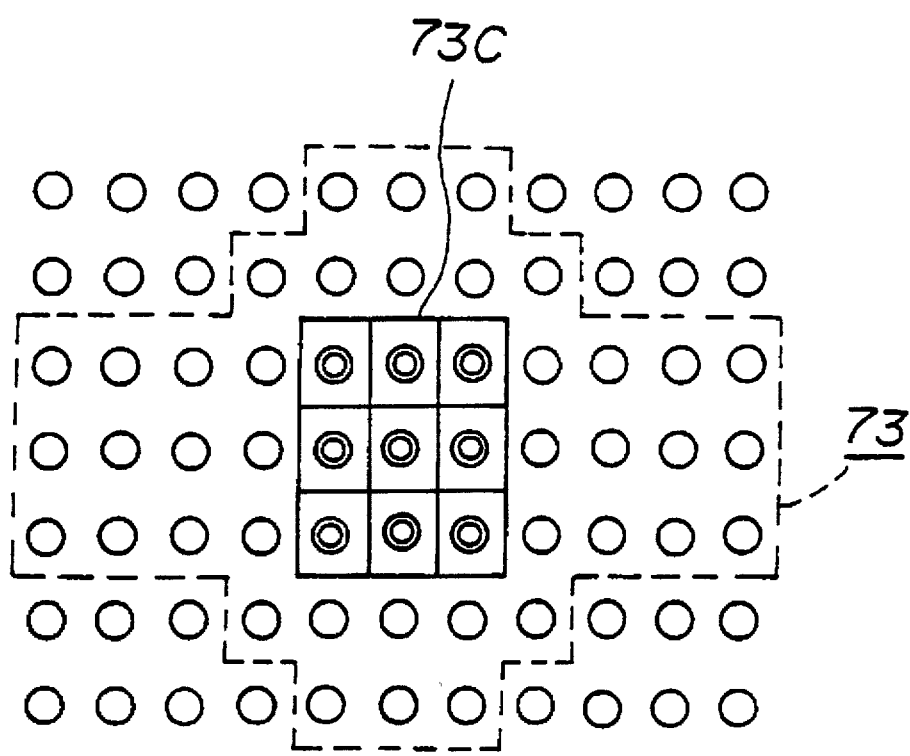
FIG. 8. Shows an example of sample window realized by the window unit shown in FIG. 5.

As shown in FIG. 5, the window unit 73 includes 711-bit shift registers 73a through 73g for the seven lines of image data output by the 7 line buffers 72a through 72g. The 11 bit-areas of each shift register are connected in series to the respective one of the above line buffers. These 7 shift registers 73a through 73g correspond to a window (sample window) which is used to detect a pattern in the image represented by input video data. FIG. 8 shows an example of a shape of such a window.

In the window unit 73, a bit area 73dx shown in FIG. 5, the middle position of the middle shift register 73d, is for storing a relevant dot (meaning a dot which is currently processed) among the dots defined by the window. Among the bit positions of the 7 shift registers 73a through 73g, the bit positions shown by broken lines in FIG. 5 may be omitted if the window shape shown in FIG. 8 is used. That is, each of the shift registers 73a and 73g should have 7 bit positions and each of the shift registers 73b and 73f should have 8 bit positions.

Bits of input video data successively move through the line buffers 72a through 72g and the shift registers 73a through 73g bit by bit. By this movement, a bit corresponding to the above relevant dot changes into another bit sequentially. Finally all the bits of input video data are thus the relevant dot. Thus, the respective windows 73 can be obtained successively for all the bits, each bit corresponding to the respective one of the relevant dots of the windows, of input video data.

The pattern recognizing unit 74 recognizes the characteristics of a shape appearing in each window 73 using the corresponding dot information obtained from the window unit 73. Such a shape is in particular a shape of the boundary between a black-dot region and a white-dot region present on and around the relevant dot in the window 73. The unit 74 then, after recognizing such characteristics, converts the characteristics into a predetermined format of code information which is then output from the unit 74. Such code information is used as an address code indicating the address in the memory block 75 shown in FIG. 4.

Figure 9:
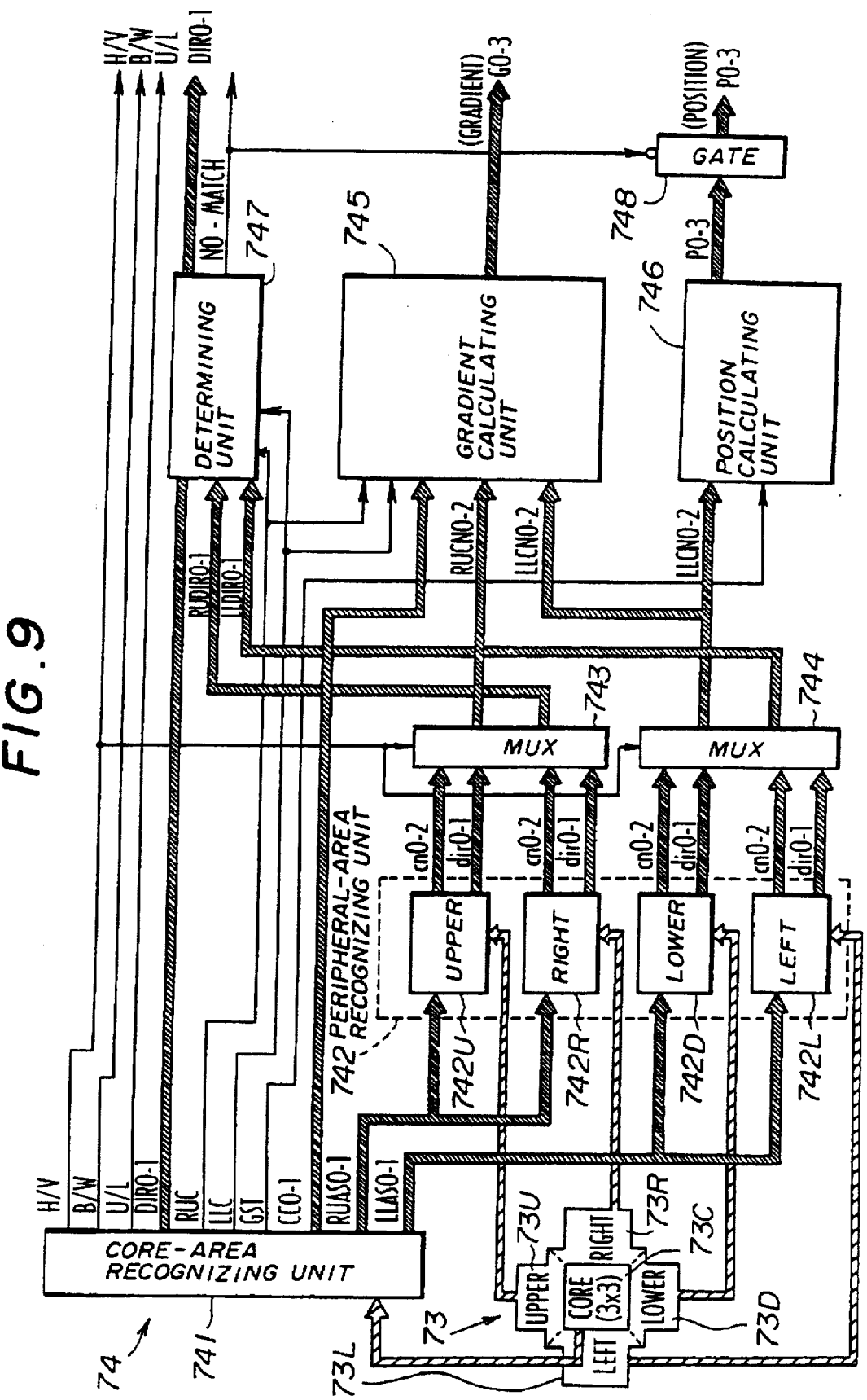
FIG. 9 shows a block diagram of a construction embodiment of pattern recognition unit 74 shown in FIG. 4 and the relevant output signals.

With reference to FIG. 9, an internal construction in the above pattern recognizing unit 74 in connection with windows 73 such as mentioned above will now be described.

With reference to FIGS. 34A through 34D, each window 73 consists of a core area 73C located at the center of the window and formed of 3×3 dots, an upper area 73U, a lower area 73D, a left area 73L and a right area 73R. The areas 73U, 73D, 73L and 73R are located around the core area 73C as shown in the figures. They will be described later.

The pattern recognizing unit 74 includes a core-area recognizing unit 741, a peripheral-area recognizing unit 742, a multiplexer 743, 744, a gradient calculating unit 745, a position calculating unit 746, a determining unit 747 and a gate 748. The peripheral-area recognizing unit 742 includes an upper-area recognizing unit 742U, a right-area recognizing unit 742R, a lower-area recognizing unit 742D and a left-area recognizing unit 742L.

Each unit has the same function as the corresponding unit described in the above-mentioned Japanese Laid Open Patent No. 5-207282 and being described later.

Embodiments of block formations and operation thereof of the memory block 75, according to the present invention, shown in FIG. 4, that is, correction data output means will now be described with reference to FIGS. 10 through 13.

The embodiment shown in FIG. 10 will now be described. This embodiment is the same as that described in the above application No. 5-207282. The memory block 75 only includes a pattern memory 752. Code information such as mentioned above supplied by the pattern recognizing unit 74 is used as the corresponding address in the pattern memory 752. Thus, a previously stored correction data is read out from the pattern memory 752 as the data is stored in the address indicated by the code information. Correction data stored in the pattern memory represents image parts (dot patterns) which will be used to replace image parts represented by input image data. Thus, the input image data is corrected. The thus read correction data is then used to as video data for driving a laser. Thus, the correction data becomes the dot pattern resulting from the correction having been performed.

The embodiment shown in FIG. 11 will now be described. Also in this embodiment, the memory block 75 only includes a pattern memory 752. The differences between the FIG. 10 embodiment and the FIG. 11 embodiment will now be described. Correction data is read out from the pattern memory 752 as both code information is supplied by the pattern recognizing unit 74 and other code information is supplied by timing-signal generating means provided in the timing control unit 77 shown in FIG. 4. The code information is used as the address in the pattern memory 752. Code information supplied by the timing control unit 77 indicates a replicated order of relevant data. Such a replicated order of relevant data will now be described. In the embodiment of the present invention, each set of video data, which has been supplied by the controller 3 shown in FIG. 1 to the dot-correction unit 7, is replicated through the above-described function of the FIFO memory 72. The replication operation is executed during a time period the data-sel signal shown in FIGS. 6B and 7B has the high-level value. In the case shown in FIGS. 6A through 6I, each set of video data is once replicated and in the case shown in FIGS. 7A through 7I, each set of video data is thrice replicated. Particularly in a case, such as shown in the FIGS. 7A through 7I, in which replication is carried out many-times, thus replicated sets (which will be referred as copies) of video data are identified as to in which order each copy has been replicated. In the case shown in FIGS. 7A through 7I, each set of data has three copies, a first-order copy (first obtained from the original set of data), a second-order copy (second obtained from the original set of data) and a third-order (third obtained from the original set of data) copy. The above code information supplied by the timing control unit 77 indicates such a order of each copy data. This code information is represented by 4-bit data A12–A15 shown in FIG. 11. The code information supplied by the pattern recognizing unit 74 is represented by 12-bit data. Thus, total 16-bit data is used as an address in the pattern memory 752 shown in FIG. 11.

Advantages obtained by the FIG. 11 embodiment in comparison to the FIG. 10 embodiment will now be described. As a result of data replication such as described above, data supplied to the pattern recognizing unit 74 includes identical sets of data for each original set of data and the corresponding sets of code information are supplied to the pattern memory 752 by the unit 74 as 12-bit data. 4-bit replicated-order data such as described above is also supplied to the pattern memory by the timing control unit 77 in addition to the above 12-bit data. Thus, it is possible to store different sets of correction data in the pattern memory 752 for such identical sets of input data with different replicated orders. In this embodiment of the present invention, the above replication operation generates many identical sets of image data for each line of the original image represented by input image data. The pattern recognizing unit 74 recognizes the line shapes represented, in a bit-map format, by many identical sets of image data. As a result, the thus obtained sets of code information are identical. These identical sets of code information can be identified by the 4-bit replicated-order data A12–A15. Concrete examples of correction operation using such replicated-order identification will be described later with reference to FIGS. 17A through 17F.

A FIG. 12 embodiment will now be described. In this embodiment, the memory block 75 includes a table memory 751 in addition to the pattern memory 752. 12-bit code information supplied by the pattern recognizing unit 74 and 4-bit code information A12–A15 such as described above are supplied to the table memory 751. Other code information indicating the addresses in the pattern memory 752 is stored in the table memory 751. The appropriate set of code information is read out from the table memory 751 according to the above 12-bit data and 4-bit data. Then, according to the address, in the pattern memory 752, specified by the thus read set of code data, the appropriate set of correction data is read out from the pattern memory 752.

Figure 11:
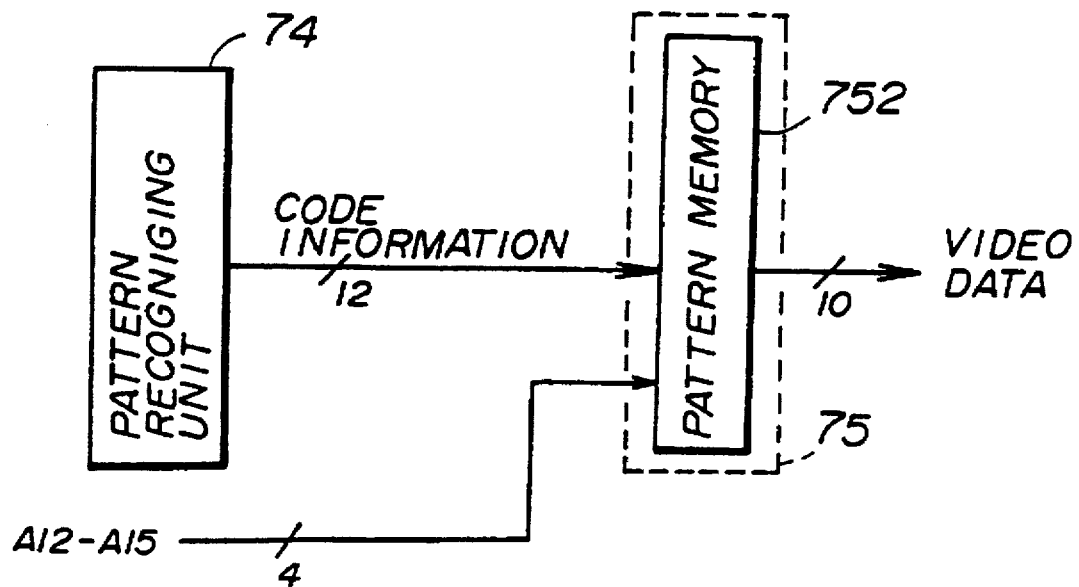
Figure 12:
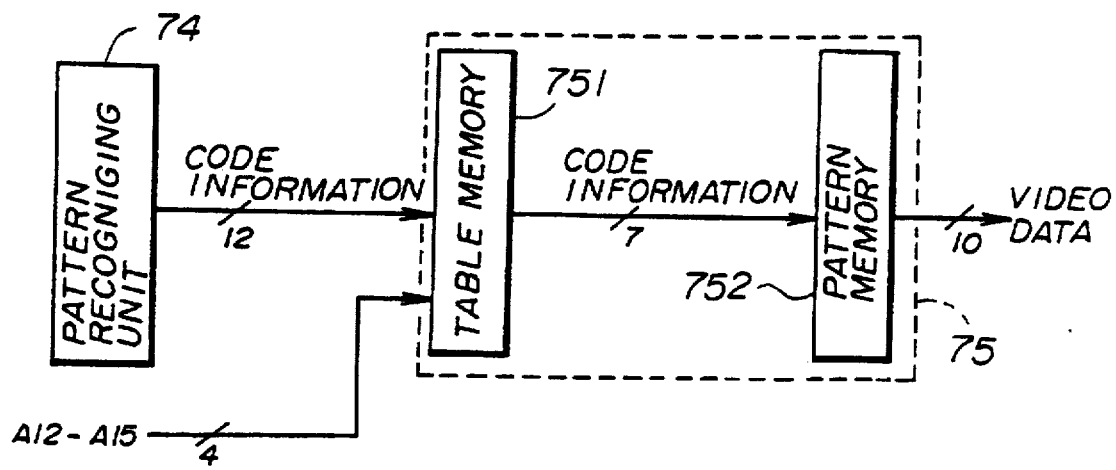

A formation such as that shown in FIG. 12 is effective under an assumption which may be applied to many cases in the image forming technology field and will now be described. In the FIG. 11 embodiment, the pattern memory 752 has a number of sets of correction data and this number is the same as the number of possible different sets of code information which may be supplied by the pattern recognizing unit 74. However, a number of sets of correction data, that is, a number of dot patterns to be used to replace original image parts need not necessarily be the same as the demanded number of sets of code information (image-part patterns represented by input image data) which may be supplied by the pattern recognizing unit 74. That is, many possible different image-part patterns of input data require to be replaced by a common dot pattern for the purpose of jag correction such as described above. This is the above assumption and is a fact under the condition that an efficient and effective jag correction is attempted. If the above assumption is applied to the FIG. 11 embodiment, the pattern memory 752 has many sets of identical data sets, that is, has many sets of identical dot patterns. The FIG. 12 embodiment can eliminate such doubled (or more times replicated) dot patterns from the pattern memory 752. Thus, it is possible to reduced the total memory capacity of the memory block 75 although the memory block 75 has two memories 751 and 752, without causing any substantial jag-correction performance degradation. Such elimination of doubled dot patterns in the pattern memory 752 reduces a number of bits (bit width) representing code information to be supplied to the pattern memory 752. As a fact, 7-bit code information is used to obtain correction information from the pattern memory 752 in the FIG. 12 and FIG. 13 embodiments while 12-bit code information is used for the same purpose in the FIG. 10 and FIG. 11 embodiments.

Further, the FIG. 12 embodiment has advantages the same as those obtained in the FIG. 11 embodiment by using replicated-order information such as that described above.

A FIG. 13 embodiment will now be described. Differences between the FIG. 12 embodiment and the FIG. 13 embodiment will now be described. The code information is read out from the table memory 751, which information is previously stored at the address therein indicated by code information supplied by the pattern recognizing unit 74. Then, the correction information is read out from the pattern memory 752, which information is previously stored at the address therein indicated by both code information read out from the table memory 751 and code information A12–A15 such as that described above.

Figure 13:
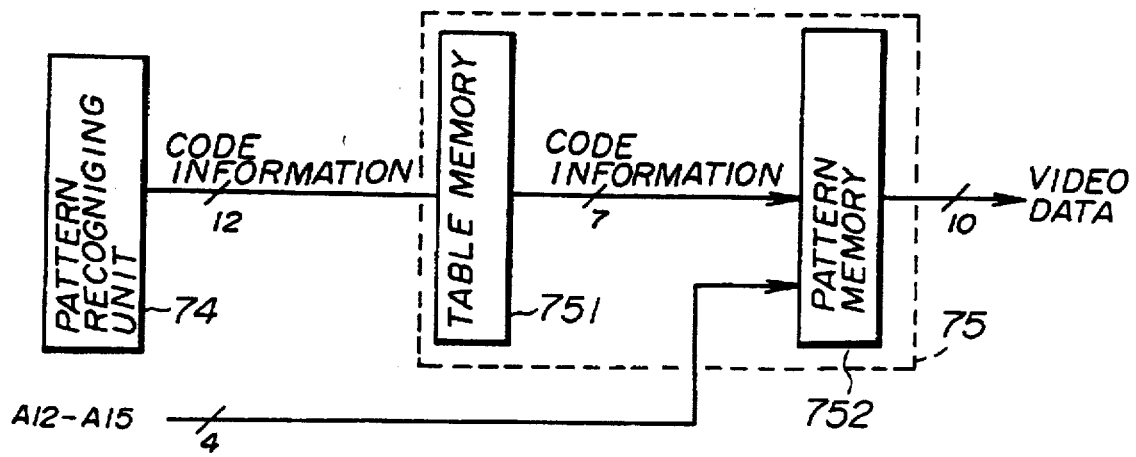

Due to a reason similarly to that in the FIG. 12 embodiment, the FIG. 13 embodiment is also effective to reduce the total memory capacity required for the memory block 75. The FIG. 14 embodiment can further reduce the total memory capacity if the number of image-part patterns which may be handled using the table memory 751 is significantly larger than the number of different dot patterns stored as correction information in the pattern memory 752. Adding 4-bit code information A12–A15 to information indicating addresses in a memory multiplies the capacity of the memory by $2^4$. If the number of patterns which may be handled by the table memory is significantly larger than the number of different patterns stored in the pattern memory, the memory capacity of the table memory 751 before being multiplied by $2^4$ is larger than that of the pattern memory 752 before being multiplied by $2^4$. In such a case, it is more effective in reducing the total memory capacity to multiply the memory capacity of the pattern memory by $2^4$ than that of the table memory. Thus, the FIG. 13 embodiment is effective to reduce the total memory capacity. See the comparison shown in FIG. 14. Even though such a memory formation way is effective to reduce the total memory capacity, no jag-correction performance degradation is caused by the memory capacity reduction.

Further, the FIG. 13 embodiment has advantages the same as those obtained in the FIG. 11 embodiment by using replicated-order information such as that described above.

FIG. 14 shows a comparison of necessary memory capacity among FIGS. 10, 11, 12 and 13 embodiments. Each set of correction information such as described above to be finally read out from the pattern memory 752 is 10-bit information (that is, the bit width being 10) in each embodiment. Further, the number of image-part patterns which may be supplied by the pattern recognizing unit 74 and can be handled by the memory block 75 is 4096 bits in each embodiment. This is because each set of code information supplied by the pattern recognizing unit 74 is 12-bit information. $2^{12}=4096$. Thus, in the FIG. 10 embodiment, the total memory capacity is 40960 bits as a result of multiplying the above 4096 (bits) and the above 10 (bit width of correction information) together. In the FIG. 11 embodiment, as a result of adding code information A12–A15 to information to be used as addresses in the pattern memory 752, the total memory capacity is 655360 bits as a result of multiplying the above 40960 and $2^4$ of the A12–A15 information.

Figure 10:
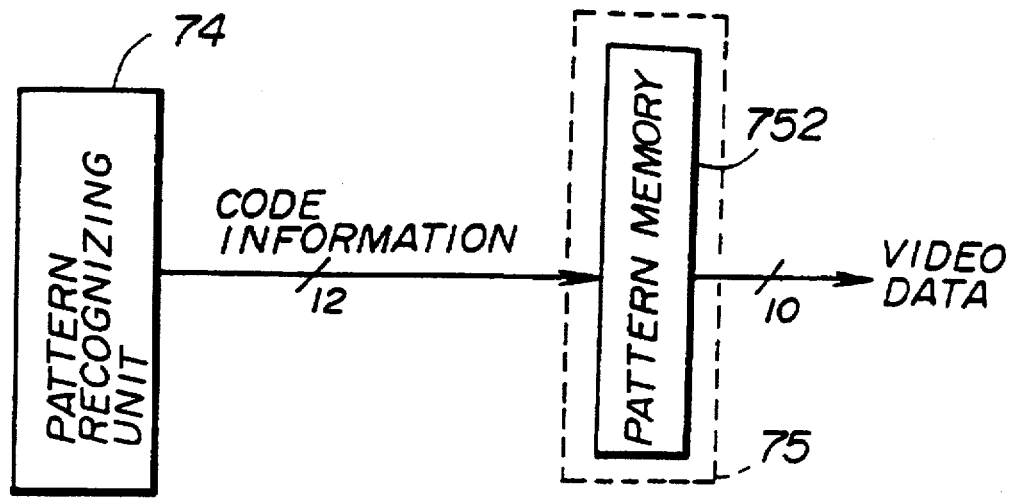
FIGS. 10, 11, 12 and 13 show block diagrams of embodiment constructions of a memory block 75 shown in FIG. 4.

In the FIG. 12 embodiment, the code information to be used as addresses in the pattern memory 752 is 7-bit information in contrast to 10-bit information used in the FIGS. 10 and 11 embodiments. The reason for this bit-width reduction will now be described. The number of dot patterns represented by the correction information stored in the pattern memory is reduced. This is possible because, as described above, doubled dot-patterns are eliminated from the pattern memory. As a result, the number of the stored dot patterns is reduced from the above 4096 to 128 ($=2^7$). Thus, the memory capacity of the pattern memory in the FIG. 12 embodiment is 1280 bits, as shown in FIG. 14, as a result of multiplying the above 128 and the above correction-information bit width 10 together. The capacity 458752 bits of the table memory 751 in the FIG. 12 embodiment is obtained by multiplying the above 7 (the above bit width of code information to be supplied to the pattern memory 752 as its addresses) and $2^{(12+4)}$ together. The above exponent 12+4 is obtained by the bit-widths of the code information supplied by the pattern recognizing unit 74 and the information A12–A15.

In the FIG. 13 embodiment, the capacity 20480 bits of the pattern memory 752 is obtained by multiplying that 1280 bits of the memory 752 in the FIG. 12 embodiment and $2^4$. The capacity 28672 bits of the table memory 751 is obtained by dividing that 458752 bits the memory 751 in the FIG. 12 embodiment by the same $2^4$. The exponent 4 of the above $2^4$ is the bit width of the A12–A15 information. The above capacity change results from changing the memory, to which the A12–A15 information, from the table memory 751 to the pattern memory 752. Thus, the total memory capacity can be reduced in the FIG. 13 embodiment, although the jag-correction performance is substantially the same among the FIGS. 11, 12 and 13 embodiments. Any of the FIGS. 10, 11, 12 and 13 embodiments can be used in the embodiment of the present invention.

Another embodiment of the present invention, shown in FIGS. 15 and 16 will now be described. The FIG. 15 embodiment has a code-information switching means 90 for switching the information to be supplied to the memory block 75 from the above information A12–A15 to other information RA12–RA15 and vice versa. Such switching operation is carried out if a predetermined switching signal is supplied to the means 90. The information RA12–RA15 also indicates replicated orders such as those described above but the order is reversed from that indicated by the above A12–A15. As a result, as may be compared by referring to FIGS. 17E and 17F, it is easy to obtain the dot pattern of FIG. 17F merely as a result of changing the arrangement order of that of the pattern of FIG. 17E. As result, it is possible to add variation to the image-part correction manners, which can be performed by the dot-correction unit 7, through addition of simple means such as means 90.

Figure 15:
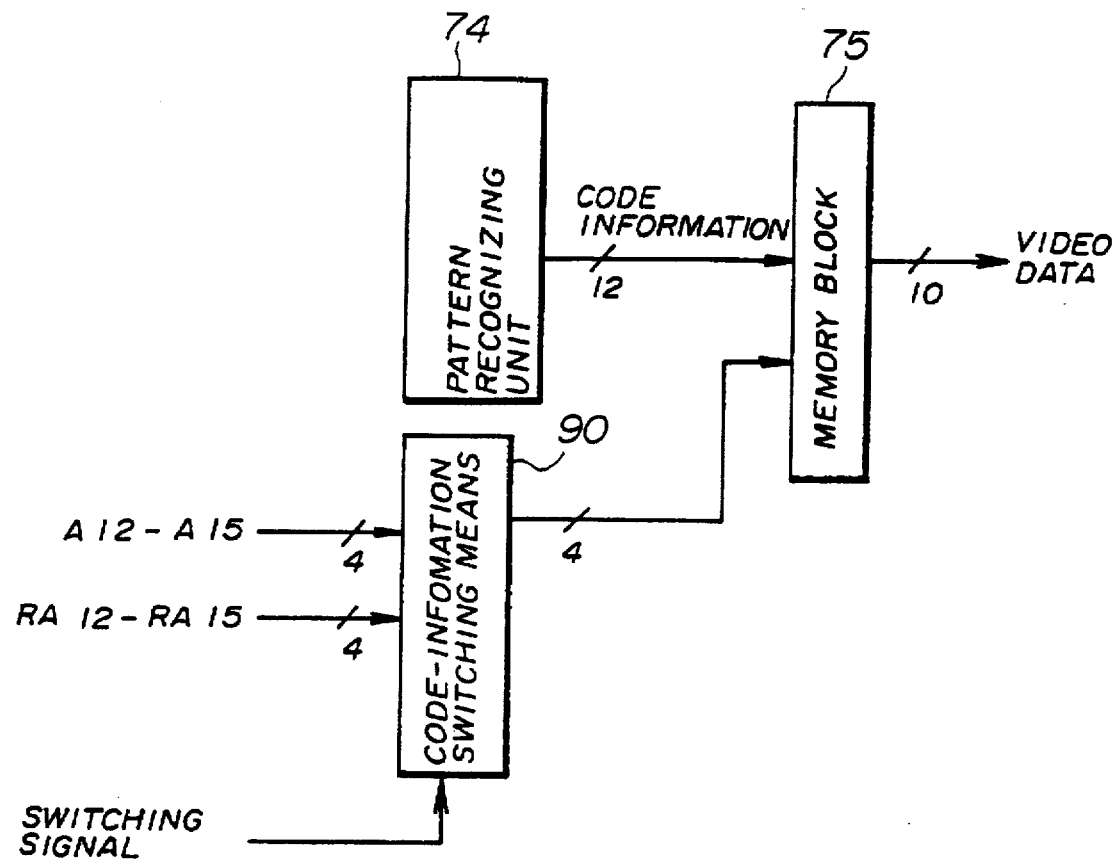
FIG. 15 shows a block diagram of a code-information switching means for switching code information to be input, for use as a part of an address, to one of the memory blocks shown in FIGS. 11, 12 and 13.
Figure 16:
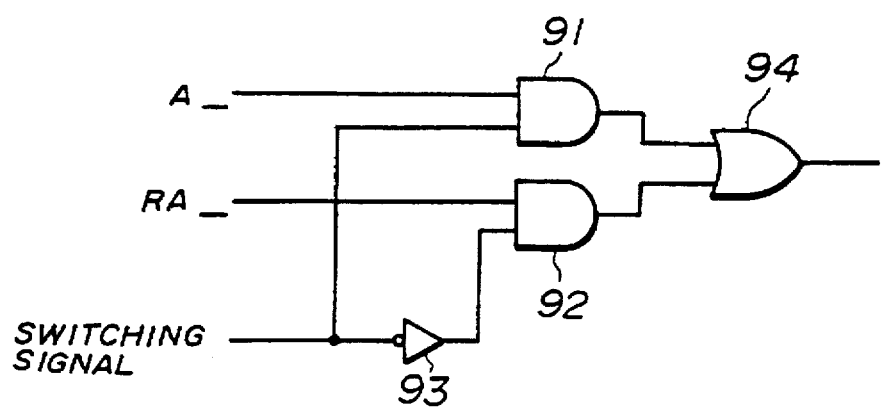
FIG. 16 shows a circuit diagram as an embodiment of the above code-information switching means.

The above means 90 in FIG. 15 may be embodied by the circuit formation shown in FIG. 16. The means 90 includes two AND elements 91 and 92, a NOT element 93 and an OR element 94. The means 90 supplies the A signal if the switching signal has the value "1" and the means supplies the RA signal if the switching signal has the value "0".

Figure 17:
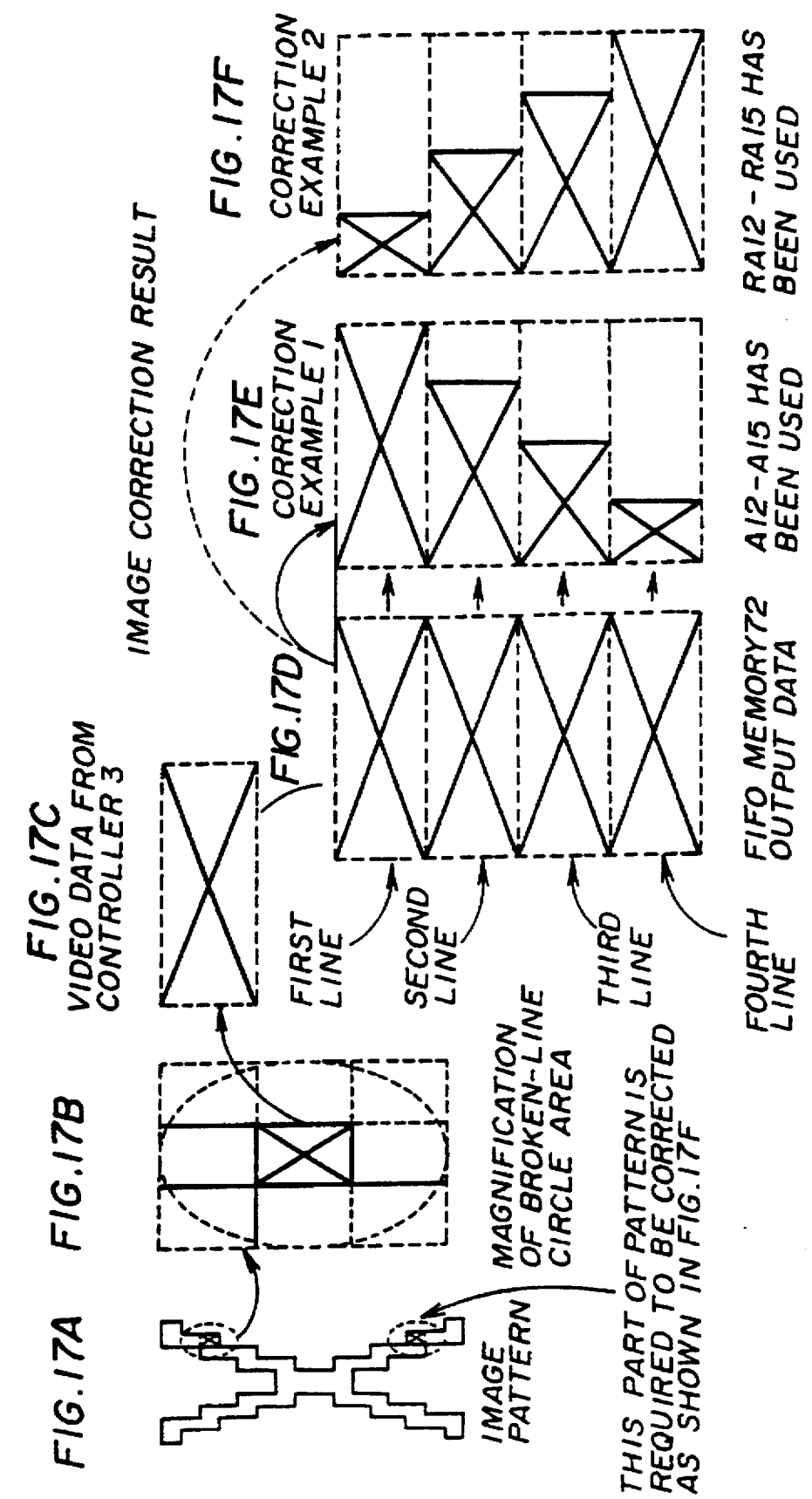
FIGS. 17A, 17B, 17C, 17D, 17E and 17F illustrate a jag correction operation in which correction-data image fragments are appropriately arranged using the above code-information switching means.

An embodiment of a jag-correction operation in the embodiment of the present invention will now be described with reference to FIGS. 17A through 17F. FIG. 17A shows an image represented by relevant input video (image) data. In the example, two portions surrounded by broken-line circles are used as sample dots on which jag-correction operation according to the present invention is performed. FIG. 17B shows the image-part pattern obtained by magnifying the upper sample shown in FIG. 17A. The controller 3 supplies video data representing the black dot, shown as the rectangle having the cross lines drawn therein in the FIG. 17B pattern, to the dot-correction unit 6. Then, due to the data replication function of the FIFO memory 72, one line of the original rectangle and three lines of copies are obtained from the FIFO memory 72 as shown in FIG. 17D. Then, through the pattern-recognizing process such as that described above, the memory block 75 outputs the correction information which represents the four lines of rectangles as shown in FIG. 17E for the relevant dot. The pattern consisting of the four lines of rectangles shown in FIG. 17E is then used to replace the above-mentioned cross-lined black dot in the sample image part shown in FIG. 17B. Thus, since the four lines or rectangles have been thus appropriately corrected, the jag of the image shown in FIG. 17A is corrected into finer jags shown in FIG. 17E, the outline of which finer jags seems to be the oblique line if the relevant pattern is significantly reduced in size. Thus, the jag correction has been performed for the relevant dot. By using four times faster writing clocks for the sub-scan direction in image printing process, the sub-scan direction (vertical direction in the figure) length of the relevant dot, even consisting of the four lines of copy dots as shown in FIG. 17E, matches the sub-scan direction length of the original dot shown in FIG. 17B. Similarly, with regard to the lower sample in the image shown in FIG. 17A, the original dot in the sample will be replaced by the pattern shown in FIG. 17F. The pattern of FIG. 17F realizes the oblique outline line having the gradient direction opposite to that of FIG. 17E pattern. The FIG. 17F pattern matches the relevant portion in the image shown in FIG. 17A.

10-bit correction information is supplied from the memory block 75 (in particular, from the pattern memory 752) in the FIGS. 11, 12, 13 and 15 embodiment as shown in the figures. The respective 10 bits in each correction information set may indicate, whether black or white, 10 corresponding respective segments constituting a relevant dot are painted. The above relevant one dot is one of the first through fourth lines shown in FIGS. 17E and 17F, for example. The above 10 segments are obtained by dividing the respective dot so that the dividing lines extend along the sub-scan direction. In the example of FIG. 17E, one line consists of four segments and thus the bit-width of correction information is 4. The first line, for example, is realized by 4-bit correction information (1, 1, 1, 1) and the fourth line, for example, is realized by correction information (1, 0, 0, 0).

In the above-described dot-correction unit 6 in the embodiment of the present invention, the memory block 75 supplies such correction information, having the bit-width of 10 for example, in bit parallel. Segments such as those described above correspond to time periods obtained as a result of dividing a predetermined time period which is prepared for each dot. The above predetermined time period is one for which the laser emits light so as to realize the relevant dot.

The video-data output unit 76 shown in FIG. 4 receives the parallel-bit correction information supplied by the memory block 75 and converts it into serial-bit form which is then supplied to the printer engine 4 shown in FIG. 1. The thus supplied correction information is used to control the LD unit 50, shown in FIG. 3, provided in the writing unit 26. Thus, the laser diode of the LD unit 50 emits light or stops it appropriately.

The above conversion of the bit-parallel correction information into the serial form as mentioned above is necessary if the light emission ON/OFF control method used for the LD unit 50 is that using two-tone data input thereto. If the ON/OFF control method is that using multi-tone data, such parallel-bit to serial-bit conversion is not necessary. In the latter case, the bit-parallel correction information supplied from the memory block 75 is directly used as multi-tone data to perform the ON/OFF control of the laser diode in the LD unit 50 so that the writing unit 26 appropriately writes the corresponding dot image.

It is also possible within the scope of the present invention that any data supplied from either table memory 751 or pattern memory 752 used in the above-described embodiments is used as bit-parallel information to directly perform the ON/OFF control of the multi-tone control LD unit similarly to the case where the bit-parallel correction information is used for the same purpose.

Further, Such bit-parallel information (including bit-parallel correction information) indicates line-shape (of a boundary line present between a black-dot region and a white-dot region represented by relevant video data in the bit-map formation) characteristics obtained for each dot through the pattern recognizing process performed by the pattern recognizing unit 74 as described above. Thus, it is also possible to use such bit-parallel information, in addition to the use in the ON/OFF control of the above laser diode, as data to be processed by the CPU for performing various image manipulating processes such as image magnification and reduction in size. Any information of the code information supplied by the pattern recognizing unit 74, that supplied by the table memory 751 and that supplied by the pattern memory 752 may be used for the above purpose.

Figure 18:
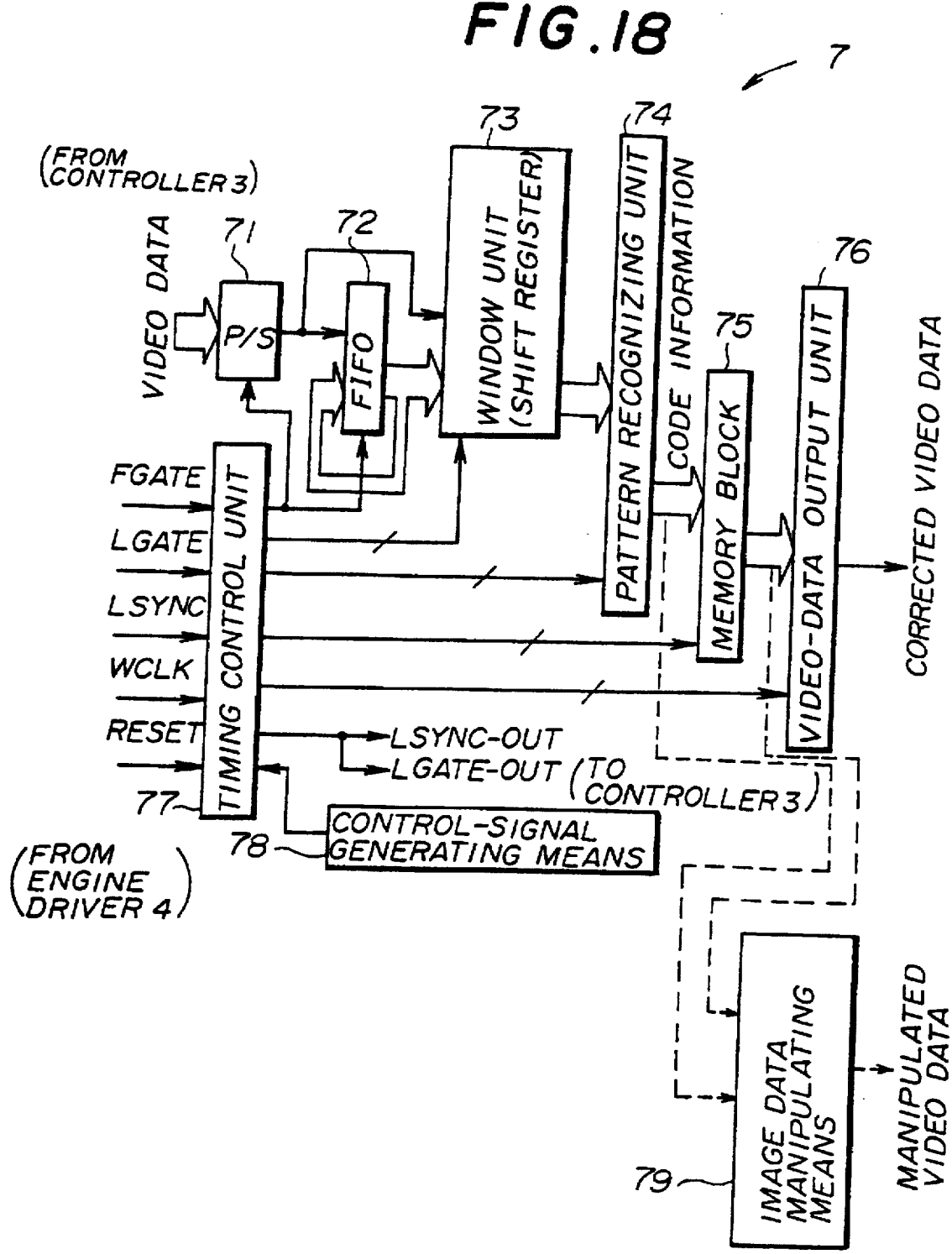
FIGS. 18, 19 and 20 show block diagrams of embodiments in each of which an image data manipulating unit is provided in a dot correction unit 7 shown in FIG. 1.

Another embodiment of the present invention will now be described with reference to FIG. 18. It is effective to provide image data manipulating means 79 within the dot-correction unit 7 for performing an image manipulating process such as image magnification and reduction in size. This is because, the means 79 processes the code information generated within the dot-correction unit 7. Thus, the dot-correction unit 7 supplies the manipulated or both corrected and manipulated video data in addition to the corrected video data. In this block formation in the dot-correction unit 7, the jag-correction operation and image manipulating operation can be simultaneously performed, in parallel, on video data supplied by the controller 3. Thus, the results of the above two kinds of operations can be simultaneously obtained.

Figure 19:
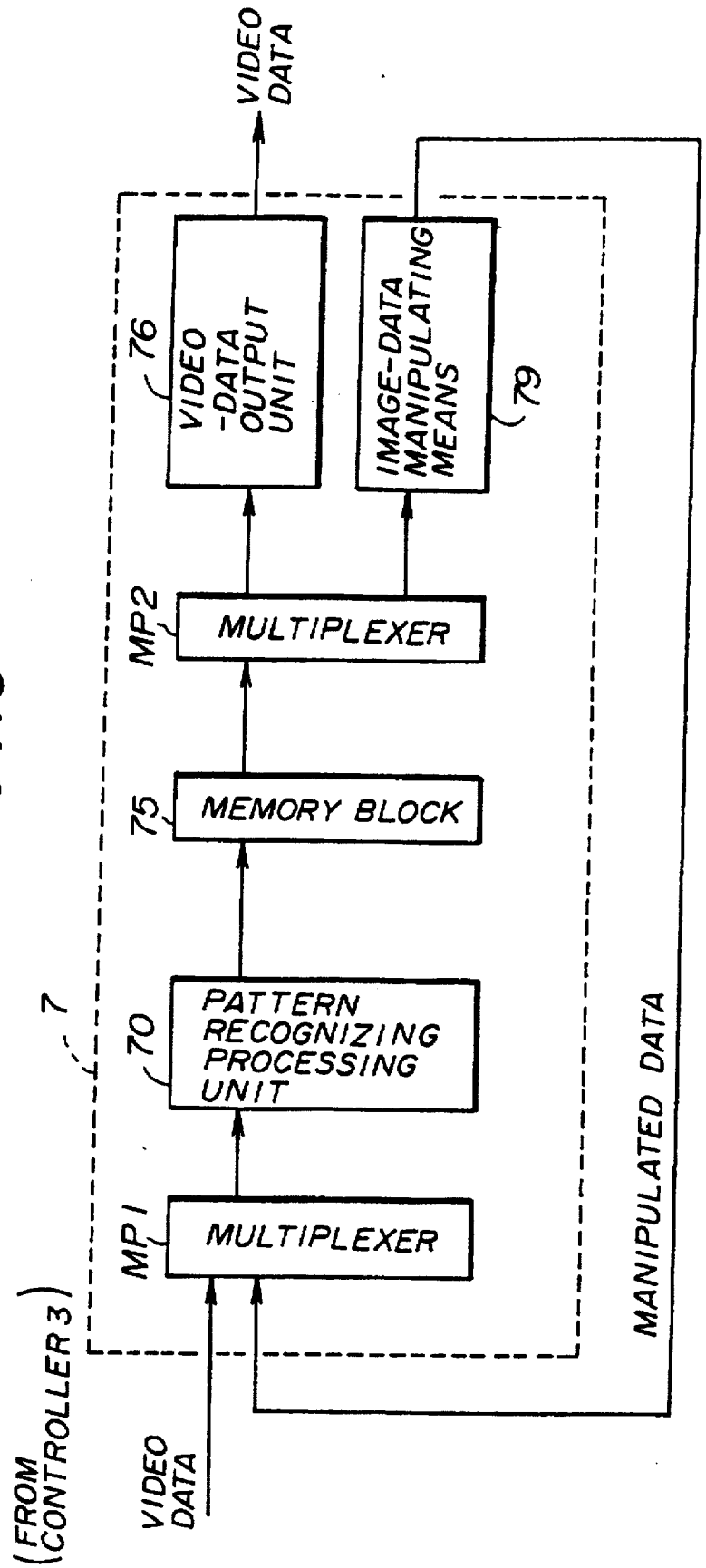
Figure 20:
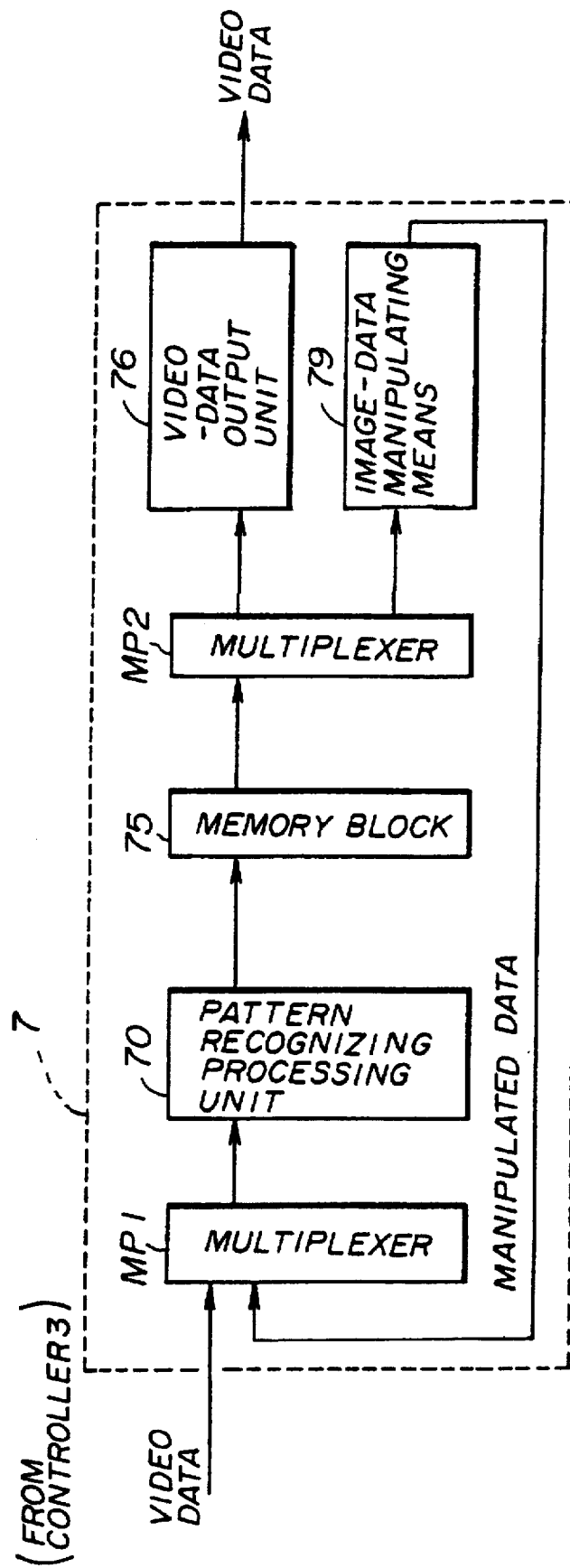

Other block formations of the dot-correction unit 7 with the provision of the image data manipulating means 79, in other embodiments of the present invention, shown in FIGS. 19 and 20 are possible within the scope of the present invention. Thus, it is possible to perform jag-correction process on the manipulated video data supplied by the means 79. The difference between the formations shown in the two figures is the course of the output line of the means 79. In the FIG. 19 formation, it is possible to use the data supplied by the means 79 for another purpose outside the dot-correction unit 7. A pattern recognizing processing unit 70 in the two formation includes P/S converter 71, FIFO memory 72, window unit 73, pattern recognizing unit 74 and timing control unit 77 shown in FIG. 4. A multiplexer MP2 selects one of the paths to the video-data output unit 76 and means 79 appropriately to the cases as to whether or not relevant output data undergoes the image manipulating operation. Another multiplexer MP1 selects the output data of the means 79 if the MP2 selects the path to the means 79.

Figure 21:
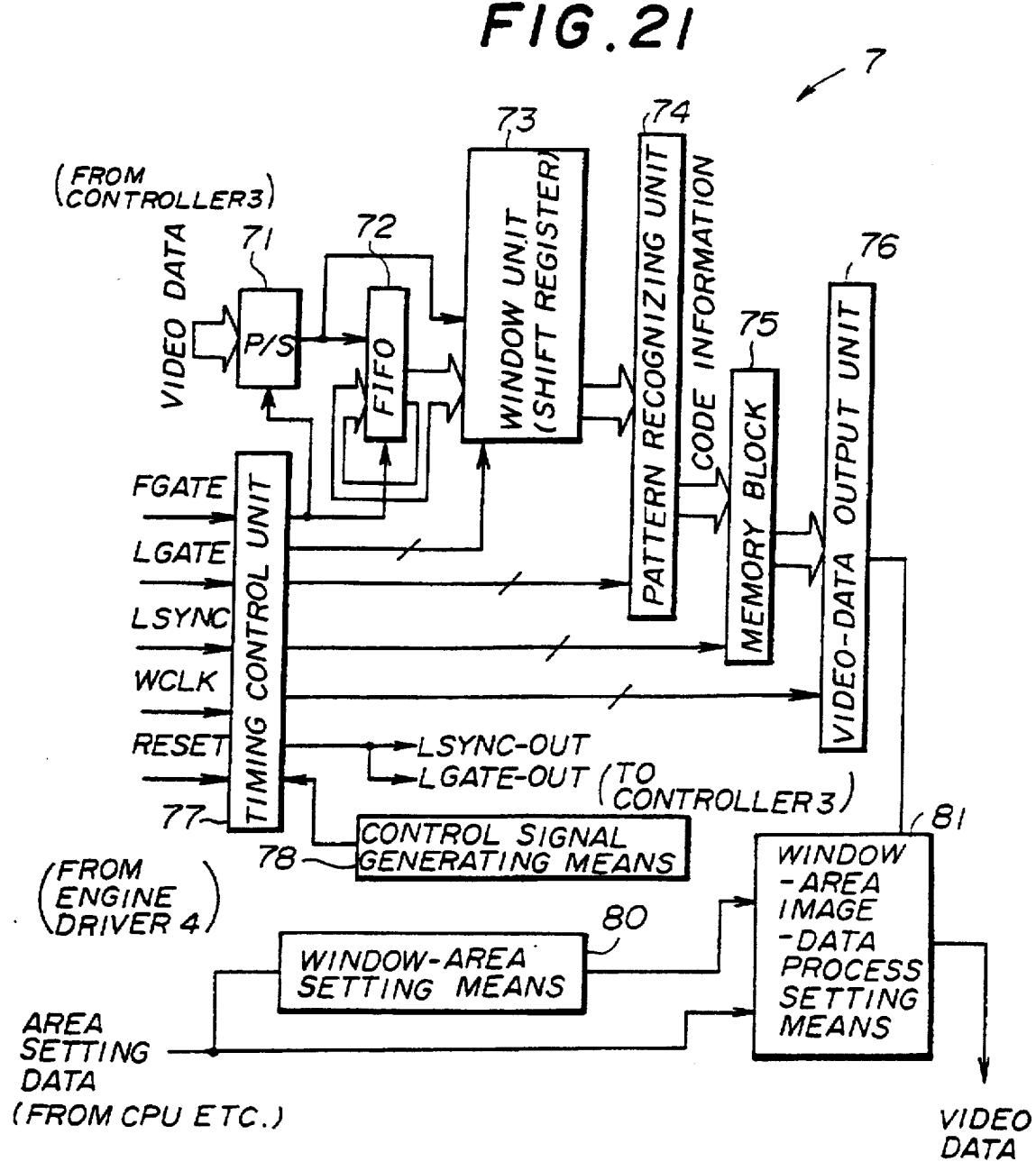
FIG. 21 shows a block diagram of an embodiment in which a window-area setting means and a window-area image-data processing means are provided in the dot correction unit 7.

Another block formation in another embodiment of the present invention shown in FIG. 21 will now be described. The formation includes window-area setting means 80 for setting a plurality of window areas in a bit-map format of image data. The formation further includes window-area image-data process setting means 81 for setting as to whether or not the jag-correction operation is performed on the respective window areas set by the means 80. Concretely speaking, the window-area setting means 80, through a CPU or the like, sets image-plane coordinate data corresponding to each window area. The process setting means 81 also uses a CPU or the like.

Figure 22:
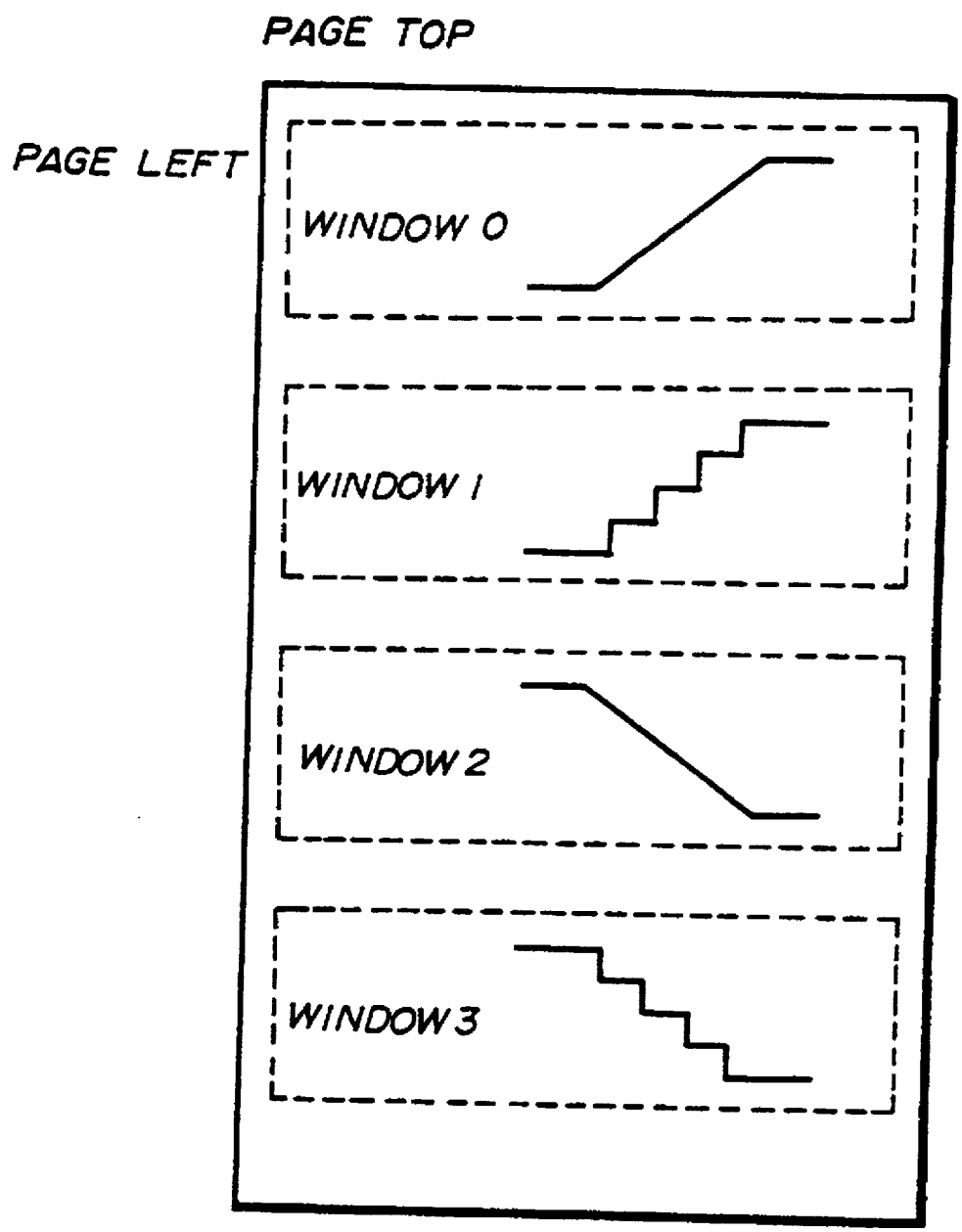
FIG. 22 illustrates an operation in the construction shown in FIG. 21.

FIG. 22 shows a page of image obtained by expanding input image data into the bit-map format. The page of image includes four lines arranged from the top to the bottom of the page as shown in the figure. Windows 0, 1, 2, and 3 indicated by broken-line enclosing rectangles are ones set by the above window-area setting means 80. The process setting means 81 sets so that the window areas 0 and 2 should undergo the jag-correction process and the others should not. The figure shows the result of the above process setting. Thus, the lines within the window areas 0 and 2 include the long smooth oblique lines and the lines within the window area 1 and 3 include the several steps (jags) left, as shown in the figure.

Figure 23:
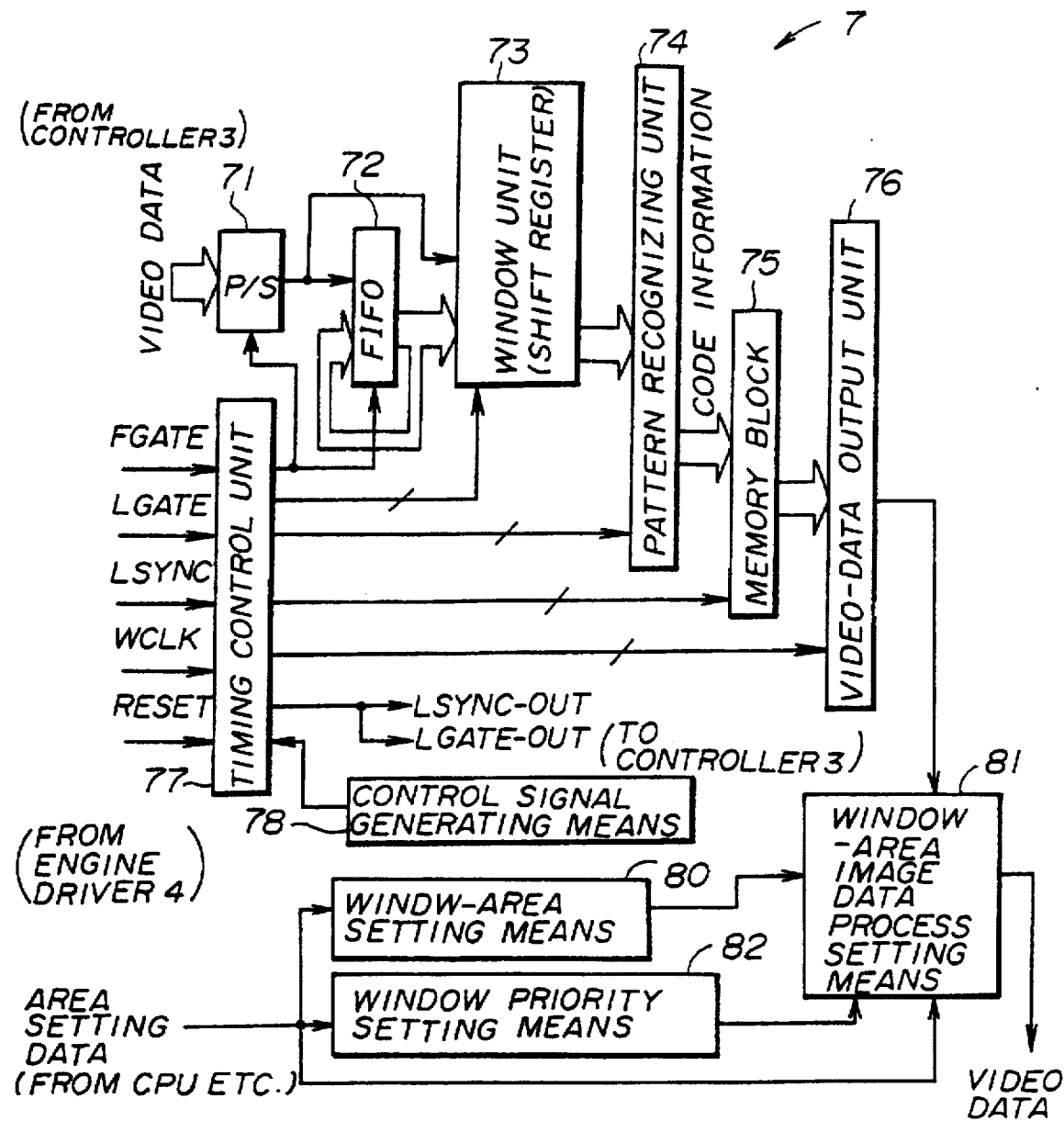
FIG. 23 shows a block diagram of an embodiment construction in which a window priority setting means is further provided in the dot correction unit 7 shown in FIG. 21.
Figure 24:
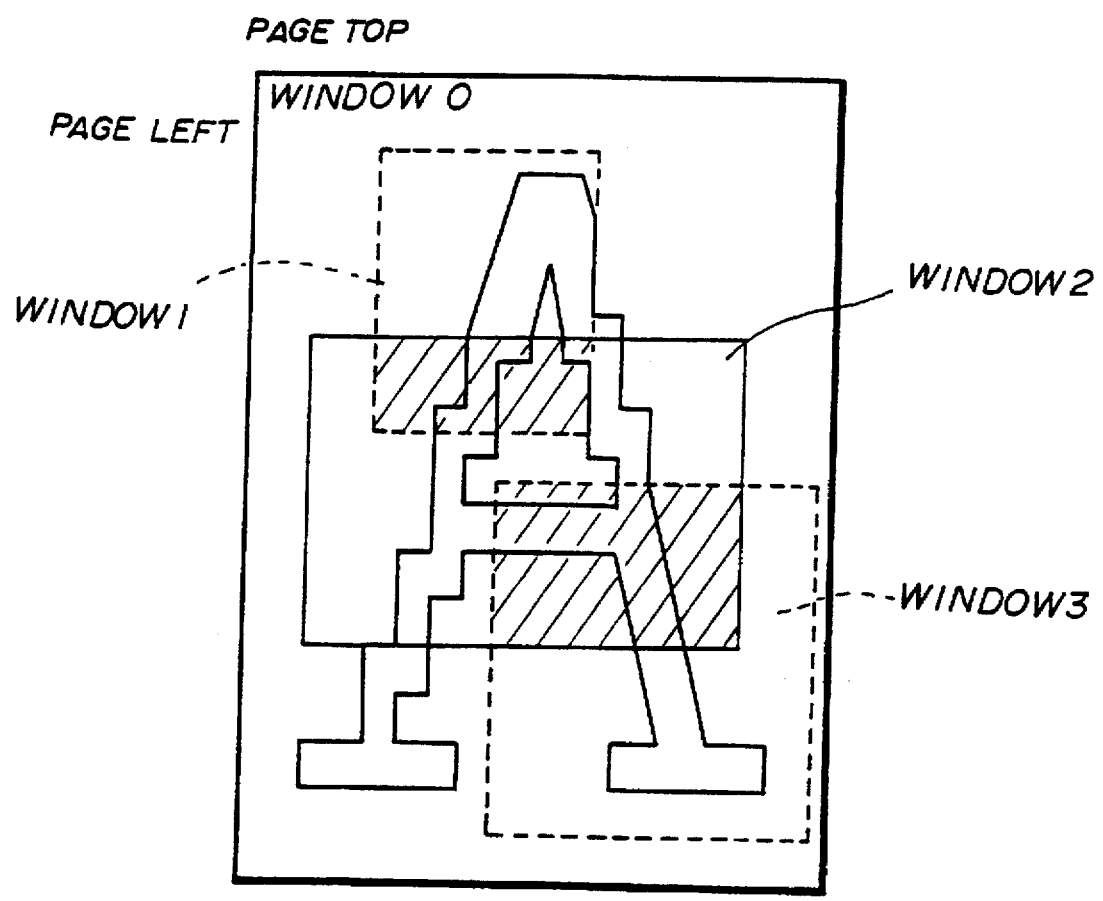
FIG. 24 illustrates an operation in the construction shown in FIG. 23.

A dot-correction unit 7 in another embodiment of the present invention will now be described with reference to FIGS. 23 and 24. The unit 7 further includes window priority setting means 82 for setting as to which process is selected among processes set by the process setting means 81 for a plurality of window areas. Such selection is necessary if a plurality of window areas overlap with each other. The means 82 uses a CPU or the like for the above purpose. The above function of means 82 will be described with reference to FIG. 24 FIG. 24 shows an example of a page of image obtained by expanding image data into the bit-map format. The relevant image includes the letter 'A'. Four window areas 0, 1, 2 and 3 are set by means of the window-area setting means 80 so as to enclose respective parts of the above letter A. Process setting is performed on the window areas by means of the process setting means 81 so that the window areas 1 and 3 should undergo the jag-correction process and the others should not. Further priority setting is performed for the window areas by means of the priority setting means 82 so that the process priority is such as 1) window area 3, 2) window area 2, 3) window area 1 and 4) window area 0. The FIG. 24 shows the result of the jag-correction having been performed according to the above setting. The areas in which hatching is present are ones where the two window areas overlap together.

A dot-correction unit 7 in another embodiment of the present invention will now described with reference to FIGS. 25 and 26A, 26B, 26C ,26D and 26E. The unit 7 further includes window-area image-data process-mode setting means 83 for setting special process modes in connection with the jag-correction process for each window area. The means 83 uses a CPU or the like for the above purpose. The above function of the means 83 will be described with reference to FIG. 26. FIG. 26 shows an example of a page of image obtained by expanding image data into the bit-map format. The relevant image includes four letters 'A' arranged from the top to the bottom. Four window areas 0, 1, 2 and 3 are set by means of the window-area setting means 80 so as to enclose the respective four A letters. Process setting is performed on the window areas by means of the process setting means 81 so that the window areas 1, 2 and 3 should undergo the jag-correction process and the window area 0 should not. Thus, the letter A within the window area 0 is left unperformed with jag-correction process, as shown in FIG. 26B. Further the above special process-mode setting is performed for the window areas, which will undergo the jag correction, by means of the process-mode setting means 83. Thus, the window area 1 is set at a mode where medium correction data is used, the window area 2 is set at a mode where dark correction data is used and the window area 3 is set at a mode where light correction data is used. The above modes will now be described. The mode of using medium correction data means is to use correction information such that neither line thickening nor line thinning is performed and only appropriate jag-correction is performed, as shown in FIG. 26C. The mode of using dark correction data means is to use correction information such that a line thickening process is performed and also appropriate jag-correction is performed, as shown in FIG. 26D. The mode of using light correction data means is to use correction information such that a line thinning process is performed and also appropriate jag-correction is performed, as shown in FIG. 26E.

The function of the timing control unit 77 will now be described. The timing control unit 77 receives an FGATE signal, an LGATE signal, an LSYNC signal, an image clock signal WCLK and a RESET signal from the engine driver 4 and generates clock signals and so forth to the blocks 71 through 76 to make synchronization thereamong. The FGATE signal defines a one-page writing time period. The LGATE signal defines one-line writing time period. The LSYNC signal indicates writing starting and ending timings for each line. The signal WCLK defines a one-dot reading and writing time period. Further, the timing control unit 77 includes the above-mentioned timing-signal generating means.

An operation fundamental clock signal supplies clock pulses to the timing control unit 77 and determines the basic operation progress of the unit 77. The above fundamental clock signal is different from those supplied by the engine driver 4 and is either a control signal supplied by a control-signal generating means 78 provided within the dot-correction unit 7 or a control signal supplied by a suitable signal generating means provided outside the dot-correction unit 7. The control-signal generating means 78, if it is provided, includes a voltage controlled oscillator. The above suitable signal generating means, if it is provided outside the unit 7, includes a voltage controlled oscillator, crystal oscillator or the like.

Figure 27:
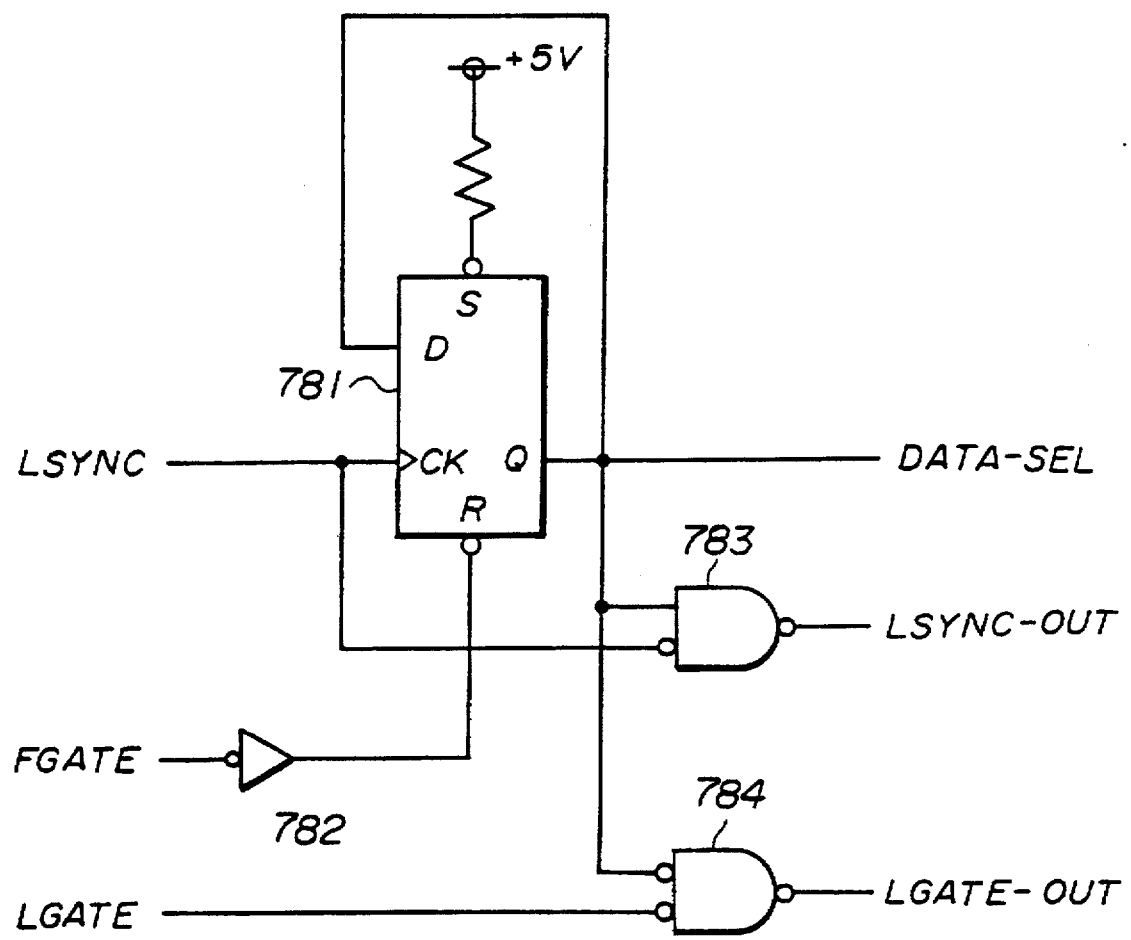
FIG. 27 shows a circuit diagram of an embodiment of a timing-signal generating means provided in a control-signal generating means 78 shown in FIG. 4.

With reference to FIGS. 27, 28A through 28F, 29 and 30A through 30I, the timing-signal generating means in embodiments of the preset invention will now be described. The timing-signal generating means shown in FIG. 27 has a construction to achieve the operation shown in FIGS. 6A through 6I as will be described. The circuit formation shown in FIG. 27 includes a D-flip-flop element 781, a NOT element 782, a NAND gate element 783 and 784. This formation supplies signals shown in FIGS. 28A through 28F. Thus, only within a time period in which the FGATE signal has the value "0" that is, only within a time period in which one page of image is being written/printed, the level of the data-sel signal varies alternately between the high level and the low level at each timing of the signal LSYNC's rising edges. During a time period the FGATE signal has the value "0" that is, during a time period out of the time period in which one page of image is being written, the data-sel signal maintains the value "1". Further, the gates 783 and 784 supply an LSYNC-OUT signal and an LGATE-OUT signal, respectively. The gates 783 and 784 gate the LSYNC signal and the LGATE signal, both being supplied by the engine driver 4, respectively. This gating uses the data-sel signal as shown in FIG. 27. The thus generated LSYNC-OUT and LGATE-OUT signals, having the waveforms shown in FIGS. 28E and 28F, are supplied to the controller 3.

In an example, it is assumed that the timing of the LSYNC and LGATE signals are ones resulting in the 300 dpi in the main-scan direction/600 dpi in the sub-scan direction resolution for a final image. This final image is obtained by printing through laser printer 2 using the above LSYNC and LGATE signals supplied by the engine driver 4. The above LSYNC-OUT and LGATE-OUT signals are used to enable jag-correction operation such as described above with reference to FIGS. 17A through 17F to be appropriately carried out under the condition where the above basic resolution characteristics of 300 dpi in the main-scan direction/600 dpi in the sub-scan direction resolution depending on the capability of the laser printer 2 are not needed to be increased. As may be seen in FIGS. 28B, 28D, 28E and 28F, one decaying pulse in either the LSYNC-OUT or LGATE-OUT signal appears within the time period two successive decaying pulses appear in either the LSYNC or LGATE signal. That is, the pulse appearing frequency of either the LSYNC-OUT or LGATE-OUT signal is half that of the LSYNC or LGATE signal. Thus, the LSYNC-OUT and LGATE-OUT signals are ones to cause the controller 3 to process/produce video data having data characteristics corresponding to the 300 dpi in the main-scan direction/300 dpi in the sub-scan direction resolution, in the above assumption. That is, the resolution is half the above one in the sub-scan direction.

The controller 3 thus supplies video data having the above data characteristics. Such video data is one, which results in the finally printed image consisting of lines in the half density if the such video data is, as it is, used to produce the image in the laser printer 2. The half density is a density half the density corresponding to the above 300 dpi in the main-scan direction/600 dpi in the sub-scan direction resolution characteristics. In this situation, the controller 3 processes video data having the characteristics corresponding to half the 300 dpi in the main-scan direction/600 dpi in the sub-scan direction resolution.

Figure 28:
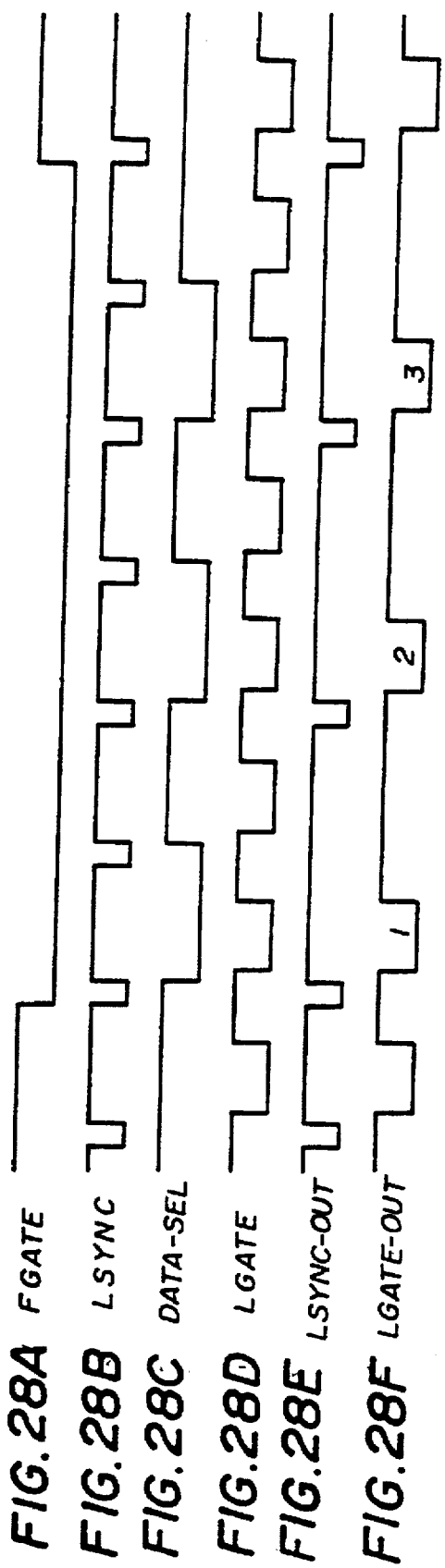
FIGS. 28A, 28B, 28C, 28D, 28E and 28F illustrate an operation in the timing-signal generating means shown in FIG. 27.

The controller 3 supplies video data only during time periods the LGATE-OUT signal shown in FIG. 28F transmits the "0" value to the FIFO memory 72 shown in FIG. 4. Digits 1, 2 and 3 are drawn in the periods shown in FIG. 28F. This timing of the video-data supply corresponds to that shown in FIG. 6A. The above digits 1, 2 and 3 correspond to the same digits shown in FIG. 6A. In FIGS. 28A through 28F, the time period the FGATE signal has the "0" value is shortened, that is, the single period the FGATE signal has the "0" value includes only six periods the LSYNC signal has the "0" value, for the sake of simplification of the figures. Then, the FIFO memory 72 effects an operation such as that shown in FIGS. 6A through 6I such that, as described above, sets of video data supplied by the controller 3 are replicated. Thus, two identical lines are successively written into the line buffers in the FIFO memory 72 and the video data is thus complemented with the thus replicated data, line by line. Thus, the dot-correction unit 7 receives video data corresponding to the 300 dpi in the main-scan direction/300 dpi in the sub-scan direction resolution and then consequently supplies video data corresponding to the 300 dpi in the main-scan direction/600 dpi in the sub-scan direction resolution.

In this embodiment shown in FIG. 27, the data-sel signal shown in FIGS. 27 and 28C can be used as replicated-order code information such as A12–A15 shown in FIG. 11 and so forth. As shown in FIGS. 6B and 6C, the data-sel signal has the "1" value when an original set of video data is supplied and the data-sel signal has the "0" value when the copy of the original set of video data is supplied.

Figure 29:
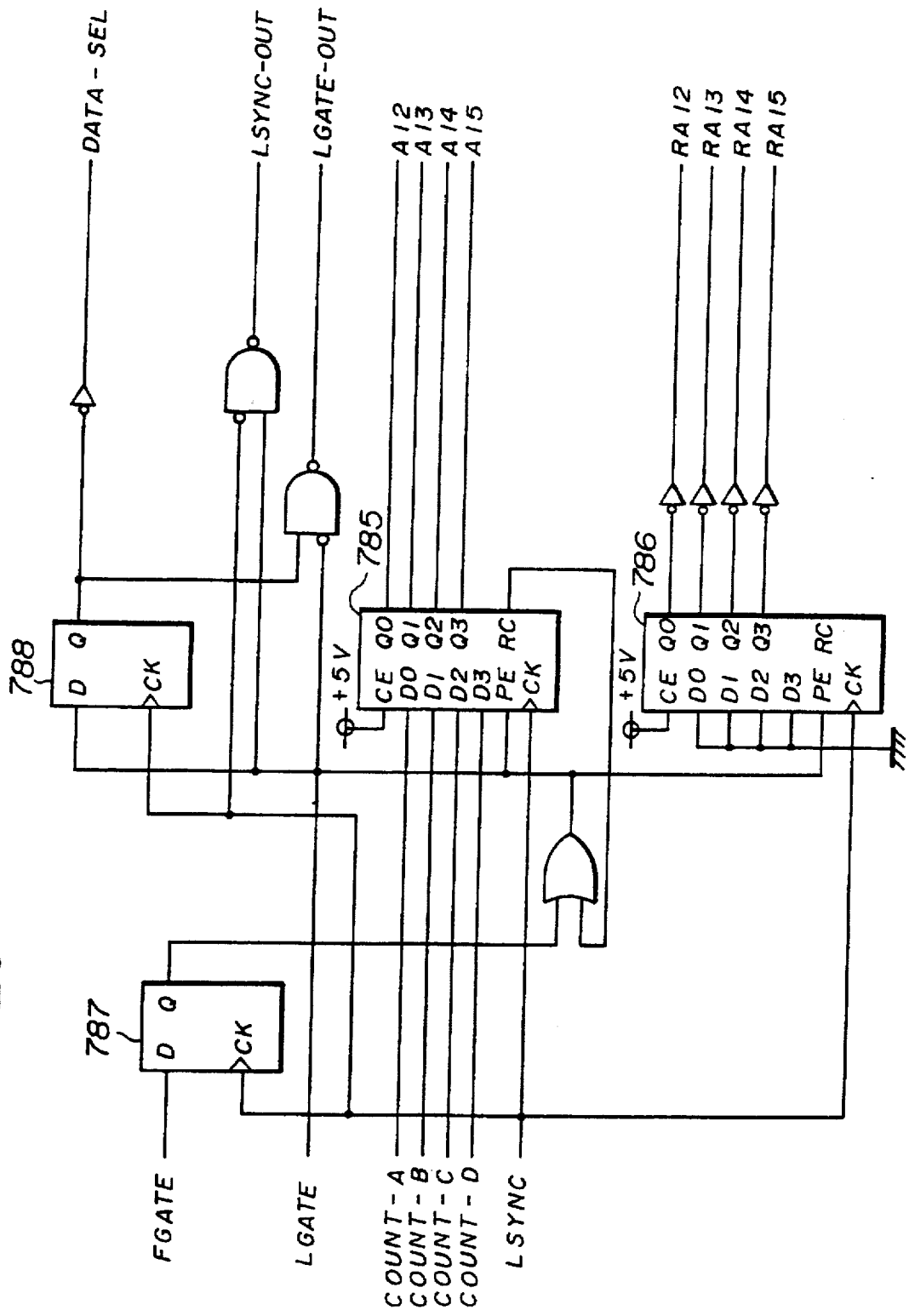
FIG. 29 shows a circuit diagram of another embodiment of the above timing-signal generating means provided.
Figure 31A:
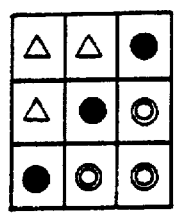
FIGS. 31A, 31B, 31C and 31D illustrate various types of line recognition patterns for recognizing a 45°-oblique line in a core area in a window 73 shown in FIG. 8.
Figure 31B:
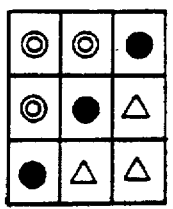
Figure 31C:
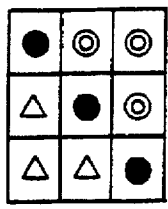
Figure 31D:
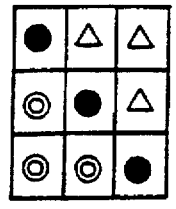
Figure 32A:
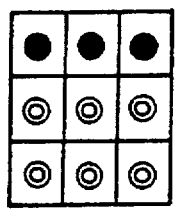
FIGS. 32A, 32B, 32C, 32D, 32E, 33F and 33G illustrate various types of line recognition patterns for recognizing a horizontal line or approximately horizontal oblique line in the above core area.
Figure 32B:
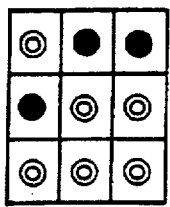
Figure 32C:
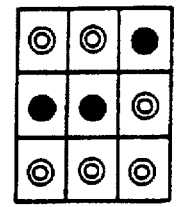
Figure 32D:
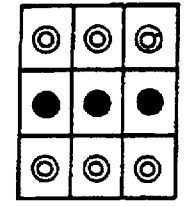
Figure 32E:
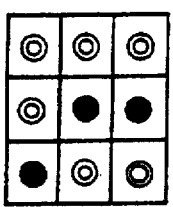
Figure 32F:
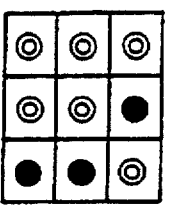
Figure 32G:
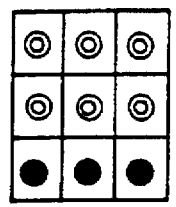
Figure 33A:
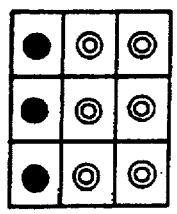
Figure 33B:
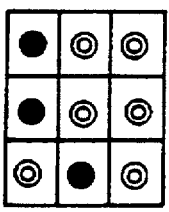
Figure 33C:
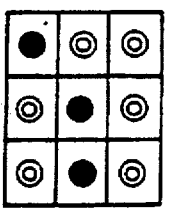
Figure 33D:
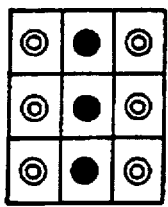
Figure 33E:
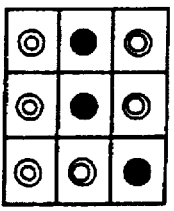
Figure 33F:
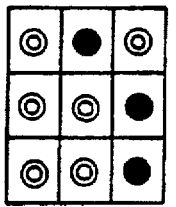
Figure 33G:
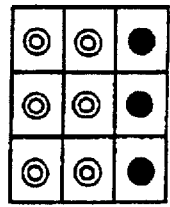

With reference to FIGS. 29 and 30, the timing-signal generating means in another embodiment of the preset invention will now be described. The timing-signal generating means shown in FIG. 29 has a construction to achieve the operation shown in FIGS. 7A through 7I as will be described. In FIGS. 30A through 30I, the time period the FGATE signal has the "0" value is shortened, that is, the single period the FGATE signal has the "0" value includes only eight periods the LSYNC signal has the "0" value, for the sake of simplification of the figures. The timing-signal generating means includes 4-bit counters 785, 786, and D-FFs 787, 788 and operates as shown in FIGS. 30A through 30I. In the operation, the 4-bit counters count at a time of each rising edge in the LSYNC signal, only within a time period the above-described FGATE signal has the "0" value, that is, within a time period the relevant image data is being used to write the corresponding page of image. The counter 785, receiving COUNT-A, COUNT-B, COUNT-C and COUNT-D signals as data to be loaded thereon, thus outputs the above-described A12, A13, A14 and A15 data as data resulting from incrementing the above loaded data, as shown in FIG. 29.

In the example shown in FIGS. 30A through 30I, the above COUNT-A through COUNT-D data indicates the value "C (12)" and thus, the counter 785 outputs the A12–A15 data indicating "C (12)", then outputs that indicating "D (13)", then outputs that indicating "E (14)", and then outputs that indicating "F (15)", sequentially according to its counting function, as shown in FIG. 30E. In parallel, the counter 786 and the inverters connected to the counter 786 shown in FIG. 29 output the above-mentioned RA12, RA13, RA14 and RA15 data indicating the value "F (15)", then outputs "E (14)", then outputs "D (13)" and then outputs "C (12)", sequentially according to its counting function, as shown in FIG. 30F. Thus, the counters 785 and 786 output data indicating reverse orders. The data-sel signal shown in FIGS. 29 and 30I has the value "0" only when the above A12 through A15 data output from the counter 785 is one indicating the same value indicated by the load data COUNT-A through COUNT-D.

The 4-bit counters 785 and 786 do not count when the FGATE signal has the "1" value, that is, when it is out of the time periods the relevant image data is being used to write the corresponding page of the image. The 4-bit counter 785 loads the COUNT-A through COUNT-D thereon when the FGATE signal has the "1" value. Thus, the output data A12 through A15 is maintained at the value same as that indicated by the load data COUNT-A through COUNT-D, that is, "C (12)" in this time period. The output data RA12 through RA15 is maintained at the value "F (15)" in this time period. The reason for this will now be described. As shown in FIG. 29, all of the loading terminals D0 through D3 of the counter 786 are grounded. Thus, the data loading has the value "0". Similarly to the above condition in the counter 785, the data loading is performed by the counter 786 when the FGATE signal has the "1" value. As a result, all the signals output through the terminals Q0 through Q3 are "0". That is, (Q0, Q1, Q2, Q3)=(0, 0, 0, 0,). The signals are then inverted by the inverters which are connected to the terminals Q0 through Q3 as shown in the figure. Thus, each the resulting signals RA12 through RA15 has the value "1". That is, (RA12, RA13, RA14, RA15)=(1, 1, 1, 1) which correspond to "f(15)" in the hexadecimal notation. The data-sel signal is maintained in the value "0" in this period since the above mentioned relevant condition is fulfilled in the circuit formation shown in FIG. 29.

An LSYNC-OUT signal and an LGATE-OUT signal, shown in FIGS. 30G and 30H are generated in this timing-signal generating means shown in FIG. 29 using gates for appropriately gating the LSYNC and LGATE signals which have been supplied by the engine driver 4.

In an example similar to the above-described example, it is assumed that the timing of the LSYNC and LGATE signals are ones resulting in the 300 dpi in the main-scan direction/600 dpi in the sub-scan direction resolution for a final image. This final image is obtained by printing through laser printer 2 using the above LSYNC and LGATE signals supplied by the engine driver 4. The above LSYNC-OUT and LGATE-OUT signals are used to enable jag-correction operation such as described above with reference to FIGS. 17A through 17F to be appropriately carried out under the condition where the above basic resolution characteristics of 300 dpi in the main-scan direction/600 dpi in the sub-scan direction resolution depending on the capability of the laser printer 2 are not needed to be increased. As may be seen in FIGS. 30B, 30D, 30G and 30H, one decaying pulse in either the LSYNC-OUT or LGATE-OUT signal appears within the time period four successive decaying pulses appear in either the LSYNC or LGATE signal. That is, the pulse appearing frequency of either the LSYNC-OUT or LGATE-OUT signal is ¼ that of the LSYNC or LGATE signal. Thus, the LSYNC-OUT and LGATE-OUT signals are ones to cause the controller 3 to process/produce video data having data characteristics corresponding to the 300 dpi in the main-scan direction/150 dpi in the sub-scan direction resolution, in the above assumption. That is, the resolution is ¼ the above one in the sub-scan direction.

The controller 3 thus supplies video data having the above data characteristics. Such video data is one, which results in the finally printed image consisting of lines in the ¼ density if the such video data is, as it is, used to produce the image in the laser printer 2. The ¼ density is a density ¼ the density corresponding to the above 300 dpi in the main-scan direction/600 dpi in the sub-scan direction resolution characteristics. In this situation, the controller 3 processes video data having the characteristics corresponding to ¼ the 300 dpi in the main-scan direction/600 dpi in the sub-scan direction resolution.

The controller 3 supplies video data only during time periods the LGATE-OUT signal shown in FIG. 30H has the "0" value to the FIFO memory 72 shown in FIG. 4. Digits 1 and 2 are drawn in the periods shown in FIG. 28F. This timing of the video-data supply corresponds to that shown in FIG. 7A. The above digits 1 and 2 correspond to the same digits shown in FIG. 7A. Then, the FIFO memory 72 effects the operation such as that shown in FIGS. 7A through 7I such that, as described above, sets of video data supplied by the controller 3 are thrice replicated. Thus, four identical lines are successively written into the line buffers in the FIFO memory 72 and the video data is thus complemented with the thus thrice replicated data, line by line. Thus, the dot-correction unit 7 receives video data corresponding to the 300 dpi in the main-scan direction/150 dpi in the sub-scan direction resolution and then consequently supplies video data corresponding to the 300 dpi in the main-scan direction/600 dpi in the sub-scan direction resolution.

In this embodiment shown in FIG. 29, the A12 through A15 data shown in FIGS. 29 and 30E can be used as replicated-order code information such as that A12–A15 shown in FIG. 11 and so forth. The above respective values "C", "D", "E" and "F" of the A12 through A15 indicate the replicated orders of the relevant video data, that is, the first, second, third and fourth supplied video data.

The correction data previously stored in the pattern memory 752 shown in FIG. 11 and so forth may be previously selectively loaded thereon by either the MPU 31 in the controller 3 shown in FIG. 1 or the CPU 41 in the engine driver 4 using data stored in the RAM 32 or 42. Alternatively, it is also possible that the host computer 1 loads the necessary data in the pattern memory 752. Thus, various correction data may be arbitrarily used by easily changing currently loaded data.

A technology used in the above-described embodiments of the present invention will now be described, which technology is also used in the above-mentioned laid-open application No. 5-207282. With reference to FIGS. 8, 31A through 41, a window-area separation operation is to be performed prior to a pattern matching operation, patterns are to be detected and areas are to be used for the pattern detection.

Windows 73 such as mentioned above will now be described. Each window area is defined by a sample window having dimensions 7 (height)×11 (length) as shown in FIG. 8 and realized by the 7-line shift registers 73a through 73g shown in FIG. 5 as described above. Each line of shift register includes 11-bit registers as shown in FIG. 5. Thus, the above 7-line shift registers 73a through 73g supply 77-bit data (7×11) corresponding to the 77 dots (7×11) shown in FIG. 8. Among the 77 dots, 49 dots enclosed by the broken line shown in the figure are used to detect specific patterns, that is, approximately vertical lines or approximately horizontal lines. Such lines to be detected are boundary lines present between a black-dot regions and a white-dot region.

Core areas will now be described. The core area in the FIG. 8 example is the core area 73C having the dimensions 3×3 dots enclosed by the solid line shown in the figure. The central dot in the 3×3 dots is a relevant dot currently processed in the jag-correction operation.

FIGS. 31A through 33G show line patterns represented by black dots within a core area 73C such as described above, each line having a width of a single dot. In the figures, black-painted circles represent black dots, double circles represent white dots and triangles represent dots which may be either black or white dots.

FIGS. 31A through 31D illustrate line patterns having 45-degree (1/1) gradients (slopes). Such line patterns are not ones to be corrected in the jag-correction operation in the embodiments described above. Line patterns to be extracted to be corrected in the jag-correction operation are either approximately horizontal ones having gradients equal to or less than the ½ slope or approximately vertical ones having gradients equal to or more than the 2/1 slope. In the embodiments, such kinds of line patterns are assumed to be recognized as jags in final images by users. The embodiments recognize approximately horizontal lines and approximately vertical lines, such as those mentioned above, similarly. Only difference between the above two recognizing processes is that one line pattern corresponds to another line pattern if one is rotated by the 90-degree angle. Thus, for the sake of simplicity, only cases for approximately horizontal lines will be mainly described, hereinafter.

FIGS. 32A through 32G illustrate approximately horizontal line patterns. Line patterns which have gradients equal to or less then the 1/2 slopes are the following two types of patterns in such 3×3 core areas. A first type patterns are those shown in FIGS. 32B, 32C, 32E and 32F. The dot patterns shown in the figures corresponding to the gradient lines having certain degrees of gradients represented by the relevant image data. The above degrees are more than the limit for representing the image data with the right horizontally arranged dot series. Thus, each of the resulting dot series is one in which black dots are arranged on two different steps/heights. The second type of patterns are those shown in FIGS. 32A, 32C and 32G, each of these patterns being one in which black dots are arranged in a single step/height.

FIGS. 33A through 33G illustrate two similar types of patterns for approximately vertical lines.

The embodiments of the present invention previously stores the above patterns shown in FIGS. 31A through 33G to be used to examine whether these stored patterns match a pattern appearing in a core area 73C of actual input image data. Thus, the relevant pattern of the input image data can be easily classified into one which should not be corrected in the embodiments, one which is a candidate of an approximately horizontal line or one which is a candidate of an approximately vertical line.

Peripheral areas will now be described. Peripheral areas such as mentioned above are used to determine that candidates of approximately horizontal or vertical lines such as mentioned above are real approximately horizontal or vertical lines which should be corrected in the embodiments. As described above with reference to FIGS. 34A through 34D, the peripheral areas 73R, 73L, 73U and 73D located right, left, top and bottom of the core area 73C are used. As shown in the figures, each of these four peripheral areas 73R, 73L, 73U and 73D has two dots located at the two ends thereof, at which dots the adjacent two areas overlap with one another.

As shown in FIGS. 35A, 35B, 35C, 36A, 36B and 36C, each of the four peripheral areas is further separated into three sub-areas. However, each of these sub-areas overlaps with the adjacent sub-area(s) as shown in the figures. Thus, the right area 73R and left area 73L are separated into right sub-areas 73R$a$, 73R$b$ and 73R$c$ and left sub-areas 73L$a$, 73L$b$ and 73L$c$. The upper area 73U and lower area 73D are separated into the upper sub-areas 73U$a$, 73U$b$ and 73U$c$ and lower sub-area 73D$a$, 73D$b$ and 73D$c$. Such sub-separating of the peripheral areas is performed so as to simplify the circuit formation required to achieve the pattern matching operation using the thus sub-separated peripheral areas. The embodiments selects appropriate sub-areas from among the above mentioned sub-areas depending on the line pattern, present between a black-dot region and a white dot region, detected in the core area 73C to which the sub-areas are adjacent.

Figure 34A:
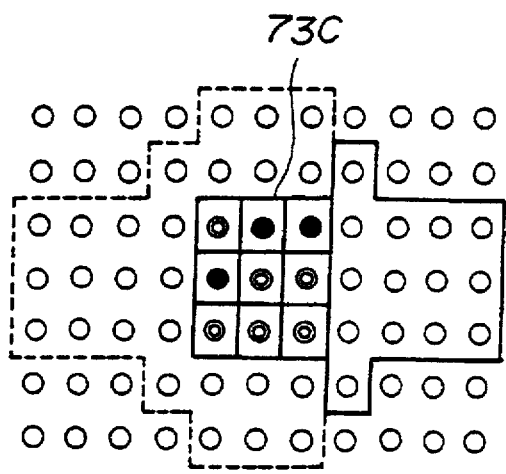
FIGS. 34A, 34B, 34C and 34D illustrate a right area, a left area, a upper area and a lower area acting as peripheral areas for a core area 73C in a window 73 shown in FIG. 8.
Figure 34B:
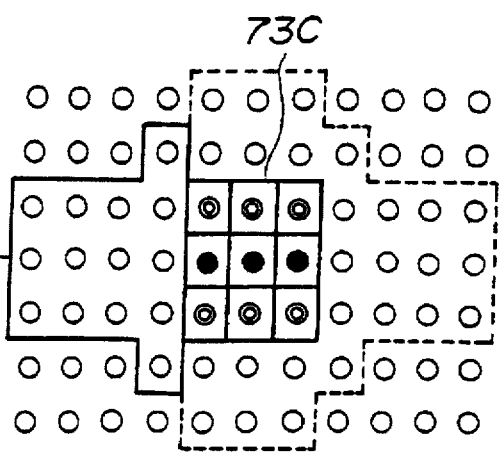
Figure 34C:
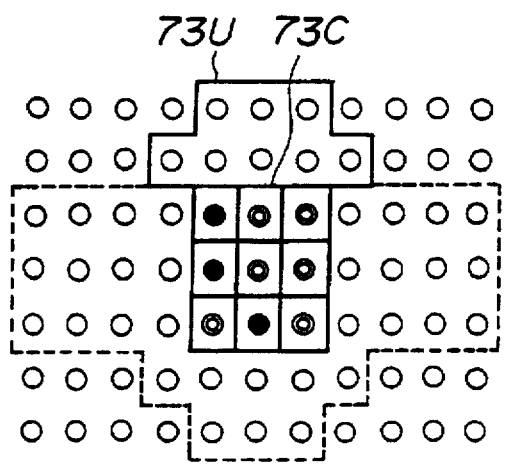
Figure 34D:
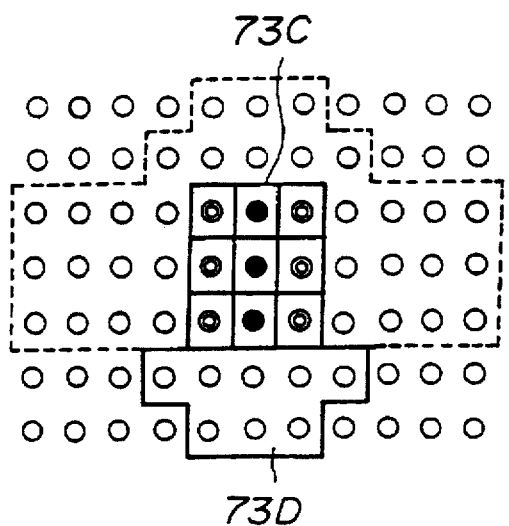
Figure 35A:
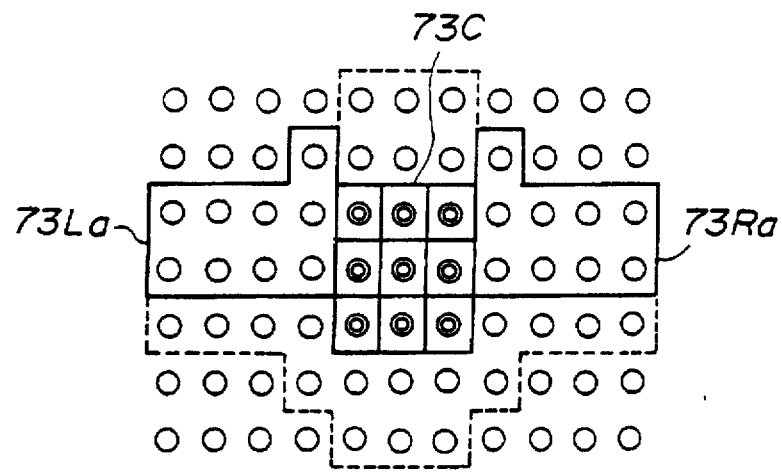
FIGS. 35A, 35B and 35C illustrate three sub-areas for the above right area 73R and left area 73L.
Figure 35B:
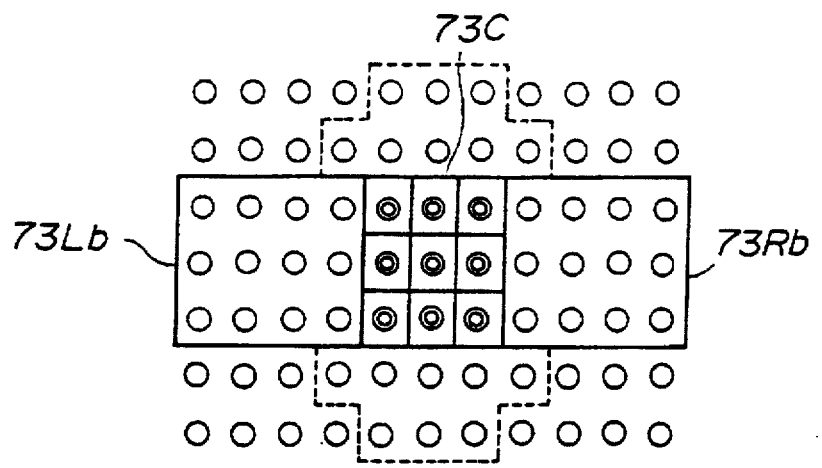
Figure 35C:
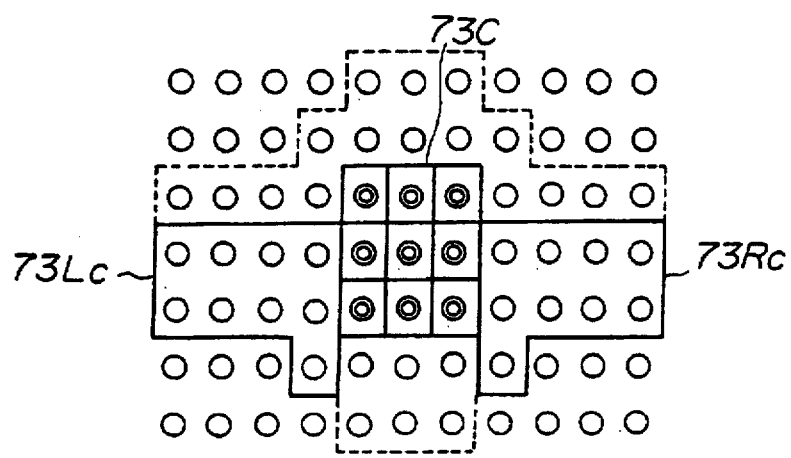
Figure 36A:
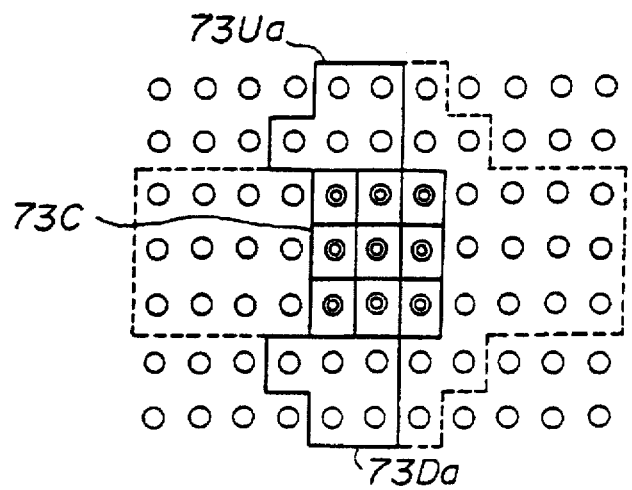
FIGS. 36A, 36B and 36C illustrate three sub-areas for the above upper area 73U and lower area 73D.
Figure 36B:
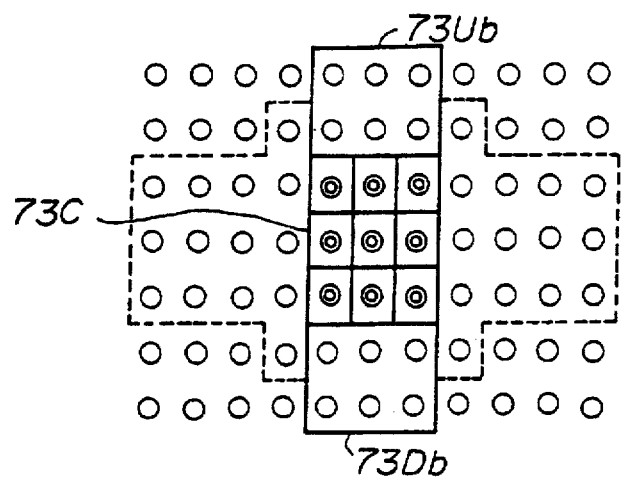
Figure 36C:
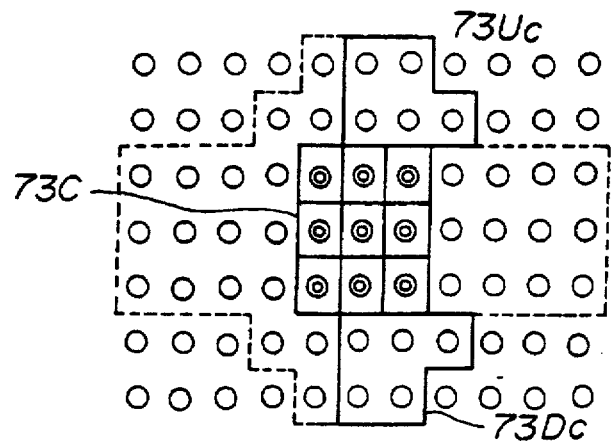

That is, if the detected line pattern in the core area 73C corresponds to the line having the gradient equal to or less than the 1/2 slope, that is, approximately horizontal, the right or left area 73L or 73R shown in FIGS. 34A and 34B, or the two areas are, then examined. Similarly, if detected line in the core area 73C corresponds to the line having the gradient equal to or more than the 2/1 slope, that is, approximately vertical, the upper or lower areas 73U or 73D shown in FIGS. 34C and 34D, or the two are then examined. Further, in such examination, depending on the position of the detected line in the core area 73C, an appropriate sub-area in the above area is selected so as to improve the efficiency in the operation by which it is determined whether or not the relevant line corresponds to a line to be corrected in the embodiment of the present invention. For an example shown in FIG. 37, the left sub-area 73L$b$ and right sub-area 73R$a$ are examined and for an example shown in FIG. 38, the upper sub-area 73U$b$ and lower sub-area 73D$c$ are examined. Alternatively, another sub-area selection is also possible in which the right sub-area 73R$a$ is examined for the FIG. 37 example and the upper sub-area 73U$b$ is examined for the FIG. 38 example.

Figure 37:
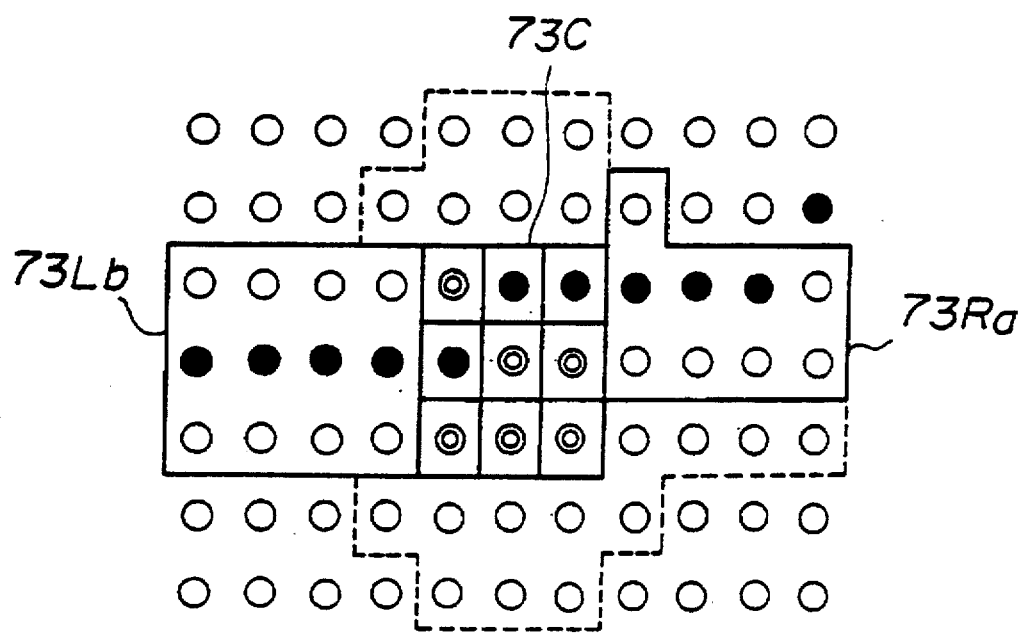
FIGS. 37 and 38 illustrate example in which sub-areas are selected as a result of a approximately horizontal line pattern and approximately vertical line pattern being recognized.
Figure 38:
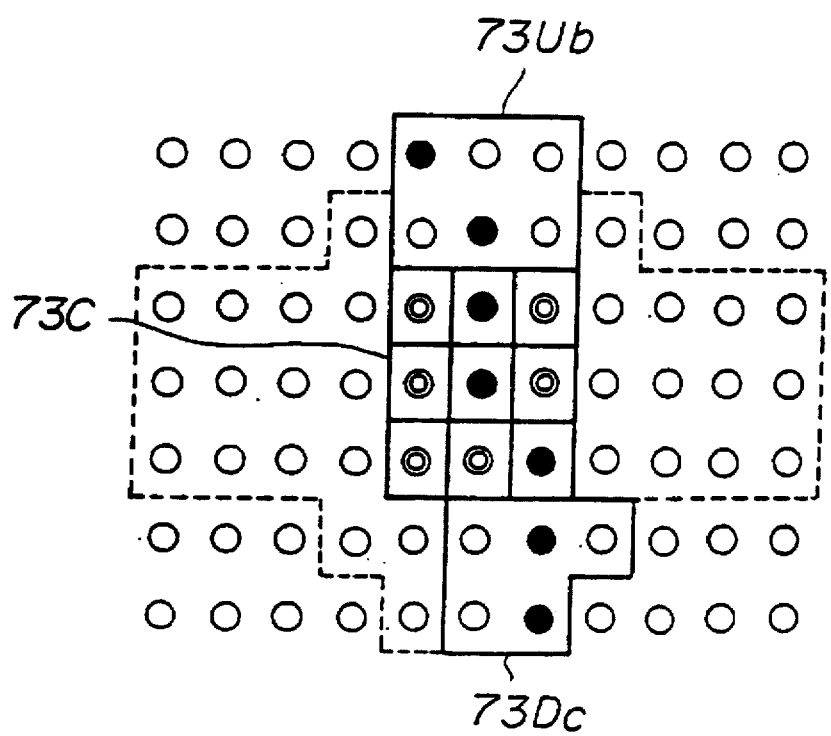

The reason of this matter will now be described. This matter is based on an assumption that each line such as that represented by the serial black-painted circles in the FIGS. 37 or 38 represents a straight line having a constant gradient. In the 37 example, within the core area 73C, the difference in level of the line is located left side within the area 73C as shown in the figure. Based on the above assumption, the both-side subsequent differences in level on the same line should be located at the positions the same distance away from the above difference in level present within the core area 73C. Thus, the right-side subsequent difference in level is close to the core area 73C edges.

With reference to FIG. 9, the respective output signals of the blocks included in the pattern recognizing unit 74 will now be described.

Signals supplied by the core-area recognizing unit 741 will now be described. An H/V signal indicates as to whether the relevant pattern corresponds to an approximately horizontal or vertical line. The level of the signal is the high "1" if the line is approximately horizontal and is low "0" if the line is approximately vertical.

Signals DIR0 and DIR1 indicate two-bit codes as follows:
If both DIR1 and DIR0 are at "0", the signal indicates no match state (that is, the relevant line should not be corrected);

if DIR1 is at "0" and DIR0 is at "1" the signal indicates that the relevant line has a gradient such that the right side is located higher and the left side is located lower;

if DIR1 is at "1" and DIR0 is at "0", the signal indicates that the relevant line has a gradient such that the left side is located higher and the right side is located lower; and if the two are at "1", the signal indicates that the relevant line is the horizontal or vertical one.

A B/W signal indicates whether the relevant dot is a black or a white dot, that is, the content of the relevant dot itself. If the relevant dot is a black one, the signal is at "1" and is at "0" if the relevant dot is the white one.

A U/L signal indicates that, if the relevant dot is a white one, the relevant dot is located higher (rightward) or lower (leftward) than the line (a boundary line present between black and white regions). The signal is at "1" if the dot is located upper (righter) and the signal is at "0" if the dot is located lower (leftward).

A GST signal indicates whether the relevant dot is one which corresponds to the starting point of the line, from which point the gradient of the line is calculated, that is, corresponds to the jag present on the line, that is, corresponds to the position at which the line rises/decays stepwise. The signal is at "1" when the dot is the starting point.

A RUC signal indicates whether the right area 73R or upper area 73U should be examined. If it should be examined, the signal is at "1".

A LLC signal indicates whether the left area 73L or lower area 73D should be examined. If it should be examined, the signal is at "1".

The state where the RUC signal being at "1" and also the LLC signal being at "1" indicate that the relevant line is the horizontal or vertical. The state where the RUC signal being at "0" and also the LLC signal being at "0" indicate that a pattern matching operation is not necessary to be performed on the relevant line.

CC0 and CC1 signals are two-bit information indicating the number, one of 1 through 3, of serial dots corresponding to the line pattern present within the core area 73C.

RUAS0 and RUAS1 signals are two-bit information for specifying one of the three sub-areas in the right area 73R or the upper area 73U.

LLAS0 and LLAS1 signals are two-bit information specifying one of the three sub-areas in the left area 73L or the lower area 73D.

Signals output from the peripheral area recognizing unit 742 will now be described.

'cn' through 'cn' signals are 3-bit information indicating the number, one of 0 through 4, of horizontally or vertically serial dots present in the peripheral areas, which dots are subsequent to the specific dots present in the core area 73C.

'dir0 and dir1' signals are 2-bit information indicating the gradient direction of the line pattern detected as a result of the pattern matching detection operation performed on the sub-areas. The coding manner is the similar to that of the above-described DIR0 and DIR1 signals.

Signals output from the multiplexers (MUX) 743 and 744 will now be described.

RUCN0 through RUCN2 signals are 3-bit information indicating the number of serial dots present in the right area 73R or the upper area 73U.

RUDIR0 and RUDIR1 signals are 3-bit code information indicating the gradient direction of the line present in the right area 73R or the upper area 73U.

LLCN0 through LLCN2 signals are 3-bit information indicating the number of serial dots present in the left area 73L or the lower area 73D.

LLDIR0 and LLDIR1 signals are 3-bit code information indicating the gradient direction of the line present in the left area 73L or the lower area 73D.

Signals output from the determining unit 747 will now be described.

DIR0 and DIR1 signals are the same as those output from the core-area recognizing unit 741 as described above.

A NO-MATCH signal indicates, by being at "1", that no pattern which should be corrected in the embodiments is present in the currently recognized line.

Signals supplied by the gradient calculating unit 745 will now be described.

G0 through G3 signals are 4-bit information indicating the gradient of the currently recognized line. However, this gradient is not the mathematical gradient but is expressed by the number of the horizontally serial dots or the number of the vertically serial dots. That is, the number of serial dots present before the line one-dot-stepwise rises/decays corresponds to the above gradient.

Signals output by the position calculating unit 746 will now be described.

'p0 through p3' signals are 4-bit code information indicating the position of the relevant dot. The signals indicate the number of dots starting from the left-end dot and ending at the relevant dot within the serial dots if the line is an approximately horizontal line and indicating the number of dots starting from the bottom-end dot and ending at the relevant dot within the serial dots if the line is an approximately vertical line.

Signals output from the gate 748 will now be described.

P0 through P3 signals indicate position code information and are the above signals 'p0 through p3' supplied by the position calculating unit 746 if the NO-MATCH signal supplied by the determining unit 747 is at "0". If the NO-MATCH signal is at "1", the P0 through P3 signals indicate "0".

Operations performed by the respective blocks of the pattern recognizing unit 74 shown in FIG. 9 will be simply described.

The core-area recognizing unit 741 extracts the data of the dots included in the core area 73C of the window 73 and performs various checking and calculation for the relevant dot. Thus, the unit 741 supplies the above-described H/V, B/W and U/L signals to the memory block 75 and changes the input of multiplexer 743 and 744 using the signal H/V indicating whether the line is approximately horizontal or approximately vertical.

The unit 741 further supplies the RUC and LLC signals, indicating which peripheral area should be examined, to the calculating unit 745 and the determining unit 747. The unit 741 further supplies the GST signals, indicating whether or not the relevant dot is one at which the line rises/decays stepwise, to the position calculating unit 746. Further, unit 741 supplies the line-gradient direction code information DIR0 and DIR1 to the determining unit 747.

Further, the unit 741 supplies CC0 and CC0 signals to the calculating unit 745, supplies the RUAS0 and RUAS1 to the upper-area recognizing unit 742U and the right-area recognizing unit 742R of the peripheral-area recognizing unit 742 and supplies the LLAS0 and LLAS1 to the lower-area recognizing unit 742D and the left-area recognizing unit 742L of the peripheral-area recognizing unit 742. The thus supplied sigsupplied signals select appropriate sub-areas among the three sub-areas of the respective areas.

The upper-area recognizing unit 742U, right-area recognizing unit 742R, lower-area recognizing unit 742L and left-area recognizing unit 742L of the peripheral-area recognizing unit 742 appropriately extract the data of the dots present within the thus selected sub-areas of the upper area 73U, right area 73R, lower area 73D and left area 73L of the window 73. Thus, the unit 742 recognizes the relevant line patterns so as to supply, to the multiplexer 743 or 744, the 'cn0 through cn2', 'dir0 and dir1' signals indicating the number of serial dots and the gradient direction of the line present within the relevant sub-areas.

The multiplexer 743 selects to input thereto the signal supplied by the upper-area recognizing unit 742U if the above signal H/V is at "0" and selects the signal supplied by the right-area recognizing unit 742R if the above signal H/V is at "1". The multiplexer 743 thus supplies the thus input signals indicating the number of serial dots within the relevant sub-area to the gradient calculating unit 745 as the signals RUCN0 through RUCN2. The multiplexer 743 supplies the thus input signals indicating the gradient direction of the line within the relevant sub-area to the determining unit 747 as the signals RUDIR0 and RUDIR1.

Similarly, the multiplexer 744 selects to input thereto the signal supplied by the lower-area recognizing unit 742D if the signal H/V is at "0" and selects the signal supplied by the left-area recognizing unit 742L if the signal H/V is at "1". The multiplexer 744 thus supplies the thus input signals indicating the number of serial dots within the relevant sub-area to the gradient calculating unit 745 and the position calculating unit 746 as the signals LLCN0 through LLCN2. The multiplexer 744 supplies the thus input signals indicating the gradient direction of the line within the relevant sub-area to the determining unit 747 as the signals LLDIR0 and LLDIR1.

The determining unit 747 determines, using the thus supplied code information DIR0 and DIR1, RUDIR0 and RUDIR1, LLDIR0 and LLDIR1, whether or not the relevant line should be corrected in the jag-correction operation. If the unit 747 determines to correct the line, the unit 747 supplies the above DIR0 and DIR1 and sets "0" on the signal NO-MATCH. If "1" is set on the signal NO-MATCH, this signal closes the gate 748 so as to prevent significant position information P0 through P3 from being supplied.

The gradient calculating unit 745 calculates the gradient (GRADIENT) of the currently recognized line pattern as the number of serial dots as described above and supplies the corresponding code information G0 through G3. This calculation uses the supplied code information CC0 and CC1, RUCN0 through RUCN2, LLCN0 through LLCN2, and signals RUC and LLC.

The position calculating unit 746, using the supplied code information LLCN0 through LLCN2 and the signal GST, calculates the position (POSITION) of the relevant dot and supplies the corresponding code information p0 through p3 (=P0 through P3).

Methods of calculating of gradients (GRADIENTS) through the gradient calculating unit 745 and calculating of positions (POSITIONS) through the position calculating unit 746 will now be described.

The GRADIENTS and POSITIONS are calculated, using the above GST (the value (1-GST) is referred to as 'notGST' hereinafter) CC0 and CC1 (referred to CC, hereinafter), RUC and LLC supplied by the core-area recognizing unit 741 and the above RUCN0 through RUCN2 (referred to as RUCN, hereinafter), and LLCN0 through LLCN2 (referred to as LLCN, hereinafter), through the following equations (1) and (2):

$$GRADIENT=CC+RUC \cdot RUCN+LLC \cdot LLCN \quad (1);$$

$$POSITION=GST+notGST \cdot (LLCN+2) \quad (2).$$

Concrete calculation examples will now be described for dot-represented line patterns examples shown in FIGS. 39 through 41. In each example, a relevant dot is one located at the d-th line and sixth row in the 7×11 matrix dots.

The FIG. 39 example will now be described.

The relevant dot is not the dot at which the line (represented by the black-painted circles) rises/decays stepwise. Within the core area 73C, the number of serial dots is 3 and in this case, it is necessary to examine the two-side peripheral areas, that is, the right area 73R and left area 73L. This is because, there is no difference in level present on the line within the core area 73C. If there is a difference in level within the core area 73C, as shown in FIG. 37, it is possible to omit to examine one-side peripheral area for the reason described above with reference to FIG. 37. Thus, the core-area recognizing unit 741 supplies GST=0, CC=3, RUC=1 and LLC=1.

With regard to the above peripheral areas 73R and 73L, the number of serial dots subsequent to the relevant dot-made line within the core area 73C present, before a level difference appears on the line, is 1 in each area as shown in the figure. Thus, the MUX 743 and 744 supply RUCN=1 and LLCN=1.

Thus, by substituting the above actual values for the respective terms of the above equations (1) and (2);

$$GRADIENT=3+1 \cdot 1+1 \cdot 1=3+1+1=5;$$

and $$POSITION=0+(1-0) \cdot (1+2)=0+1 \cdot 3=3.$$

The FIG. 40 example will now be described.

Figure 39:
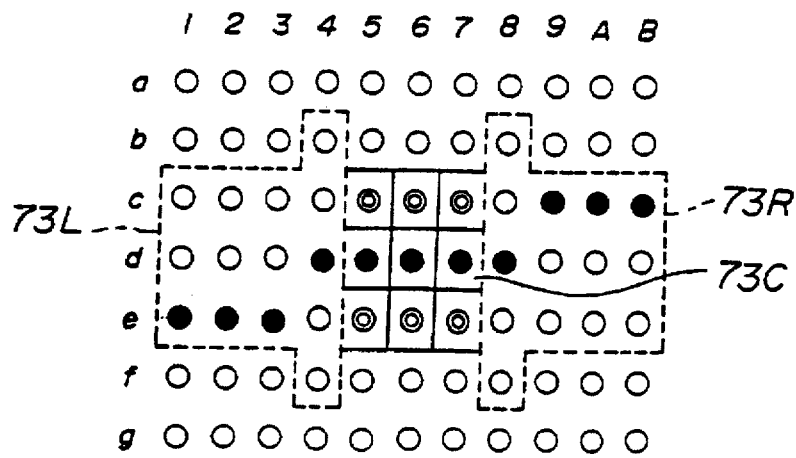
FIGS. 39, 40 and 41 illustrate examples of line patterns, a pattern, another pattern resulting from each bit being shifted one-bit rightward and another pattern resulting from each bit being further shifted one-bit rightward, present in window 73 for illustrating calculation examples gradients and positions by means of a gradient calculating unit 745 and a position calculating unit 746 shown in FIG. 9.
Figure 40:
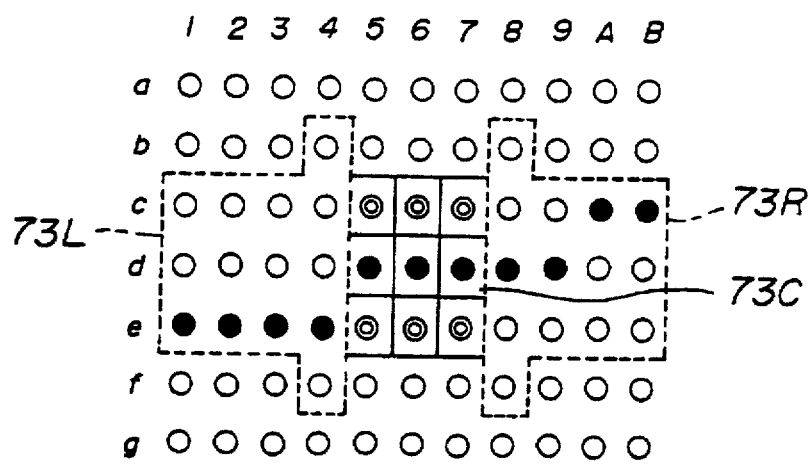

The FIG. 40 example includes a line pattern obtained by shifting each bit in the FIG. 39 example rightward by one bit. As a result, the number of serial dots, present in the peripheral area 73R, subsequent to the relevant dot-made line present in the core area 73C is 2 and that present in the peripheral area 73L is 0. Thus, RUCN=2 and LLCN=0 accordingly. The other situation and, thus, the resulting values are the same as those of the FIG. 39 example.

Thus, by substituting the relevant actual values for the respective terms of the above equations (1) and (2);

$$GRADIENT=3+1 \cdot 2+1 \cdot 0=3+2+0=5;$$

and $$POSITION=0+(1-0) \cdot (0+2)=0+1 \cdot 2=2.$$

The FIG. 41 example will now be described.

Figure 41:
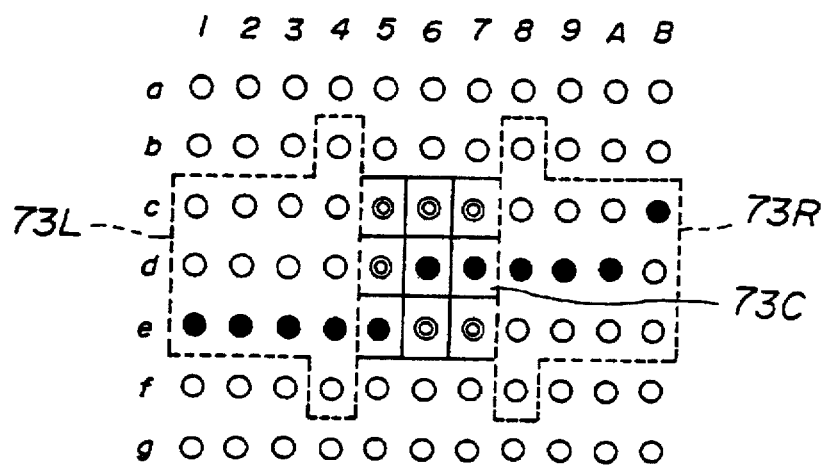

The FIG. 41 example includes a line pattern obtained by further shifting each bit in the FIG. 40 example rightward by one bit. The relevant dot is the dot at which the line rises/delays stepwise, that is, the level difference is present in the core area 73C. Within the core area 73C, the number of serial dots is 2 and in this case, it is necessary to examine only the right peripheral area 73L for the reason described above with reference to FIG. 37. Thus, the core-area recognizing unit 741 supplies GST=1, CC=2, RUC=1 and LLC=0.

The number of serial dots present subsequent to the relevant dot-made line within the core area 73C, before a level difference appears on the line, is 3 for the right area 73R and is 4 for the left area 73L, as shown in the figure. Thus, the MUX 743 and 744 supply RUCN=3 and LLCN=4.

Thus, by substituting the above actual values for the respective terms of the above equations (1) and (2);

$$GRADIENT=2+1 \cdot 3+0 \cdot 4=2+3+0=5;$$

and $$POSITION=1+(1-1) \cdot (4+2)=1+0 \cdot 6=1.$$

Thus, the example of calculations for cases of approximately horizontal line patterns have been described. For cases of approximately vertical line patterns, the above equations (1) and (2) are used so as to obtain corresponding GRADIENTS and POSITIONS, similarly to the above described cases of the approximately horizontal line patterns. However, in each case of the cases of approximately vertical line patterns, the number of serial dots, present in the upper peripheral area 73U, subsequent to the relevant dot-made line present in the core area 73C is substituted for the term RUCN and that present in the lower peripheral area 73D is substituted for the term LLCN.

Methods for performing the jag-correction operation will now be described.

The jag-correction operation to be performed on an approximately horizontal line will now be described with reference to FIGS. 37, 42A, 42B, 44A, 44B, 44C and 44D.

In FIG. 42A, dot information, in an example, according to the input video data supplied by the controller 3 is indicated by broken-line-drawn circles in a 7×11 matrix video area. The dot information according to the input video data indicates only black or white for each dot and does not indicate the size of the dot. Thus, it can be said that the size of each dot is fixed. In FIG. 42A, the circles painted by hatching indicates the dots obtained as a result of the jag-correction having been performed thereon. In the jag-correction operation, the dot diameters have been changed and new dots have been added as shown in FIG. 42A. The size/diameter of the dots correspond to the pulse widths causing the laser of the writing unit 26 shown in FIG. 1 to be ON, for example. The relevant line corresponding to the dot information according to the video data supplied by the controller 3 has the gradient of 1/5 slope, thus corresponding to an approximately horizontal line, as shown in the figure. Thus, in the 7×11 matrix area, two jags (level differences) are present, as each jag appears at five-dot intervals. FIG. 42B shows laser-ON pulse-width variation obtained by performing the jag-correction operation on the d-th line of the 7×11 matrix area.

The FIG. 37 example corresponds to one including the window 73 in the case where the dot located at the d-th line and 9th row in the 7×11 matrix shown in FIG. 42A. The FIG. 37 columns in FIGS. 44A, 44B, 44C and 44D show the signals shown in FIG. 9 in the above case. FIG. 44A shows information indicated by the signals supplied by the core-area recognizing unit 741 and FIG. 44B shows information indicated by the signals supplied by the peripheral-area recognizing unit 742. FIG. 44C shows GRADIENT information indicated by the signals G0 through G3 and information indicated by the NO-MATCH signal. FIG. 44D shows POSITION information indicated by the signals P1 through P3.

Among the above signals, the H/V, DIR1, DIR0, B/W, U/L, G3 through G3, P3 through P3 are used as the address in the pattern memory 752 in the memory block 75 shown in FIG. 4. Thus, the correction data is read out from the pattern memory 752 according to the above address, the correction data being the corresponding video data. The video data is then sent to the engine driver 4 so as to drive the laser in the writing unit 26 shown in FIG. 1.

As a result, the laser-ON pulse width used in writing/printing the dot located at the d-th line and 9th row of the 7×11 matrix shown in FIG. 42A is reduced into 9/10 the full pulse-width preset for each dot as shown in FIG. 42B. Thus, the relevant dot is changed from the broken-line-drawn circle into the hatching-painted circle as shown in FIG. 42A. Thus, the dot diameter is reduced into 9/10 the full-size dot diameter. Each of the other dots becomes the relevant dot so that the corresponding signals are supplied to the pattern memory. Thus, the corresponding video data as the correction data is supplied to the engine driver 4. Thus, the dots are appropriately corrected so that the dots indicated as the hatching-painted circles shown in FIG. 42A are obtained.

Thus, even if a relevant dot is a white dot according to video data supplied by the controller 3, a dot having the suitable diameter is produced if it is necessary for the relevant dot as a result of the line pattern present around the relevant dot having been recognized. In the embodiments of the present invention, such dot-diameter (laser-ON pulse-width) reduction is carried out such that a certain value is used as a unit to be used for the above reduction. The particular value is one obtained by dividing 1 by a particular integer. In the above example, the particular value is 1/10.

With reference to FIG. 42A, it seems that crevices are present between the adjacent lines of dots due to the dot-diameter reduction performed on the two ends of each line of dots. However, in an actual printing process through a laser printer, the printing resolution is not so fine so that blurs appear. As a result, the adjacent lines of dots become to be integrated into a single line through the printing process. Thus, the jags present in the dot information according to the video data supplied by the controller 3 are appropriately corrected so that the slightly-oblique smooth straight line is obtained.

The above FIG. 42A example is one for a line having width of a single dot, that is, a very thin line in an image. If it is assumed that a line to be processed/corrected is a boundary line present between a black painted (black-dot) region and a white (white-dot) region, the jag-correction operation is changed correspondingly as will be described. In other words, the above assumption is that there is a black-dot area having a width more than that of a single dot. In such an assumed case, if the jag-correction is performed, dot-diameter reduction and dot addition are performed on the end of the line of dots at which end the relevant line is located at an edge of the black-dot region. However, no dot-diameter reduction is performed on the end of the dot line, at which end the relevant dot line continues into the inside of the black-dot region. At the end of the dot line, the dot addition is not necessarily performed accordingly. These matters will now be described using the FIG. 42A example. It is assumed that all the region present below the dot lines present in the 7×11 matrix shown in the figure is the black-dot region. That is, it is assumed that the dot picture shown in FIG. 42A is one corresponding to a boundary line present between the upper white-dot region and the lower black-dot region, which line is the oblique straight line having 1/5 slope. In this assumed case, the black dots located at the e-th line, second and third rows, the d-th line, 7th and 8th rows are left as the full-diameter dots without being performed any dot-diameter reduction. Further, no dot is added to the e-th line, 4th and 5th rows, the d-th line, 9th and A-th rows, as these positions have been already occupied by the full-size black dots under the above assumption.

The jag-correction operation to be performed on an approximately vertical line will now be described with reference to FIGS. 38, 43A, 43B, 44A, 44B, 44C and 44D.

In FIG. 43A, dot information, in an example, according to the input video data supplied by the controller 3 is indicated by broken-line-drawn circles in a 7×11 matrix video area. The dot information according to the input video data indicates only black or white for each dot and does not indicate the size of the dot, as described above. In FIG. 43A, the circles painted by hatching indicate the dots obtained as a result of the jag-correction having been performed thereon. In the jag-correction operation, the positions of the dots have been appropriately changed as shown in the figure. Such dot position change corresponds to the change in appearing time of pulses causing the laser of the writing unit 26 shown in FIG. 1 to be ON, for example. The relevant line corresponding to the dot information according to the video data supplied by the controller 3 has the gradient of 3/1 slope, thus corresponding to an approximately vertical line, as shown in the figure. Thus, in the 7×11 matrix area, two jags (differences in positions along the horizontal direction) are present, as each jag appears at three-dot intervals. FIG. 43B shows laser-ON pulse-width time-shift obtained by performing the jag-correction operation on the b-th line of the 7×11 matrix area.

The FIG. 38 example corresponds to one including the window 73 in the case where the dot located at the b-th line and 5th row in the 7×11 matrix shown in FIG. 43A. The FIG. 38 columns in FIGS. 44A, 44B, 44C and 44D show the signals shown in FIG. 9 in the above case.

Among the above signals, the H/V, DIR1, DIR0, B/W, U/L, G3 through G0, P3 through P0 are used as the address in the pattern memory 752 in the memory block 75 shown in FIG. 4, as described above. Thus, the correction data is read out from the pattern memory 752 according to the above address, the correction data being the corresponding video data. The video data is then sent to the engine driver 4 so as to drive the laser in the writing unit 26 shown in FIG. 1.

As a result, the appearing time of the laser-ON pulse used in writing/printing the dot located at the b-th line and 5th row of the 7×11 matrix shown in FIG. 43A is delayed by ⅓ the time period corresponding to the full pulse width without any variation occurring in the pulse width, as shown in FIG. 43B. Thus, the position of the relevant dot is changed, rightward, from the position of the broken-line-drawn circle into the position of the hatching-painted circle by ⅓ the diameter of the dot, as shown in FIG. 43A. Each of the other dots becomes the relevant dot so that the corresponding signals are supplied to the pattern memory. Thus, the corresponding video data as the correction data is supplied to the engine driver 4. Thus, the dot positions are appropriately changed horizontally so that the dots indicated as the hatching-painted circles shown in FIG. 43A are obtained. Thus, the jags present in the dot information according to the video data supplied by the controller 3 are appropriately corrected so that the slightly-oblique smooth straight line is obtained. Similarly to the above-described case, in the embodiments of the present invention, such dot position (laser-ON pulse appearing time) shift is carried out such that a certain value is used as a unit to be used for the above shift. The certain value is one obtained by dividing 1 by a certain integer. In the above example, the certain value is ⅒.

The above FIG. 43A example is one for a line having the width of a single dot, that is, a very thin line in an image. If it is assumed that a line to be processed/corrected is a boundary line present between a black painted (black-dot) region and a white (white-dot) region, the jag-correction operation is changed correspondingly as will be described. In other words, the above assumption is that there is a black-dot area having a width more than that of a single dot. In such an assumed case, if the dot position shift is required in the jag-correction operation such that a dot position is shifted from the black-dot region side to the white-dot region side by a certain distance, the dot is left unshifted and another dot, having the position shifted from the position of the original dot by the above certain distance, is added.

This matter will now be described using the FIG. 43A example. It is assumed that all the region present at the left side of the dot line present in the 7×11 matrix shown in the figure is the black-dot region. That is, it is assumed that the dot picture shown in FIG. 43A is one corresponding to a boundary line present between the right white-dot region and the left black-dot region, which line is the oblique straight line having 3/1 slope. In this assumed case, the black dots located at the b-th line, 5th row and the e-th line, 6th row are left unshifted at the positions indicated by the broken-line-drawn circles and other dots are added. The above other dots are indicated by the hatching-painted circles and have the positions shifted rightward (to the white-dot region side in the above assumption) from the position indicated by the broken-line-drawn circles. In this assumption, the black dots located at the c-th line, 6th row and f-th line, 7th row are shifted leftward (to the black-dot region side) by 1/3 the full-dot diameter from the broken-line-drawn circle positions to the hatching-painted circle positions. As a result, there are overlapping of two dots in the black-dot region. Such dot overlapping corresponds to two laser ON pulses overlapping to form a continuous double pulse.

Although the dot-correction unit 7 acting as the image processing system according to the present invention is provided in the internal interface 5 connecting the controller with the engine driver 4 in the laser printer 2 in the above-described embodiments, it is also possible within the scope of the present invention to provide the dot-correction unit 7 in the controller 3 or in the engine driver 4.

Further, the present invention may be applied not only to such a laser printer but also to various image forming apparatuses and to image display/printing apparatuses for displaying/printing images formed by the above image forming apparatus. The above apparatuses are ones such as various optical printers such as an LED printer, a digital duplicator, a facsimile apparatus, and so forth. These apparatuses form images by expanding input video data into the bit-map formation data and displaying/printing the thus formed images.

Further, the present invention is not limited to the above described embodiments, and variations and modifications may be made without departing from the scope of the present invention.

What is claimed is:

1. An image data processing system comprising:
   bit-map means for forming a bit map using given image data;
   boundary recognizing means for recognizing characteristics of a boundary present between first type of pixels and second type of pixels constituting said bit map;
   determining means for determining for a pixel whether correction is necessary so as to significantly make the image produced from the given image data finer, the determination using at least part of the boundary characteristics;
   correction means for performing a correction on the image data for the pixel, the correction of which pixel has been determined to be necessary, said correction being performed in a manner determined depending on the boundary characteristics; and
   data replicating means for replicating the given image data to be used in the correction to be performed by said correction means.

2. The image data processing system according to claim 1, further comprising timing producing means for producing timing in which said data replicating means performs the replicating operation.

3. The image data processing system according to claim 1, further comprising times-setting means for setting the number of times by which said data replicating means performs the replicating operation.

4. The image data processing system according to claim 1, further comprising numbering means for numbering the image data set created by the replication for each replication operation so as to identify the number of each image data set created by the replication.

5. The image data processing system according to claim 4, further comprising: window means for extracting a predetermined area of pixels, in said bit map, in which area the pixel to be currently processed is centered; and wherein:
said boundary recognizing means recognizes the characteristics of the boundary present between first type of pixels and second type of the pixels in said area; and
said correction means supplies the manner of correction as a result of selecting from a plurality of predetermined manners classified depending on various patterns of the boundary characteristics and on the numbers determined by said numbering means for replicating sets of image data for each original set of image data.

6. The image data processing system according to claim 4, wherein said correction means uses a pattern memory previously storing therein a plurality of predetermined correction patterns corresponding to said plurality of predetermined manners, said memory being formed so that an appropriate manner may be selected from among said plurality of predetermined manners depending on the various patterns of the boundary characteristics and on the numbers determined by said numbering means for replicated sets of image data for each original set of image data.

7. The image data processing system according to claim 6, wherein said pattern memory includes a first memory and a second memory, said second memory previously storing therein said plurality of predetermined correction patterns, said second memory being formed so that a pattern may be selected from said plurality of predetermined correction patterns using a code selected from codes previously stored in said first memory, said first memory previously storing said codes therein, said first memory being formed so that the appropriate code may be selected from said codes depending on the various patterns of the boundary characteristics and on the numbers determined by said numbering means for replicated sets of image data for each original set of image data.

8. The image data processing system according to claim 6, wherein said pattern memory includes a first memory and a second memory, said second memory previously storing therein said plurality of predetermined correction patterns, said second memory being formed so that a pattern may be selected from said plurality of predetermined correction patterns using a code selected from codes previously stored in said first memory and the number among the numbers determined by said numbering means for replicating sets of image data for each original set of image data, said first memory previously storing said codes therein, said first memory being formed so that the appropriate code may be selected from said codes depending on the various patterns of the boundary characteristics.

9. The image data processing system according to claim 4, further comprising reverse-numbering means for generating numbers obtained by reversing the numbering supplied by said numbering means.

10. The image data processing system according to claim 1, further comprising light emission intensity control means for controlling light emission intensity of a laser diode in accordance with the correction performed by said correction means.

11. The image data processing system, according to claim 1, further comprising manipulating means for arbitrarily manipulating the given image data, said manipulating means processing either the boundary characteristics or the image data having undergone the correction performed by said correction means.

12. The image data processing system according to claim 11, wherein said manipulating means comprises a micro computer.

13. The image data processing system according to claim 11, wherein the correction is performed on image data produced by said manipulating means by said correction means.

14. The image data processing system according to claim 11, wherein said correction means and said manipulating means operate in parallel.

15. The image data processing system according to claim 1, further comprising:
clock generating means, inside said system, for generating internal clock pulses, and
selecting means for selecting clock pulses, in synchronization with which pulses each means operates, from between said internal clock pulses and external clock pulses which may be supplied outside said system.

16. The image data processing system according to claim 6, wherein the number of said plurality of predetermined correction patterns is reduced as much as the substantial fineness in the image to be realized is maintained.

17. An image data processing system comprising:
bit-map means for forming a bit map using given image data;
boundary recognizing means for recognizing characteristics of a boundary present between first type of pixels and second type of pixels constituting said bit map;
determining means for determining for a pixel whether correction is necessary so as to significantly make the image produced from the given image data finer, the determination using at least part of the boundary characteristics;
correction means for performing a correction on the image data for the pixel, the correction of which pixel has been determined to be necessary, said correction being performed in a manner determined depending on the boundary characteristics; and
multi-window means for defining a plurality of windows in a page of the bit map.

18. The image data processing system according to claim 17, further comprising correction setting means for determining, for each window defined by said multi-window means, whether the correction is performed by said correction means.

19. The image data processing system according to claim 17, further comprising priority setting means for determining a window priority in which the corrections are performed by said correction means on the image data defined by respective ones of said plurality of windows.

20. The image data processing system according to claim 17, further comprising special mode setting means for selecting a special mode according to which the image data defined by the relevant windows is processed in addition to the correction performed by said correction means, said special mode being selected from among special modes, which describe various types of image processing manners.

21. An image data processing method comprising:
a) a bit-map step forming a bit map using given image data;
b) a boundary recognizing step recognizing characteristics of a boundary present between first type of pixels and second type of pixels constituting said bit map;

c) a determining step determining for a pixel whether correction is necessary so as to significantly make the image produced from the given image data finer, the determination using at least part of the boundary characteristics;

d) a correction step performing a correction on the image data for the pixel, the correction of which pixel has been determined to be necessary, said correction being performed in a manner determined depending on the boundary characteristics; and e) a data replicating step replicating the given image data to be used to the correction to be performed in said correction step d).

22. An image data processing method comprising:

a) a bit-map step forming a bit map using given image data;

b) a boundary recognizing step recognizing characteristics of a boundary present between first type of pixels and second type of pixels constituting said bit map;

c) a determining step determining for a pixel whether correction is necessary so as to significantly make the image produced from the given image data finer, the determination using at least part of the boundary characteristics;

d) a correction step performing a correction on the image data for the pixel, the correction of which pixel has been determined to be necessary, said correction being performed in a manner determined depending on the boundary characteristics; and e) a multi-window step defining a plurality of windows in a page of the bit map.

* * * * *

UNITED STATES PATENT AND TRADEMARK OFFICE
CERTIFICATE OF CORRECTION

PATENT NO. : 5,666,213
DATED : September 9, 1997
INVENTOR(S) : Masakazu OHSHITA et al It is certified that error appears in the above-identified patent and that said Letters Patent is hereby corrected as shown below:

On the title page, item [63] should read as follows:

--[63]  Continuation-in-Part of Ser No. 980,964, Nov. 24, 1992, Pat No. 5,327,260.--

Signed and Sealed this

Tenth Day of February, 1998

Attest:

BRUCE LEHMAN

*Attesting Officer*     *Commissioner of Patents and Trademarks*